United States Patent
Adams et al.

(10) Patent No.: US 6,631,186 B1
(45) Date of Patent: Oct. 7, 2003

(54) SYSTEM AND METHOD FOR IMPLEMENTING AND ACCESSING CALL FORWARDING SERVICES

(75) Inventors: Thomas Lee Adams, Austin, TX (US); Xiaolian Yang Bi, Shanghai (CN); Gordon Lynn Blumenschein, Woodridge, IL (US); Nancy Ann Book, Naperville, IL (US); Rodney T Brand, Florissant, MO (US); Susanne Marie Crockett, Buffalo Grove, IL (US); Laura Kay Culli, Austin, TX (US); Mary Louise Hardzinski, Longmont, CO (US); Michael Albert Machacek, Bulverde, TX (US); Thomas Joseph McBlain, Arlington Heights, IL (US); John Wesley Moss, Lake Zurich, IL (US); Stephen Mark Mueller, Austin, TX (US); Karen Jeanne Pelletier, LaQuinta, CA (US); Richard Everett Sabinson, San Antonio, TX (US); Paul Wilczynski, Cary, IL (US); Elizabeth Goldwyn Gibson, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

(21) Appl. No.: 09/716,276

(22) Filed: Nov. 21, 2000

Related U.S. Application Data

(63) Continuation-in-part of application No. 09/619,312, filed on Jul. 19, 2000, and a continuation-in-part of application No. 09/545,459, filed on Apr. 7, 2000.
(60) Provisional application No. 60/128,474, filed on Apr. 9, 1999.

(51) Int. Cl.[7] ............................. H04M 3/42; H04M 7/00
(52) U.S. Cl. ............................. 379/201.12; 379/211.02; 379/221.08

(58) Field of Search ...................... 379/88.18, 221.08, 379/221.09, 211.02

(56) References Cited

U.S. PATENT DOCUMENTS

| 4,995,074 A | 2/1991 | Goldman et al. |
| 5,054,055 A | 10/1991 | Hanle et al. |
| 5,117,452 A | 5/1992 | Callele et al. |
| 5,241,588 A | 8/1993 | Babson, III et al. |

(List continued on next page.)

FOREIGN PATENT DOCUMENTS

| EP | 0740480 | 10/1996 |
| WO | 98/52342 | 11/1998 |
| WO | 00/10346 | 2/2000 |

OTHER PUBLICATIONS

Internet web pages by Z–Tel, "Personal Communications Center", dated Apr. 13, 2000 and May 15, 2000.

(List continued on next page.)

*Primary Examiner*—Ahmad F. Matar
*Assistant Examiner*—Hector Agdeppa
(74) *Attorney, Agent, or Firm*—Greenblum & Bernstein, P.L.C.

(57) ABSTRACT

A system and method include implementing and accessing a subscriber's telecommunications services, using a graphical user interface (GUI) via the Internet, and an interactive voice response (IVR) system via the public switched telecommunications network (PSTN). The system and method enable a subscriber to review, schedule and modify call forwarding information stored and implemented by a service control-point (SCP) through a common server from any dual tone multi-frequency (DTMF) telephone and IVR system via the PSTN or any GUI and Web client via the Internet. The subscriber is able to build and edit call forwarding data, such as a scheduler and priority and rejection screening lists, by the GUI via the Internet for subsequent implementation.

24 Claims, 34 Drawing Sheets

U.S. PATENT DOCUMENTS

| | | |
|---|---|---|
| 5,343,516 A | 8/1994 | Callele et al. |
| 5,345,380 A | 9/1994 | Babson, III et al. |
| 5,491,744 A | 2/1996 | Kikinis |
| 5,513,251 A | 4/1996 | Rochkind et al. |
| 5,519,767 A | 5/1996 | O'Horo et al. |
| 5,533,102 A | 7/1996 | Robinson et al. |
| 5,546,447 A | 8/1996 | Skarbo et al. |
| 5,583,564 A | 12/1996 | Rao et al. |
| 5,615,252 A | 3/1997 | Sizer, II et al. |
| 5,625,676 A | 4/1997 | Greco et al. |
| 5,629,978 A | 5/1997 | Blumhardt et al. |
| 5,651,060 A | 7/1997 | Cohn et al. |
| 5,684,862 A | 11/1997 | Finnigan |
| 5,696,815 A | 12/1997 | Smyk |
| 5,724,412 A | 3/1998 | Srinivasan |
| 5,742,668 A | 4/1998 | Pepe et al. |
| 5,751,707 A | 5/1998 | Voit et al. |
| 5,754,636 A | 5/1998 | Bayless et al. |
| 5,764,748 A | 6/1998 | Rosenthal et al. |
| 5,802,157 A | 9/1998 | Clarke et al. |
| 5,805,587 A * | 9/1998 | Norris et al. ............... 370/352 |
| 5,809,128 A | 9/1998 | McMullin |
| 5,825,862 A | 10/1998 | Voit et al. |
| 5,870,549 A | 2/1999 | Bobo, II |
| 5,881,144 A | 3/1999 | Havens |
| 5,915,008 A | 6/1999 | Dulman |
| 5,917,817 A | 6/1999 | Dunn et al. |
| 5,920,618 A | 7/1999 | Fleischer, III et al. |
| 5,933,490 A | 8/1999 | White et al. |
| 5,933,778 A | 8/1999 | Buhrmann et al. |
| 5,937,050 A * | 8/1999 | Yue et al. ............. 379/100.01 |
| 5,940,488 A | 8/1999 | DeGrazia et al. |
| 5,946,381 A | 8/1999 | Danne et al. |
| 5,958,016 A | 9/1999 | Chang et al. |
| 5,982,774 A | 11/1999 | Foladare et al. |
| 5,982,870 A | 11/1999 | Pershan et al. |
| 5,999,611 A * | 12/1999 | Tatchell et al. ............. 379/197 |
| 6,014,379 A | 1/2000 | White et al. |
| 6,028,917 A | 2/2000 | Creamer et al. |
| 6,031,836 A | 2/2000 | Haserodt |
| 6,031,896 A | 2/2000 | Gardell et al. |
| 6,038,296 A | 3/2000 | Brunson et al. |
| 6,041,325 A | 3/2000 | Shah et al. |
| 6,058,175 A | 5/2000 | Schultz |
| 6,058,178 A | 5/2000 | McKendry et al. |
| 6,078,581 A | 6/2000 | Shtivelman et al. |
| 6,078,583 A | 6/2000 | Takahara et al. |
| 6,081,589 A | 6/2000 | Jiang et al. |
| 6,091,808 A | 7/2000 | Wood et al. |
| 6,101,246 A | 8/2000 | Heinmiller et al. |
| 6,125,126 A * | 9/2000 | Hallenst.ang.l ............. 370/259 |
| 6,161,128 A | 12/2000 | Smyk |
| 6,219,413 B1 * | 4/2001 | Burg .......................... 370/352 |
| 6,263,064 B1 | 7/2001 | O'Neal et al. |
| 6,337,899 B1 | 1/2002 | Alcendor et al. |

OTHER PUBLICATIONS

Internet eb pages by TOSC International, "Cool Call", dated May 4, 2000.

Internet web pages by Phone. Com, "My Phone Service", dated May 4, 2000.

Internet web pages by Sea Communications, Inc., "Wav-Mail", dated Jul. 28, 2000.

Internet web pages by Donner, Chris, "Pondering PC–PBX Permuations,"CTI PCBX Round–up, dated Dec. 1998.

Internet web pages by CNN.com, "Internet Call Waiting Turns One Phone Line Into Two", dated Aug. 13, 1999.

Internet web pages by Cincinnati Bell, "Internet Call Manager", dated 2000.

* cited by examiner

SYSTEM AND METHOD FOR IMPLEMENTING AND ACCESSING CALL FORWARDING SERVICES

This application is a continuation-in-part, of U.S. patent application Ser. No. 09/619,312, filed Jul. 19, 2000, and a continuation-in-part of U.S. patent application Ser. No. 09/545,459, filed Apr. 7, 2000, which claims the benefit of U.S. Provisional patent application No. 60/128,474 filed on Apr. 9, 1999, entitled "Internet Caller Identification System" to ADAMS et al., the disclosures of which are expressly incorporated by reference herein in their entireties.

BACKGROUND OF THE INVENTION

1. Field of the Invention

The present invention relates to the field of telecommunications. More particularly, the present invention relates to call forwarding services that enable subscribers to forward calls to alternative locations.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, the acronyms are defined as follows:

Advanced Intelligent Network (AIN)
Authentication/Subscription Information (ASI)
Caller Identification (Caller ID)
Central Office (CO)
Customer Premises Equipment (CPE)
Dual Tone Multi-Frequency (DTMF)
Graphical User Interface (GUI)
Generic Data Interface (GDI)
HyperText Mark-Up Language (HTML)
HyperText Transfer Language Protocol (HTTP)
Incoming Call Manager (ICM)
Interactive Voice Response (IVR)
Internet Caller Identification (ICID)
Internet Call Waiting (ICW)
Lightweight Directory Access Protocol (LDAP)
Line Information Database (LIDB)
Outgoing Call Control (OCC)
Personal Computer (PC)
Personal Call Manager/Personal Communications Manager (PCM)
Personal Identification Number (PIN)
Public Switched Telephone Network (PSTN)
Registration Server (RS)
Service Control Point (SCP)
Service Management System (SMS)
Service Node/Intelligent Peripheral (SN/IP)
Service Switching Point (SSP)
Signaling System 7 (SS7)
Signaling Transfer Point (STP)
Terminating Attempt Trigger (TAT)
Transaction Capabilities Application Part (TCAP)
Transmission Control Protocol/Internet Protocol (TCP/IP)
World Wide Web (WWW)

3. Background Information

Currently, subscribers to call control services within the public switched telephone network (PSTN) are able to initiate and modify their services by calling a customer service representative or by interacting with an interactive voice response (IVR) system using a standard dual tone multi-frequency (DTMF) telephone device. These methods practically limit the number and types of services that can be provided to and modified by the subscribers because all information pertaining to the services is presented audibly. In addition, the potential market for subscribers to call control services is not fully exploited because of customer reluctance to use IVR systems.

There have been attempts to remedy the problems associated with IVR access to PSTN services. These attempts incorporate use of packet switched data networks, such as the Internet, to avoid conventional IVR systems and to streamline the initiation and modification functions. The current Internet based systems have several drawbacks, however, including the inability to ensure near real-time update of services and incompatibility with existing IVR implemnentations.

For many call control services, subscribers must submit requests to the customer service arm of their provider to initiate new services or update existing ones. The requests are implemented according to the provider's time line and discretion. It is difficult for the users to gauge when the service alteration will take effect. Also, because the current Internet based systems operate exclusively from the conventional IVR systems, i.e., the two systems cannot coexist, customers must select either the Internet interface or the IVR interface. Consequently, a customer who has selected the Internet interface, and who is without a PC and/or Internet access, is not able to make desired changes to his or her services through an IVR. The inability to implement desired changes is especially troublesome considering that users are often interested in altering some call services (e.g., call forwarding, paging, and caller ID) when they are away from their home or business telephone and PC.

An example of call control services provided over a packet switched data network is described in CHANG et al., U.S. Pat. No. 5,958,016, which teaches enabling advanced intelligence network (AIN) services over the World Wide Web (WWW or "the Web") through a provisioning system called the service management system (SMS). The service management system as disclosed in CHANG et al., however, does not ensure near real-time data update and is not compatible with existing IVR implementations. Therefore, the services presented via the Web are limited in functionality to the extent near real-time data updates are not guaranteed. For example, if a subscriber modifies an incoming call service, which blocks calls from selected phone numbers or classes of phone numbers, to add an allowed incoming phone number, the subscriber will not begin immediately to receive calls from the previously blocked phone number. Rather, the subscriber must wait an unspecified period of time for the service to be updated via the SMS. Also, as discussed above, the Web interface and the IVR interface are mutually exclusive.

One conventional call control service affected by these disadvantages is call forwarding. Currently, a subscriber must painstakingly interact with the service provider every time the subscriber wishes to forward incoming calls to a different telephone number. Generally, this process must be performed using an IVR system dependent on touch tones of a DTMF telephone. Although there are systems available that permit the subscriber access to a call forwarding service over the Internet, these systems are limited in functionality. For example, a conventional approach to implementing a call management system, including a call forwarding service, is presented in WOOD et al., U.S. Pat. No. 6,091, 808, which describes a telephone call management network that can be remotely accessed by customers using Web browsers over the Internet. One of the call services managed by the system disclosed in WOOD et al, is call forwarding. In WOOD et al. the customer is able to activate and deactivate call forwarding via a Web facility. However, there is no provision for accomplishing the same objective alternatively via a PSTN, only using a DTMF telephone.

Another disadvantage of conventional Internet accessible call forwarding systems is incompatibility with IVR access to the same call forwarding account. In other words, if the subscriber elects to have Internet accessible call forwarding, then the service cannot be routinely changed through existing IVR systems. Therefore, subscribers are not able to update the service unless they have immediate access to a PC and modem (or device capable of implementing Internet connections). In order to have both IVR and Internet access to control call forwarding, subscribers would have to open separate accounts, which is inconvenient and potentially difficult for the provider to reconcile, especially where the multiple accounts may send conflicting information regarding calls to be forwarded with respect to the same telephone number.

The present invention overcomes the problems associated with the prior art, as described below.

BRIEF DESCRIPTION OF THE DRAWINGS

The present invention is further described in the detailed description that follows, by reference to the noted plurality of drawings by way of non-limiting examples of embodiments of the present invention, in which like reference numerals represent similar parts throughout several views of the drawings, and in which:

FIG. 4 is an exemplary Web page to be displayed at the user's PC showing a change to the weekly scheduler, according to an aspect of the present invention;

FIG. 5 is an exemplary Web page to be displayed at the user's PC showing an updated weekly scheduler, according to an aspect of the present invention;

DETAILED DESCRIPTION OF EMBODIMENTS

Figure 1:
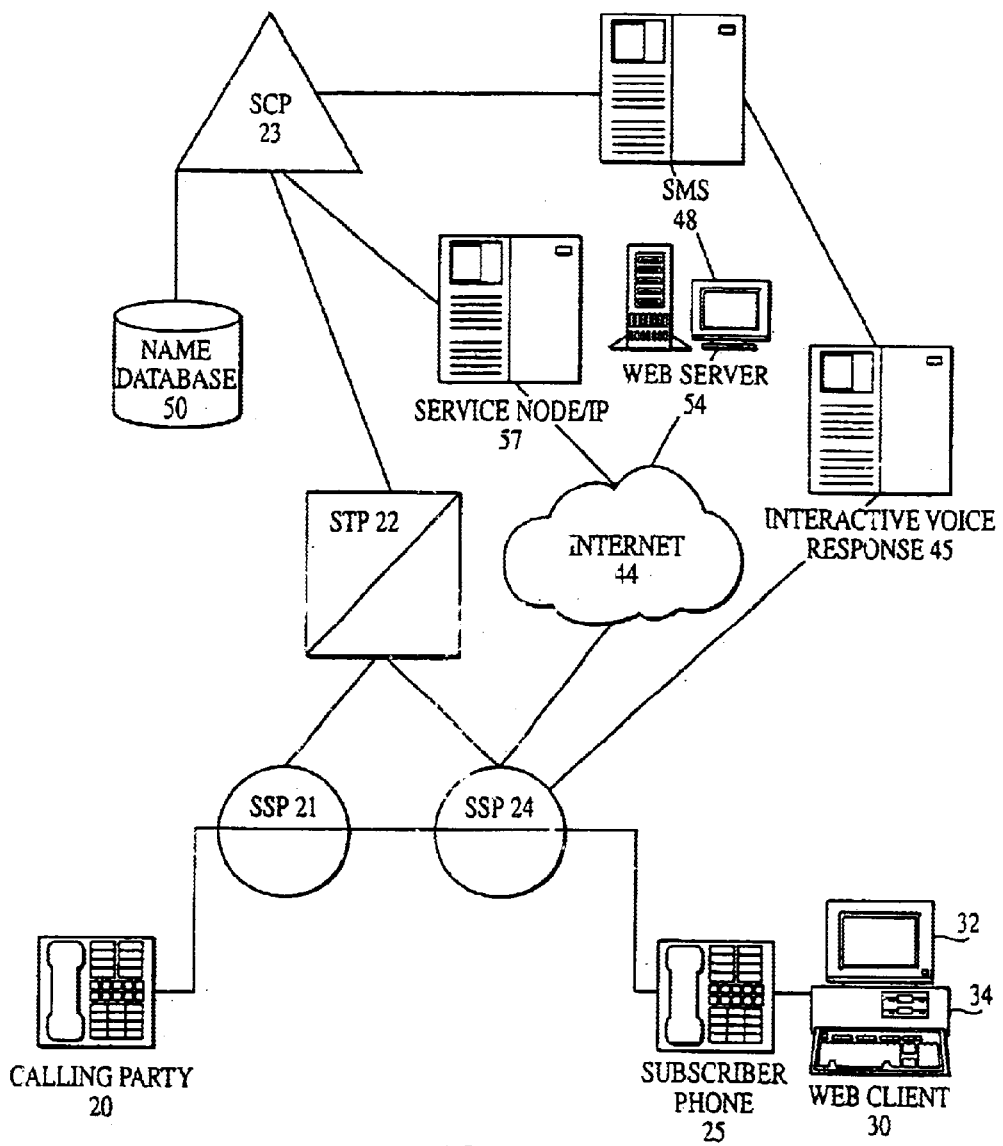
FIG. 1 is a block diagram showing an exemplary telecommunications network for Flexible Call Forwarding and Intelligent Call Forwarding, according to an aspect of the present invention.

The present invention relates to call forwarding services that resolve the previously identified problems, simply and efficiently. The call forwarding services include Flexible Call Forwarding and Intelligent Call Forwarding, which can be implemented individually or through a Personal Call Manager (PCM) system, along with other telecommunication services, such as personal directories, Internet Caller Identification (ICID), Incoming Call Manager (ICM) and Outgoing Call Control (OCC). The present invention is an AIN based system and method that allows a subscriber connected to a communications network, including the Internet and other packet switched type data networks, as well as through conventional IVR systems, to customize and execute the call forwarding services, with near real-time access to the service data.

In view of the above, the present invention through one or more of its various aspects and/or embodiments is presented to accomplish one or more objectives and advantages, such as those noted below.

An aspect of the present invention provides a system for implementing a call forwarding service that includes a service control point, which processes telephone calls in a public switched telecommunications network, an interactive voice response system and a service management system. The service control point includes a database of call forwarding service data that corresponds to the telephone number of a subscriber. The interactive voice response system is accessible by the subscriber from any dual tone multi-frequency telephone, through the public switched telecommunications network. The service management system is a communications interface between the service control point and the interactive voice response system. Simultaneously, the service management system operates as a communication interface between the service control point and a graphical user interface, through a is packet switched data network.

The subscriber receives the call forwarding service data and sends instructions to control the call forwarding service using either the dual tone multiple frequency telephone or the graphical user interface. The service management system receives the instructions to control the call forwarding service from the subscriber, from either the dual tone multi-frequency telephone or the graphical user interface, and communicates the instructions to the service control point, which updates the call forwarding service data in accordance with the instructions. The service control point then processes calls to the telephone number of the subscriber in accordance with the updated call forwarding service data. In an embodiment of the invention, the service control point processes calls in accordance with the instructions substantially contemporaneously with the subscriber sending the instructions to control the call forwarding service from the interactive voice response system or the graphical user interface.

Another aspect of the invention provides a system for implementing a call forwarding service that includes a service control point, which processes telephone calls in a public switched telecommunications network. The service control point has a database of call forwarding service data corresponding to a subscriber's telephone number. The call forwarding service data includes a call forwarding schedule.

The system also includes a Web server, through which the subscriber receives at a graphical user interface the call forwarding service data and sends instructions to control the call forwarding service through a packet switched data network. There is also an interactive voice response system, through which the subscriber receives at a dual tone multi-frequency telephone the call forwarding service data and sends instructions to control the call forwarding service through the public switched telecommunications network. The system also includes a service management system. The service management system functions as a communications interface between the service control point and the Web server, as well as a communications interface between the service control point and the interactive voice response system.

The subscriber receives the call forwarding service data and sends instructions to control the call forwarding schedule through the Web server. The control instructions can include setting an activation time and date, setting a deactivation time and date, and identifying a telephone number to which calls are to be forwarded. The subscriber can also receive the call forwarding service data, as well as send instructions to activate and deactivate the schedule, through either the Web server or the interactive voice response system. The service control point updates the subscriber's call forwarding schedule in accordance with the instructions. The service control point then processes incoming calls to the subscriber's telephone number in accordance with the updated call forwarding service data, including the instructions.

In another aspect of the present invention, the call forwarding service data also includes a priority screening list, which contains at least one priority telephone number. Whenever a call is placed from a telephone number on the priority screening list (i.e., a priority call) to the subscriber's telephone number, the call is selectively processed by the service control point. The selective processing includes forwarding the priority call to a telephone number different than the subscriber's telephone number, while a call from a telephone number not on the priority screening list (i.e., a non-priority call) is not forwarded. Alternatively, a non-priority call may be forwarded to an alternative telephone number, different than the subscriber's telephone number and different than the forwarding telephone number for the priority calls.

The subscriber receives the call forwarding service data and sends priority screening list instructions to control the priority screening list from the graphical user interface by way of the Web server. The priority screening list control instructions can include adding a new priority telephone number to the priority screening list, removing one of the priority telephone numbers from the priority screening list, setting an activation date and time and setting a deactivation date and time. The service control point then updates the call forwarding schedule in accordance with the priority screening list instructions and processes calls to the subscriber's telephone number of the subscriber in accordance with the updated call forwarding service data.

Another aspect of the present invention provides for a method of implementing a call forwarding service. The method includes storing at a service control point call forwarding service data for implementing the call forwarding service through multiple data networks. The call forwarding-service data includes call forwarding instructions and customized features. A service management system receives the call forwarding instructions from either a graphical user interface, through one of the multiple data networks, or an interactive voice response, through a second data network. The service management system is adapted to receive the call forwarding instructions from the graphical user interface and the interactive voice response, as selected by the subscriber.

The service management system then transmits the call forwarding instructions to the service control point through a third data network. The service control point updates the call forwarding service data with the call forwarding instructions. The service control point then receives a query identifying an incoming call from a calling party to the subscriber's telephone number. The incoming call is then processed in accordance with the call forwarding service data.

The customized features of the call forwarding service include at least one of a schedule and a screening list. The call forwarding instructions can include activating and deactivating the call forwarding service, activating and deactivating the schedule, activating and deactivating the screening list, and activating and deactivating an automatic shut-off function.

The method of providing a call forwarding service also includes receiving the customized features at the service management system from the graphical user interface, through one data network. The customized features have been created or edited by the subscriber at the graphical user interface. The service management system transmits the customized features to the service control point through the third data network. The service control point then updates the call forwarding service data in accordance with the customized features.

According to another aspect of the invention, a method for implementing a call forwarding service includes storing at a service control point and at a service management system call forwarding service data for implementation of the call forwarding service in a public switched telecommunications system. The service management system then transmits to a graphical user interface through a server, by way of a packet switched data network, the call forwarding service data. The service management system receives from the graphical user interface through the server, by way of the packet switched data network, updated call forwarding service data. The updated call forwarding service data includes features that have been created or edited by the subscriber at the graphical user.

The service management system stores the updated call forwarding service data and transmits the updated call forwarding service data to the service control point. The service control point stores the updated call forwarding service data for implementing the call forwarding service in response to incoming calls to the subscriber's telephone number. In this method for implementing the call forwarding serve, the service management system is a communications interface between the service control point and the graphical user interface, by way of the packet switched data network. The service management system is also a communications interface between the service control point and an interactive voice response system.

The method further includes transmitting the updated call forwarding service data from the service management system to either the graphical user interface or the interactive voice response system for updating by the subscriber. The service management system then receives from the graphical user interface or the interactive voice response system call forwarding instructions. The call forwarding instructions may include an activation command and a de-activation command corresponding to the updated call forwarding service data. The service management system transmits the call forwarding instructions to the service control point, which stores the call forwarding instructions.

A terminating switch then receives an incoming call from a calling party to the subscriber's telephone number. The terminating switch suspends the incoming call and sends a query. The service control point receives the query from the terminating switch, which identifies the incoming call, including the telephone number of the calling party and the telephone number of the subscriber. The service control point determines from the call forwarding instructions whether the call forwarding service is active. If the call forwarding service is active, the service control point transmits to the terminating switch terminating instructions according to the call forwarding instructions and the updated call forwarding service data. The terminating instructions include the telephone number where the incoming call is to be terminated. If the call forwarding service is not active, the service control point transmits to the terminating switch terminating instructions to terminate the incoming call to the subscriber's telephone number. The terminating switch then terminates the incoming call according to the terminating instructions.

The updated call forwarding service data can include a call forwarding schedule and a priority screening list. The call forwarding instructions can include a command to activate the call forwarding service, a command to activate the call forwarding schedule, a command to activate the priority screening list and an automatic shut-off command.

Another aspect of the present invention provides a system for implementing a call forwarding service, as well as a system for notifying an on-line subscriber of an incoming telephone call, which includes a service control point for processing telephone calls in a public switched telecommunications network. The service control point includes a database of call forwarding service data corresponding to the subscriber's telephone number. The system also includes a registration server, which stores an on-line status of the subscriber who is located at a Web client connected to a packet switched data network, and a server, which functions as a communications interface between the service control point and the Web client. The Web client includes a graphical user interface. The on-line status of the subscriber is received by the registration server through the packet switched data network. The registration server communicates the on-line status to the service control point.

The system further includes a service management system, which functions as a communications interface between the service control point and an interactive voice response system. The service management system simultaneously functions as another communications interface between the service control point and the Web client. The database of call forwarding service data corresponding to the subscriber's telephone number is accessible through the service management system from the interactive voice response system and the Web client.

When processing an incoming call, the service control point notifies the subscriber, by way of the server, whenever the registration server indicates that the subscriber is on-line. The service control point then processes the incoming call according to on-line instructions sent from the subscriber to the service control point by way of the server. The subscriber's on-line instructions can include accepting the incoming call, forwarding the incoming call to an alternative telephone number and processing the incoming call according to the call forwarding service data.

The interactive voice response system is accessible by the subscriber from a dual tone multi-frequency telephone through the public switched telecommunications network. The service management system receives control instructions to control the call forwarding service through either a dual tone multiple frequency telephone or the Web client, and forwards the control instructions to the service control point. The service control point then updates the call forwarding service data in accordance with the control instructions and processes the incoming call in accordance with the updated call forwarding service data, whenever the registration server indicates to the service control point that the subscriber is not on-line. The service control point begins processing incoming calls in accordance with the control instructions substantially contemporaneously with the subscriber sending the control instructions to control the call forwarding service from the interactive voice response system or the Web client.

Another aspect of the invention provides a system for implementing a call forwarding service that includes a service control point, which processes telephone calls in a public switched telecommunications network. The service control point has a database of call forwarding service data corresponding to a telephone number of the subscriber. The system also includes a service node, which determines an on-line status of the subscriber, who is located at a Web client. The Web client is connected to a packet switched data network and includes a graphical user interface. The service node receives the on-line status of the Web client through the packet switched data network and communicates the status to the service control point.

The call forwarding system also includes a service management system, which serves as a communications interface between the service control point and an interactive voice response system. Simultaneously, the service management system serves as a communications interface between the service control point and the Web client. The database of call forwarding service data corresponding to the subscriber's telephone number is accessible through the service management system from the interactive voice response system and the Web client.

The service control point notifies the subscriber by way of the service node of an incoming call, whenever the service control point has determined that the subscriber is on-line. The service control point then processes the incoming call according to on-line instructions sent from the subscriber by way of the service node.

The interactive voice response system is accessible by the subscriber from a dual tone multi-frequency telephone through the public switched telecommunications network. The service management system receives control instructions to control the call forwarding service, by way of either the dual tone multiple frequency telephone or the Web client, and forwards the control instructions to the service control point. The service control point updates the call forwarding service data in accordance with the control instructions. The service control point then processes the incoming call in accordance with the updated call forwarding service data when the service node has indicated to the service control point that the subscriber is not on-line. The service control point processes the incoming call in accordance with the control instructions substantially contemporaneously with the subscriber sending the control instructions to control the call forwarding service from the interactive voice response system or the Web client.

In another aspect of the present invention, a system for implementing a subscriber's call forwarding service, when the subscriber is on-line on a packet switched data network, includes a service control point, which processes telephone calls in a public switched telecommunications network. The service control point includes a database of call forwarding service data corresponding to the subscriber's telephone number. The system also includes a graphical user interface, connected to the packet switched data network, by which the subscriber receives the call forwarding service data and sends control instructions to control the call forwarding service. There is an interactive voice response system, connected to the public switched telecommunications network, by which the subscriber receives the call forwarding service data and sends control instructions to control the call forwarding service through the interactive voice response system. A service node is connected to the graphical user interface via the packet switched data network, which records the on-line status of the subscriber whenever the subscriber is on-line at the graphical user interface. The service transmits the on-line status to the service control point.

The system also includes a service management system, which provides a communications interface between the service control point and the graphical user interface for accessing the database of call forwarding service data. The service management system also provides a communications interface between the service control point and the interactive voice response system for accessing the database of call forwarding service data. When the service control point indicates that the subscriber is on-line, by information received from the service node, the service control point sends call information about an incoming call to the service node, which forwards the call information to the graphical user interface by way of the packet switched data network. The service node receives the subscriber's on-line instructions from the graphical user interface, by way of the packet switched data network, and forwards the on-line instructions to the service control point to control the call forwarding service. The service control point processes the incoming call in accordance with the call forwarding service data or the on-line instructions. The on-line instructions sent by the subscriber to control the call forwarding service through the packet switched data network can include accepting the incoming call, processing the incoming call in accordance with the call forwarding service data and forwarding the incoming call to a forwarding telephone number. Further, the call forwarding service data can include a priority screening list, having at least one priority telephone number, and a rejection screening list, having at least one rejection telephone number. A call placed from a telephone number on the priority screening list (i.e., a priority call) to the subscriber's telephone number is selectively processed by the service control point. The selective processing includes forwarding the priority call to a priority forwarding telephone number, which is different than the subscriber's telephone number. A call placed from a telephone number on the rejection screening list (i.e., a rejected call) to the subscriber's telephone number is subject to rejection processing by the service control point. The rejection processing includes forwarding the priority call to a rejection telephone number, which different from the subscriber's telephone number and different from the telephone numbers on the priority screening list.

The call forwarding service data can further include a schedule, which includes a table of at least one date and time period, during which the call forwarding service is active. The subscriber has pre-identified the date and time period. During the preidentified date and time period when the call forwarding service is active, the service control point processes incoming calls in accordance with the call forwarding service data.

Another aspect of the present invention includes storing at a service control point call forwarding service data for implementing the call forwarding service. The call forwarding service data includes call forwarding instructions and customized features. The service control point receives from a terminating switch a query identifying an incoming call, including a telephone number of the calling party and the subscriber's telephone number. The service control point determines whether the call forwarding service is active.

If the call forwarding service is active, the service control point then determines whether the subscriber is on-line. If the subscriber is on-line, the service control point notifies the subscriber at a graphical user interface of the incoming call. The service control point then receives call processing instructions from the subscriber and processes the incoming telephone call according to the call processing instructions. If the subscriber is not on-line, the service control point transmits to the terminating switch terminating instructions according to the call forwarding service data stored at the service control point. The terminating instructions include the telephone number where the incoming call is to be terminated.

If the call forwarding service is not active, the service control point transmits to the terminating switch terminating instructions to terminate the incoming call to the subscriber's telephone number. The incoming call is then terminated by the switch according to the terminating instructions.

Before the service control point stores the call forwarding service data for implementing the call forwarding service, it receives the call forwarding instructions through a service management system from either the graphical user interface or an interactive voice response system. The service management system is configured to receive the call forwarding instructions through both the graphical user interface and the interactive voice response system.

The customized features of the call forwarding service can include a schedule, a priority screening list and a rejection screening list. The call forwarding instructions can include activating or deactivating the call forwarding service, activating or deactivating the schedule, activating or deactivating the priority screening list, and activating or deactivating the rejection screening list. The service-management system receives the customized features from the graphical user interface, which have been created or edited by the subscriber at the graphical user interface. The customized features are then transmitted from the service management system to the service control point, which updates the call forwarding service data in accordance with the customized features.

Another aspect of the present invention includes storing at a service control point call forwarding service data for implementation of the call forwarding service in a public switched telecommunications network. The service control point receives from a service management system call forwarding instructions, which include at least one of an activation command and a de-activation command corresponding to the call forwarding service data. The service management system receives the call forwarding instructions from at least one of a graphical user interface though a packet switched data network and an interactive voice response system through the public switched telecommunications network.

An incoming call, from a calling party to the subscriber's telephone number, is received at a terminating switch. The terminating switch suspends the incoming call. The service control point then receives a query from the terminating switch, which identifies the incoming call. The identification of the incoming call includes the telephone number of the calling party and the telephone number of the subscriber. The service control point determines from the call forwarding instructions whether the call forwarding service is active.

If the call forwarding service is active, the service control point determines whether the subscriber is on-line. If the subscriber is on-line, the subscriber is notified at the graphical user interface, through the packet switched data network, of the incoming call. The service control point receives call handling instructions from the graphical user interface through the packet switched data network. The call handling instructions include at least one of accepting the incoming call, processing the incoming call according to the call forwarding service data and forwarding the incoming call to a forwarding telephone number. The service control point transmits terminating instructions to the terminating switch according to the call handling instructions. If the subscriber is not on-line, the service control point transmits to the terminating switch terminating instructions according to the call forwarding service data. The terminating instructions include the telephone number where the incoming call is to be terminated. If the call forwarding service is not active, the service control point transmits to the terminating switch terminating instructions to terminate the incoming call to the telephone number of the subscriber. The incoming call is terminated from the terminating switch according to the terminating instructions.

The various aspects and embodiments of the present invention are described in detail below.

Flexible Call Forwarding

The present invention is an AIN based system and method that allows a subscriber connected to a communications network, including the Internet and other packet switched type data networks, as well as through conventional WVR systems, to customize and execute call forwarding services with near real-time access to the service data. FIG. 1 illustrates an exemplary telecommunications network in association with the present invention, for implementing both Flexible Call Forwarding and Intelligent Call Forwarding. The network includes a calling party 20, an originating service switching point (SSP) 21, a terminating SSP 24 and a subscriber's telephone 25 (i.e., the call destination or the called party). The network also includes a signaling transfer point (STP) 22, a service control point (SCP) 23, an interactive voice response (IVR) 45 and a service node/ intelligent peripheral (SN/IP) 57. The network also provides a name database 50 connected to the SCP 23, which can be, for example a line information database (LIDB).

By way of example, the SCP 23 is implemented with the Bellcore Integrated Service Control Point, loaded with ISCP software Version 4.4 (or higher), available from Telecordia, Murray Hill, N.J. In an alternative embodiment of the invention, the SCP 23 may be a Lucent Advantage SCP, with software release 94, available from Lucent Technologies, Inc. An exemplary IVR 45 is available under the trademark CONVERSANT System for IVR, Version 6.0, Update 1, provided by Lucent Technologies, Inc. The network alternatively incorporates any compatible stand-alone IVR or advanced intelligence network-intelligent peripheral (AIN-IP or intelligent peripheral) providing an IVR. The SN/IP 57 is, for example, a Compact Service Node or an Enhanced Media Resource Server (eMRS) developed by Lucent Technologies, Inc. (The SN/IP 57 is utilized in the Intelligent Call Forwarding aspects of the invention, as discussed below.)

The SSP 24 is the terminating central office (CO) for the subscriber phone 25 and the SSP 21 is the originating CO for the calling party 20. However, the terminating CO and the originating CO may be the same. The SSPs 21 and 24 may include, for example, 1AESS or 5ESS switches manufactured by Lucent Technologies, Inc.; DMS-100 switches manufactured by Nortel Networks Corporation (Nortel); AXE-10 switches manufactured by Telefonaktiebolaget LM Ericsson, or EWSD switches available from Siemens Information and Communication Networks, Inc. The switches may utilize an AIN Release 0.1 protocol.

The call service logic of the present invention may be upgraded to accommodate future AIN releases and protocols and future trigger types. Specifications of AIN Release 0.1 SSPs may be found in Bellcore TR-NWT-001285, Switch-Service Control Point Application Protocol Interface Generic Requirements, and Telecordia Technical Reference TR-NWT-001284, AIN Switching Systems Generic Requirements, the disclosures of which are expressly incorporated by reference herein in their entireties.

A data network of the invention includes a Web client 30, a Web server 54 and a service management system (SMS) 48, connectable through the Internet 44. The Web client 30 includes a personal computer (PC) 32, i.e., a graphical user interface (GUI), operating client software 34, an example of which is ICW Client, available from Southwestern Bell Telephone Company. The SMS 48 is capable of transmitting and receiving information to and from the SCP 23. Alternatively, the client software 34 can be run at the Web server 54. The SMS 48 provides the subscriber interface to the SCP 23 from both the subscriber phone 25 (or other DTMF telephone) through IVR 45 and the Web client 30 (or other Internet compatible GUI) through the Web server 54, via the Internet 44. The SMS 48 also maintains and distributes all subscriber specific data for the Flexible Call Forwarding service.

The Web client 30 incorporates a Web browser, such as Microsoft Internet Explorer, available from Microsoft Corporation, or Netscape Navigator, available from Netscape Communications Corporation. In one embodiment, the Web client 30 is implemented with an IBM Pentium based PC, running the Linux operating system, available from, for example, Free Software Foundation, Inc., or the Microsoft Windows operating system, and running the Microsoft Internet Explorer, Netscape Navigator or HotJava, available from Sun Microsystems, Inc., Web browser software. An embodiment of the invention includes the Web server 54 running the Linux or Microsoft Windows operating system and the Apache Web server software, available from the Apache Software Foundation, or the Jigsaw Web server software, available from World Wide Web Consortium (W3C).

Generally, Flexible Call Forwarding enables a subscriber to direct incoming calls to alternative telephone numbers. In an embodiment, Flexible Call Forwarding further includes several optional features that the subscriber customizes. Among these features is an "automatic-off" function, which is a preset day and time when Flexible Call Forwarding will deactivate without further instruction from the subscriber. Also, there is a priority screening list, in which the subscriber designates priority names and telephone numbers. When the priority screening list is activated, only calls received from the telephone numbers on the list are forwarded. Flexible Call Forwarding also includes a weekly scheduler, in an embodiment, which enables the subscriber to schedule up to a week in advance the time when the service is on or off, the associated telephone numbers to which calls are forwarded and whether the priority screening list is on or off. Other embodiments allow scheduling further in advance.

A subscriber can modify the call forwarding service status via two methods. First, from any DTMF telephone, the subscriber dials a toll-free number, e.g., an 800 number, to access the IVR 45. The subscriber is prompted to enter an account number, along with a personal identification number (PIN), further discussed below. The subscriber then has the ability to change the PIN, change the forwarding phone number, toggle the service on and off, specify a day and time when the service will be deactivated and activate or deactivate the priority screening list and the preset weekly schedule. Second, the subscriber has the option to access the Flexible Call Forwarding service using a GUI via the Internet 44. Over the Web connection, the subscriber is able to implement all of the IVR functions identified above, as well as build the priority screening list and design the weekly scheduler.

In order to implement Flexible Call Forwarding, a terminating attempt trigger (TAT) is set in the terminating SSP 24. The trigger launches when a call terminates to the subscriber's phone line 25. Therefore, when the subscriber receives a call, the call is suspended at the terminating SSP 24 and a termination attempt query is sent to the SCP 23 for instructions via the STP 22. Upon receiving the query, the SCP 23 verifies whether the terminating line 25 subscribes to the Flexible Call Forwarding service. If a Flexible Call Forwarding subscription is found, the service logic at the SCP 23 determines the status of the call forwarding service. In other words, it determines whether Flexible Call Forwarding is on or off and whether various features have been activated. After making these determinations, the SCP 23 instructs the SSP 24 where to send the suspended call, i.e., whether to terminate the call to the subscriber's phone 25 or to forward the call to an alternative telephone number previously specified by the subscriber.

As stated above, Flexible Call Forwarding may include an automatic-off function, a priority screening list and a scheduler. These exemplary features can be routinely and efficiently customized by the subscriber without involvement of the account provider, which conventionally is time consuming and inconvenient.

The automatic-off function enables the subscriber to designate a time for Flexible Call Forwarding to deactivate automatically once the service has been activated. The automatic-off function option is presented to the subscriber each time lo Flexible Call Forwarding is activated. If an off time is entered, the service stops forwarding calls (i.e., the calls are terminated at the subscriber's phone 25) after the designated time. If no off time is entered, the call forwarding service remains active until the subscriber instructs otherwise. If the subscriber elects to activate the weekly scheduler, the automatic-off function is disabled to prevent interference with the scheduler.

The priority screening list is available for use at the subscriber's option. The list contains the names and telephone numbers of priority callers, as designated by the subscriber. In an embodiment, if the priority screening list has been activated, the SCP 23 will only forward calls originating from phone numbers included in the list. All other calls are terminated at the subscriber's phone 25. The priority screening list is implemented through a screening table, which is stored at the SCP 23 and the SMS 48 and is accessible by the subscriber via the Internet 44, as discussed in detail below.

The scheduler provides a weekly schedule of times for activating and deactivating Flexible Call Forwarding, as well as any features associated with Flexible Call Forwarding. For example, the scheduler indicates the times at which the priority screening list is on or off, which times do not necessarily correspond to the Flexible Call Forwarding service activation. The scheduler also designates the telephone numbers to which calls are to be forwarded corresponding to the various on and off times. The scheduler is implemented through a time of day and day of week ("tod/dow") table, which is stored at the SCP 23 and accessible by the subscriber by the Internet 44, discussed in detail below.

In another embodiment, a rejection screening list feature is available. This feature is related to the priority screening list feature, except the rejection screening list includes names and phone numbers which are to be rejected. Calls from numbers on the rejection screening list are terminated to the subscriber's number (i.e., not forwarded) or forwarded to an alternative number designated for rejected calls.

Figure 2:
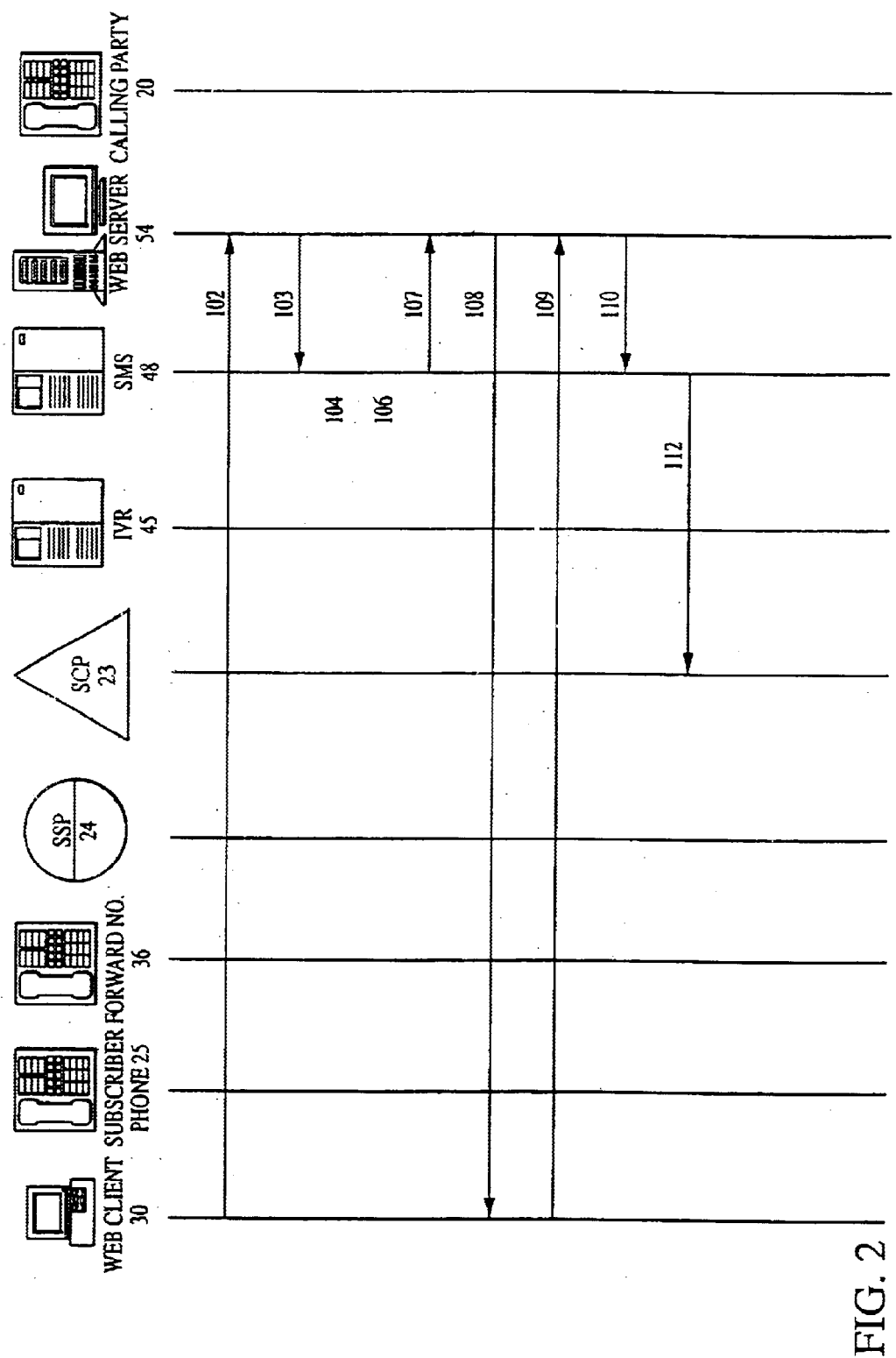
FIG. 2 is an exemplary call flow diagram in which the subscriber accesses the Flexible Call Forwarding data via the Internet, according to an aspect of the present invention.

A subscriber's exemplary interaction with Flexible Call Forwarding is depicted in the call flow diagram of FIG. 2. The subscriber is able to access the Flexible Call Forwarding service via an IVR or the Internet, thereby greatly increasing flexibility and convenience. FIG. 2 depicts interaction with Flexible Call Forwarding over the Internet, using a GUI, for accessing and updating the more complicated procedures for customizing the service, including building the priority screening lists and weekly schedules, discussed above. In order for the subscriber to access Flexible Call Forwarding via the Internet 44, the subscriber accesses a unique uniform resource locator (URL) associated with the service provider. The URL is an address and identifies the appropriate protocol for communicating with the service over the Web. When the subscriber accesses the Internet, the Web server 54 provides Flexible Call Forwarding Web screens, transmitted from the SMS 48, examples of which are shown in FIGS. 3–8. In an embodiment, an alternative manner for accessing the Flexible Call Forwarding data via the Internet is through the PCM service, described below.

At step 102 of FIG. 2, the subscriber accesses Flexible Call Forwarding data by connecting from the Web client 30 to the Web server 54 through the Internet 44. The Web server 54 then connects to the SMS 48, which stores and updates the Flexible Call Forwarding data, as well as authentication data, at step 103. The Web server 54 receives HTTP messages from the subscriber Web client 30 and provides HTML Web pages in response to the subscriber's input. The Web pages relate to the subscriber's Flexible Call Forwarding service, as indicated by the SMS 48.

Once connected to the SMS 48 via the Web server 52, the user must provide authentication information to access the corresponding account. The SMS 48 performs the authentication at step 104. The SMS 48 queries the subscriber for an account number and associated password, which confirms the user's identity. The SMS 48 then retrieves the account number and associated password information to confirm that the subscriber is an authorized user. After successful authentication, the SMS 48 retrieves at step 106 the current service data for the Flexible Call Forwarding service, including current priority screening lists and schedules, and makes the service data available to the subscriber. The SMS 48 forwards the service data information to the Web server 54 at step 107, which forwards the data to Web client 30 via the Internet 44 at step 108.

The subscriber is presented with a number of options for each telephone number in the account. For example, the subscriber can change the PIN, toggle the various Flexible Call Forwarding features on or off, set the automatic-off function day and time, and activate or deactivate the priority screening list and the weekly Web schedule. In addition, the subscriber can build or edit the priority screening lists and weekly schedules.

Figure 3:
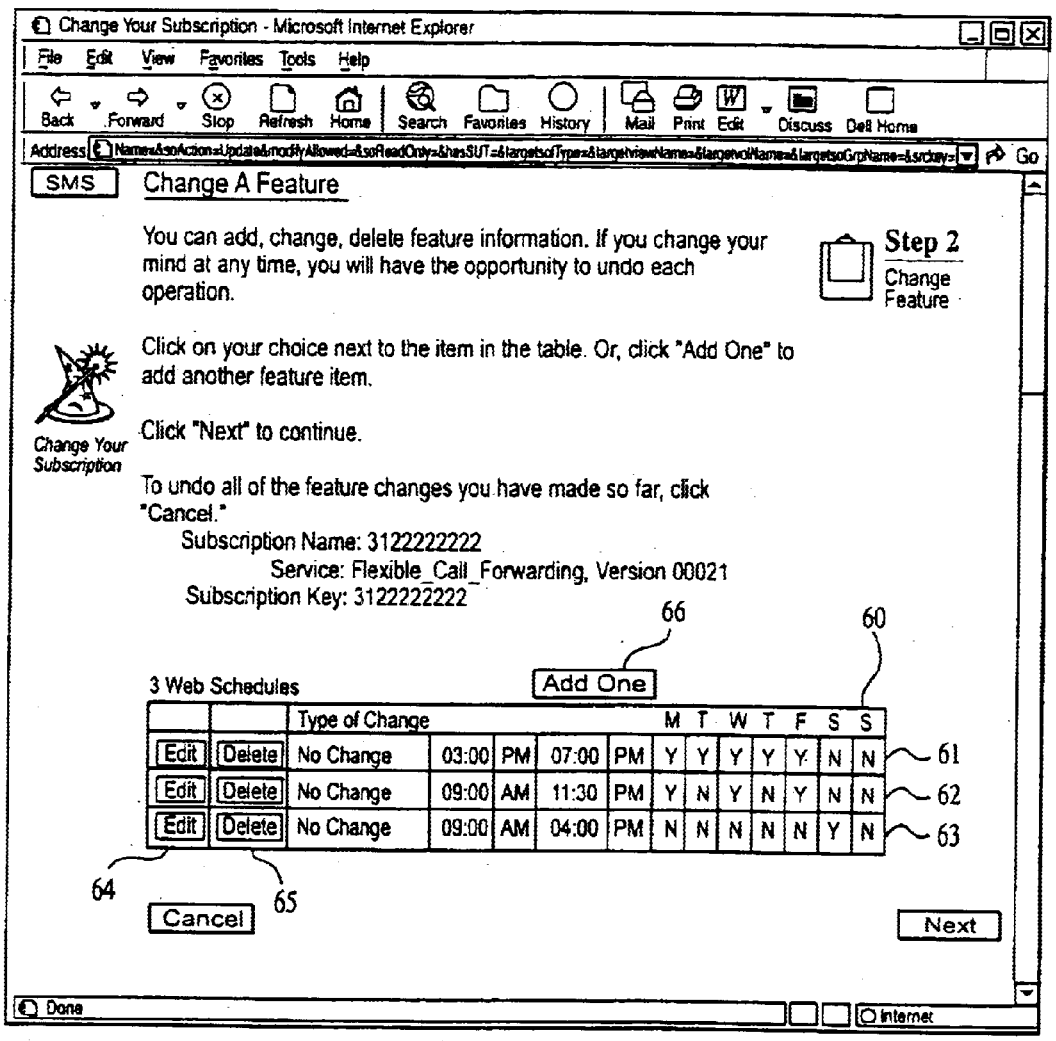
FIG. 3 is an exemplary Web page to be displayed at the user's PC showing a weekly scheduler, according to an aspect of the present invention.

For example, FIG. 3 depicts an exemplary Web page, displayed on the monitor of PC 32 at the Web client 30, showing the weekly scheduler according to an embodiment of the invention. The scheduling table 60 contains data entries from left to right for a Flexible Call Forwarding on-time, off-time and applicable days of the week, which are indicted by MTWTFSS (i.e., Monday, Tuesday, Wednesday, Thursday, Friday, Saturday and Sunday). The first entry 61, for instance, shows an on-time of 3:00 p.m. and an off-time of 7:00 p.m. This period of Flexible Call Forwarding activation is applied Monday through Friday. Similarly, the second activation period 62 is set for 9:00 a.m. to 11:30 p.m. on Monday, Wednesday and Friday. The third activation period 63 is scheduled for Saturday, only, beginning at 9:00 a.m. and ending at 4:00 p.m. In one embodiment, the days and times provided in the scheduler table must be within one week of the time the subscriber populates the table, although alternate embodiments are not limited to the one week schedule. The subscriber can easily.edit the weekly schedule, in real-time, by simply selecting the Edit button or the Delete button, included in columns 64 and 65, respectively.

Figure 4:
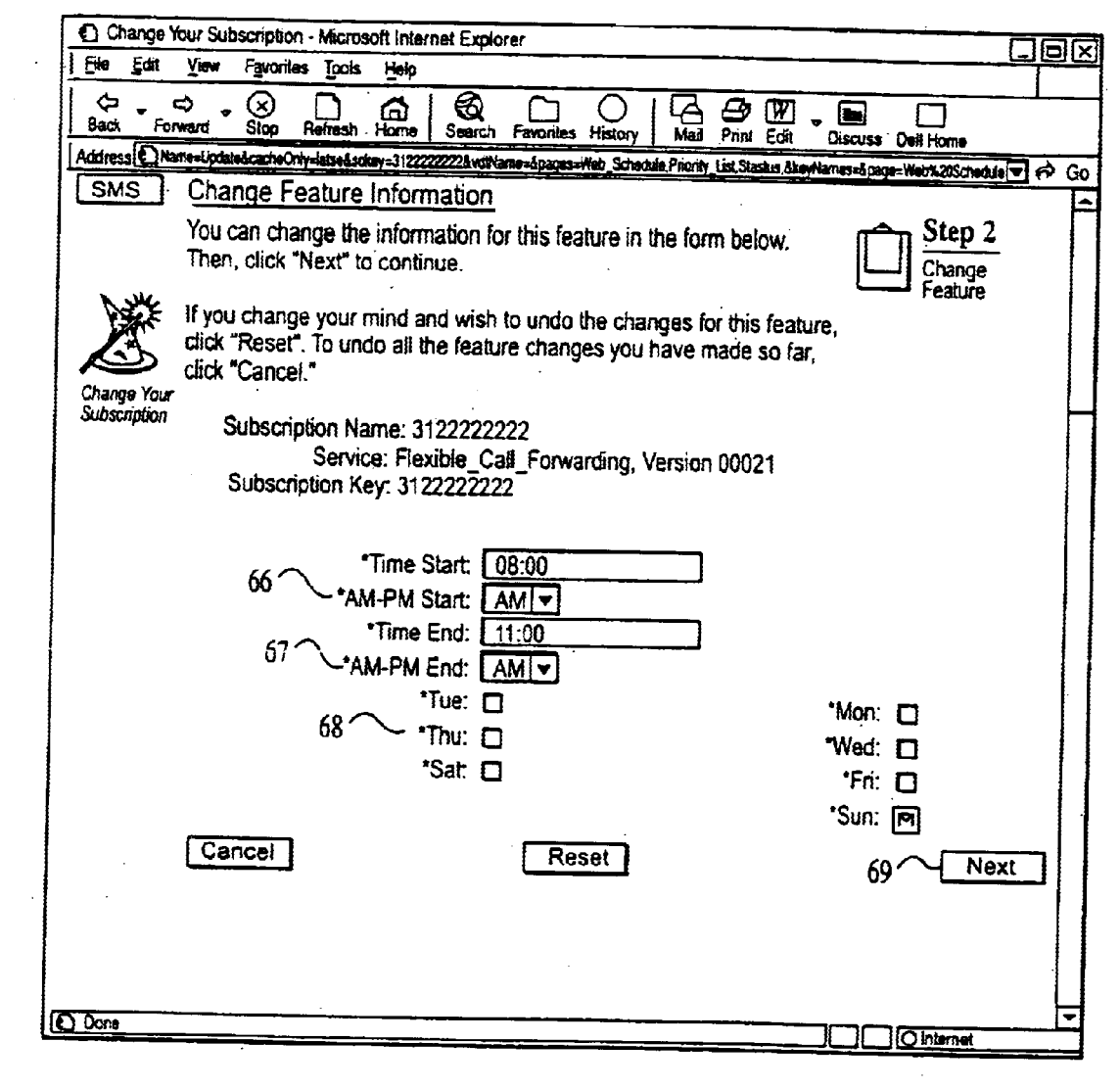
Figure 5:
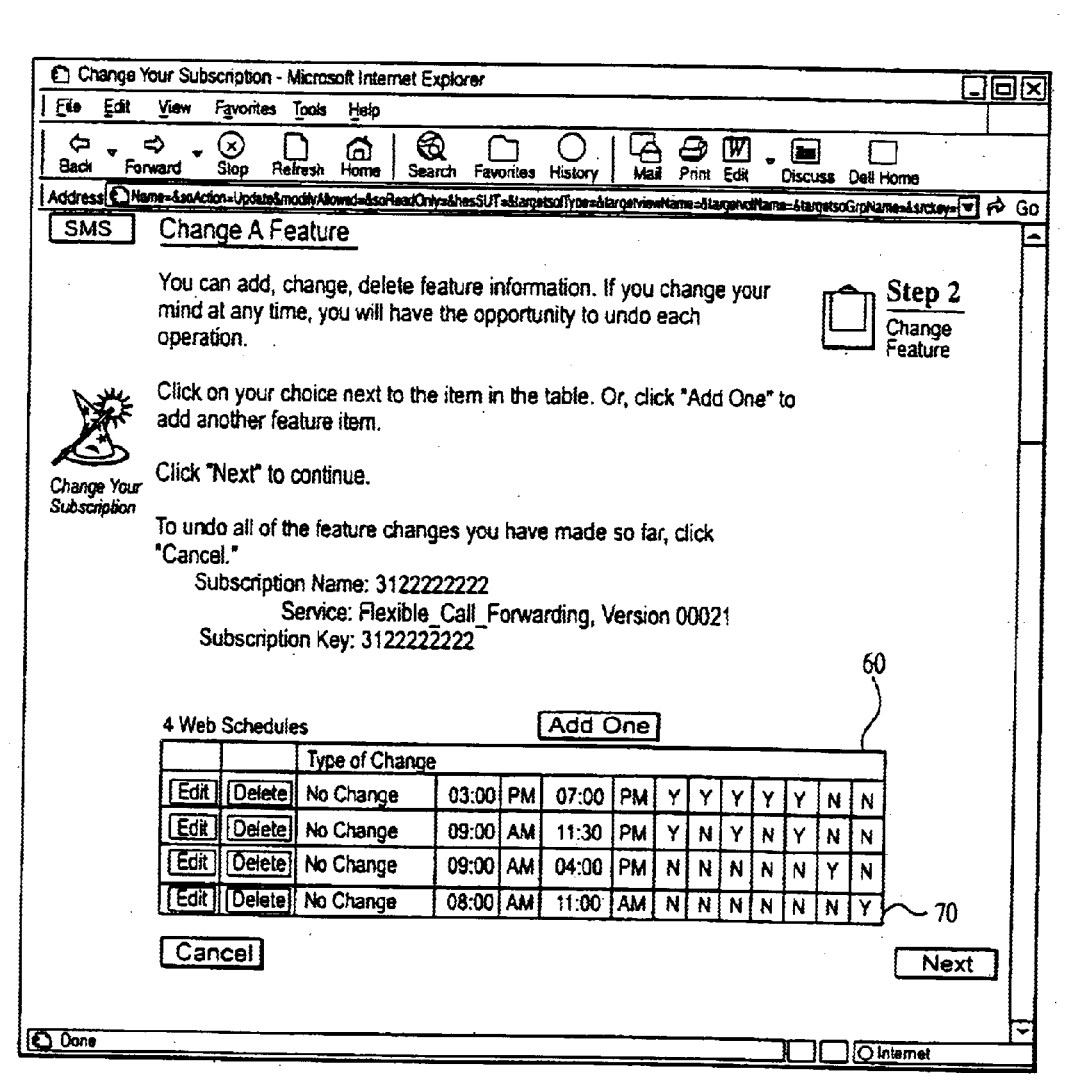

If the subscriber desires to build the schedule by adding another activation period, he or she simply selects the Add One button 66, located directly above scheduling table 60. Upon selecting the Add One button, the subscriber is presented with a new Web page at Web client 30, an example of which is shown in FIG. 4. The subscriber fills in the blank data fields to indicate the desired additional activation period. The Time Start field 66 is the on-time for Flexible Call Forwarding, including an AM or a PM designation. In this example, the subscriber chooses an on-time of 8:00 a.m. Likewise, the subscriber specifies the Time End 67, which is 11:00 a.m. The subscriber then assigns the days of the week to which the new activation period applies by simply checking the corresponding boxes 68. In this case, the Flexible Call Forwarding period of 8:00 a.m. to 11:00 a.m. will automatically activate on Sunday. The subscriber enters the new activation period by choosing the Next indication 69. The SMS 48 responds by sending the updated weekly schedule screen to the Web client 30, an example of which is shown in FIG. 5. The new activation period 70 is now listed in scheduling table 60, acknowledging to the subscriber that the instructions have been received and implemented.

Figure 6:
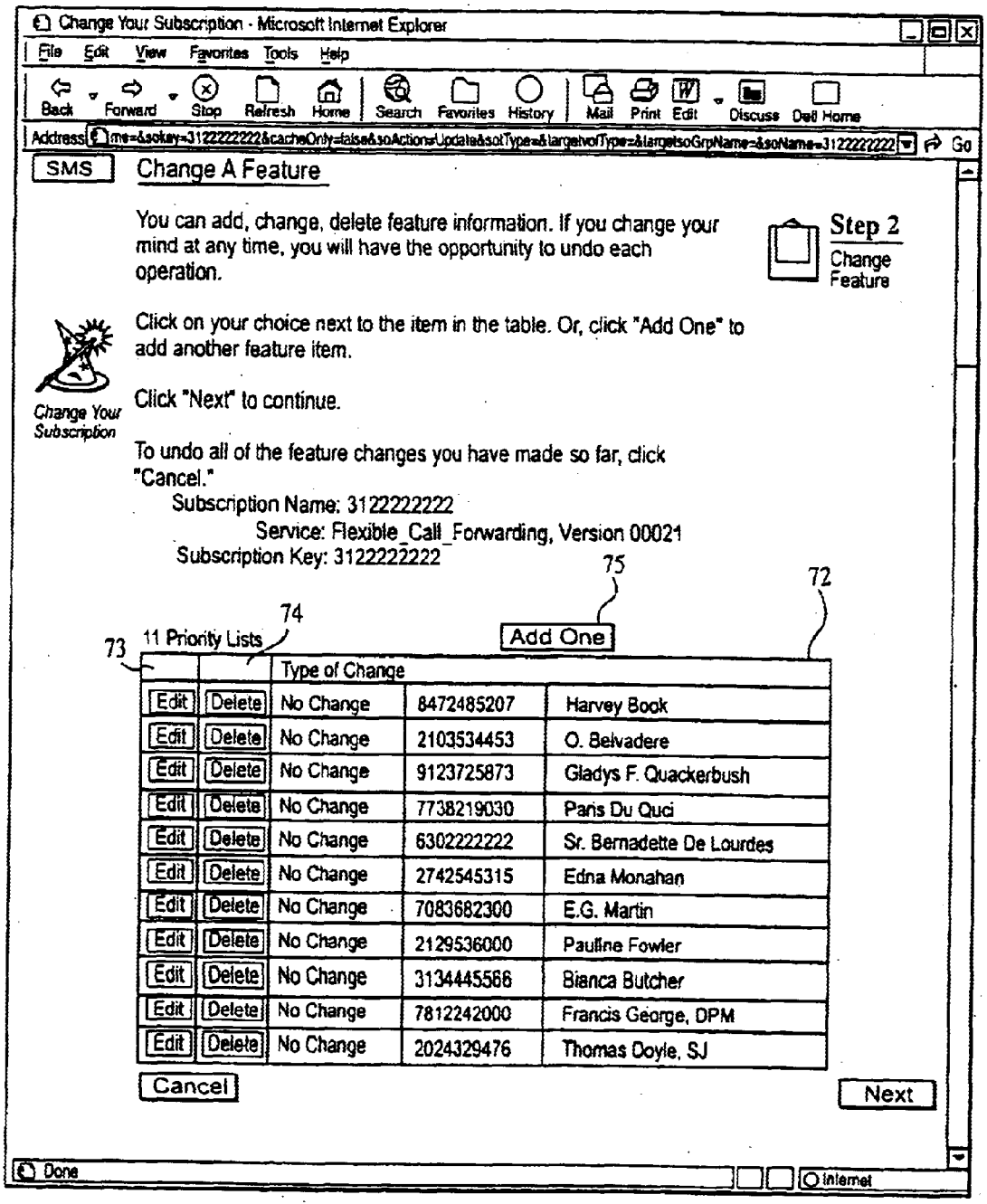
FIG. 6 is an exemplary Web page to be displayed at the user's PC showing a priority screening list, according to an aspect of the present invention.

FIG. 6 shows an exemplary Web page for the priority screening list, according to an embodiment of the invention. The priority screening list 72 contains data entries for priority telephone numbers and corresponding names. As described in detail below, the SMS 48 stores these telephone numbers and names, and forwards the telephone numbers to the SCP 23. Whenever the priority screening list is active, only telephone calls from the numbers on the list will be forwarded according to the subscriber's Flexible Call Forwarding instructions. Edits and additions to the priority screening list 72 are implemented substantially the same to the weekly schedule edits and additions. An existing entry can be edited or deleted using the Edit buttons 73 and the Delete buttons 74, respectively. Selecting the Add One button 75 causes the SMS 48 to send another Web page dedicated to building the priority screening list. The subscriber populates the fields for telephone number and name, selects Next and is returned to the priority screening Web page of FIG. 6, which would include the additional entry in list 72.

Figure 7:
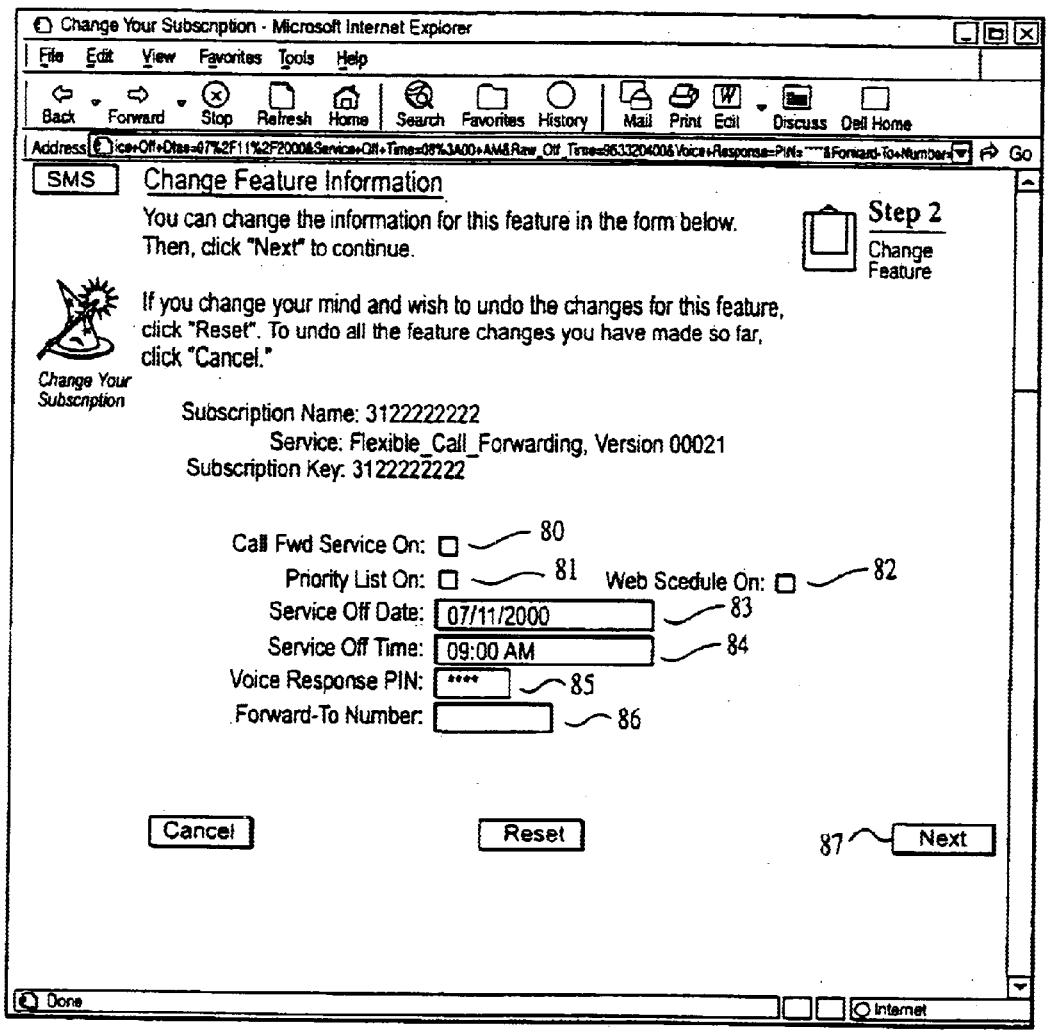
FIG. 7 is an exemplary Web page to be displayed at the user's PC showing activation and scheduling data for Flexible Call Forwarding, according to an aspect of the present invention.

In addition to editing and building the weekly schedule and the priority screening list, the subscriber can specify the call forwarding times and service to be applied. FIG. 7 shows an exemplary Web page presented to the Web client 30 by the SMS 48 for basic Flexible Call Forwarding implementation. Box 80 is for indicating whether Flexible Call Forwarding is ON or OFF. A check mark placed in box 80 activates the service immediately upon pressing the Next button 87. Boxes 81 and 82 relate to the priority screening list and the weekly schedule, respectively. By checking the boxes, the subscriber indicates a desire to activate the respective features (which previously have been built and/or edited).

Boxes 83 and 84 of FIG. 7 pertain to the automatic-off function, discussed above. The boxes 83 and 84 provide fields for the off date and time, respectively, to stop forwarding calls placed to the subscriber phone 25 once Flexible Call Forwarding has been activated, indicted at box 80. This off date and time is over-ridden by the weekly schedule of FIGS. 3 and 5, so that the automatic-off function will not interrupt the customized scheduling featured set up by the subscriber.

The Web page of FIG. 7 also requests a voice response PIN at box 85. This is the same PIN that the user uses to access Flexible Call Forwarding by telephone, using IVR 45. In an embodiment, the PIN may also be used in lieu of a password to initially access the Flexible Call Forwarding data over the Web.

FIG. 7 also displays a forward-to-number box 86, which is the telephone number to which incoming calls are forwarded. In an embodiment, this is limited to a ten-digit number, although alternative embodiments may include additional digits to accommodate international calls. Further, in the depicted embodiment of the invention, Flexible Call Forwarding allows for one number to which the calls are forwarded any time the service is active, including activation through the weekly scheduler. In alternative embodiments, the weekly scheduler includes a forward-to number column in the weekly schedule table 60, so that the subscriber can redirect incoming calls to alternative forwarding numbers at different days and times.

Figure 8:
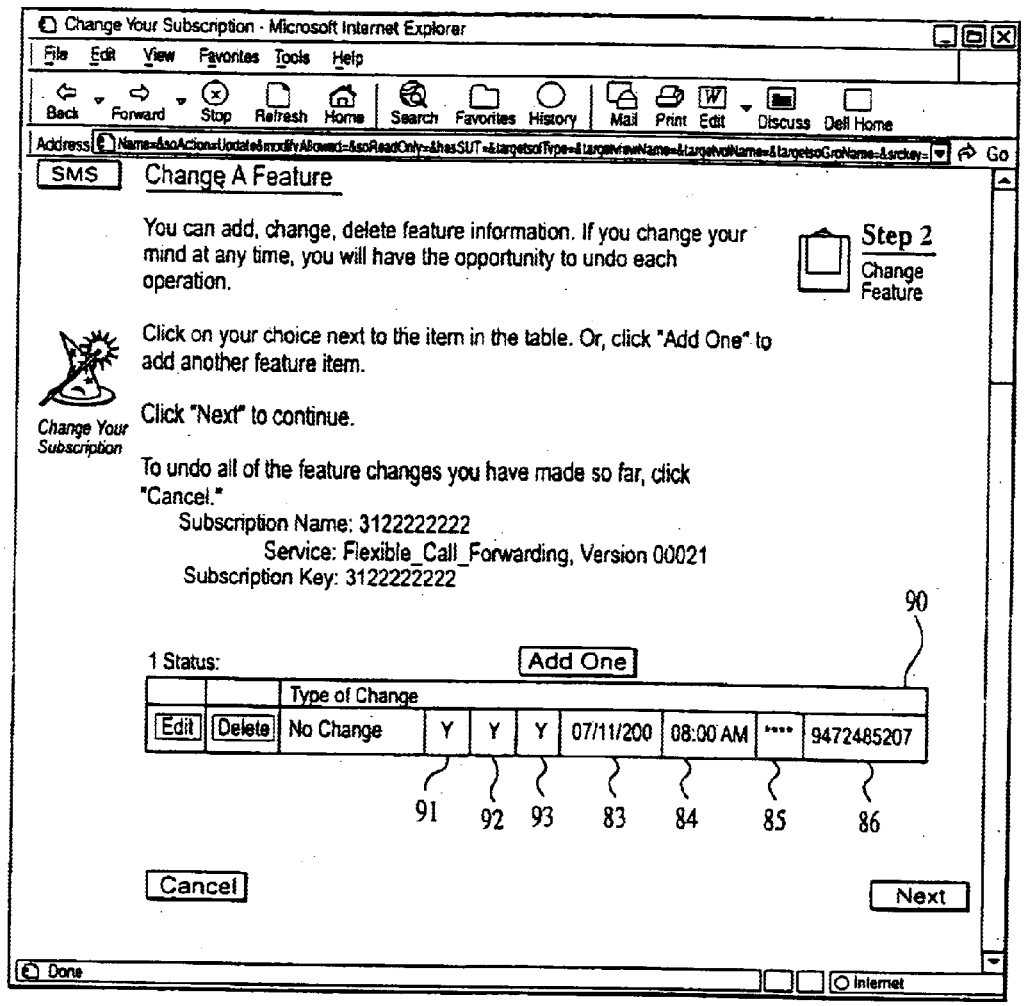
FIG. 8 is an exemplary Web page to be displayed at the user's PC showing an activation and scheduling summary for Flexible Call Forwarding, according to an aspect of the present invention.

The instructions input by the subscriber in FIG. 7 are entered when the subscriber selects the Next button 87, at which time they are sent from the Web client 30 through the Web server 56 to the SMS 48, indicated respectively at steps 109 and 11 of FIG. 2. The exemplary Web page of FIG. 8 is then displayed at the Web client 30. Substantially simultaneously with entry of these instructions, along with the weekly schedule and priority screening data, the SMS 48 updates the data stored at the SCP 23, according to the information entered by the subscriber, for implementation at step 112, accordingly. The data stored at the SMS 48 is therefore duplicated by the data stored at the SCP 23.

Referring to FIG. 8, the status table 90 presents a summary of the entered information, including the automatic-off date 83, the automatic-off time 84, the PIN number 85 and the forwarding phone number 86. In addition, entries 91–93 indicate the respective status of the service and optional features. The Y in entry 91 indicates that the Flexible Call Forwarding service is on. The Ys in entries 92 and 93 indicate that the priority screening list and the weekly scheduler are active, respectively.

In alternative embodiments, Flexible Call Forwarding forwards telephone calls is to alternative numbers, depending on the priority screening list. For example, a calling party number on the priority screening list is forwarded to the current location of the subscriber and a calling party number not on the list is terminated at the original called party number. Furthermore, an embodiment includes a rejection screening list for the subscriber to identify specific directory numbers from which he or she does not wish to accept as forwarded calls, or directory numbers that are forwarded to an alternative telephone number or message center.

Figure 9:
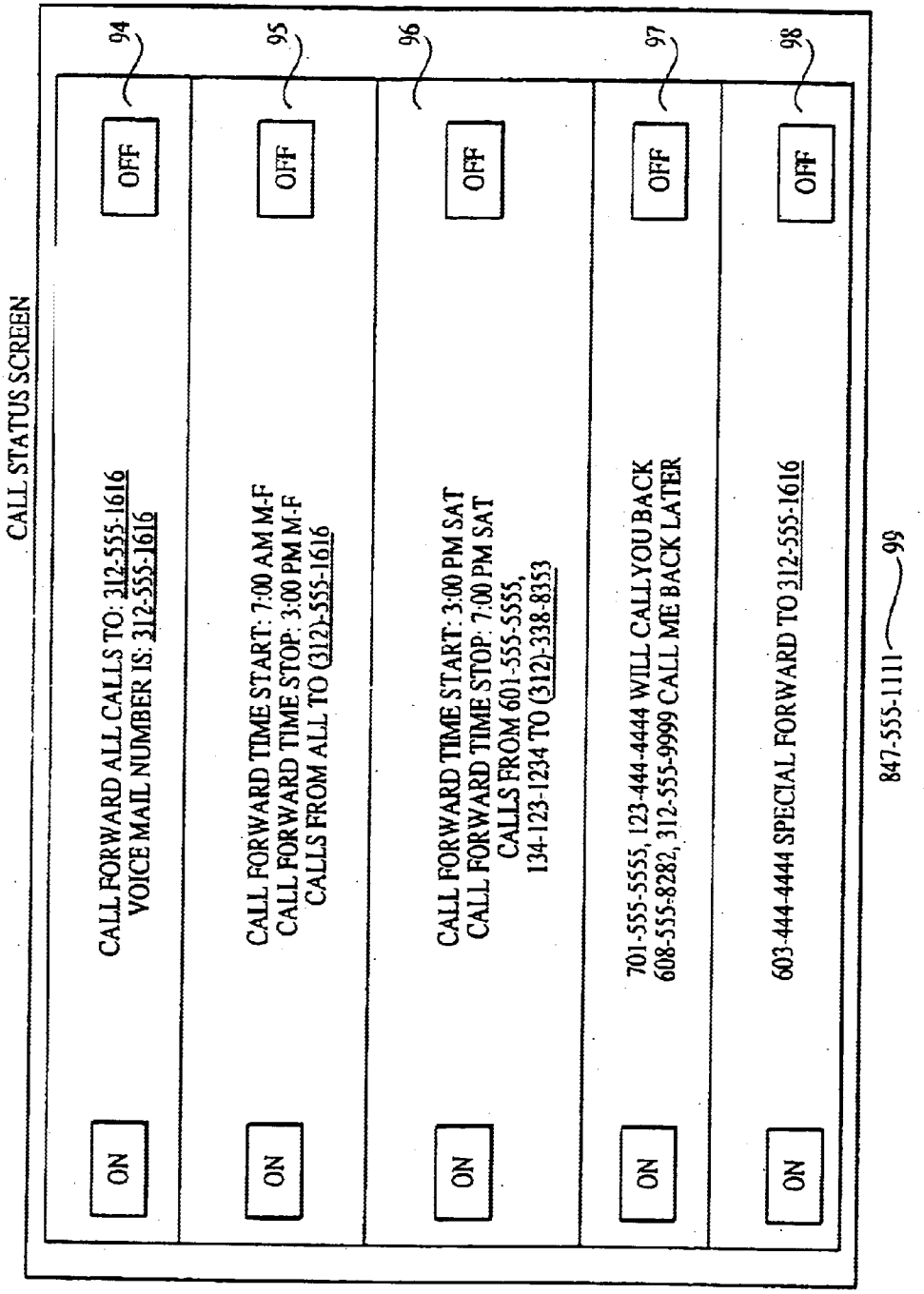
FIG. 9 is an exemplary Web page of an alternative embodiment to be displayed at the user's PC showing an activation and scheduling summary for Flexible Call Forwarding, according to an aspect of the present invention.

FIG. 9 shows an exemplary Web page, entitled Call Status Screen, that displays summary information from a weekly schedule integrated with a priority screening list and a rejection screening list. The directory number 99 at the bottom of the screen is the telephone number of the subscriber using the service. Boxes 94–98 display scheduling options created and edited by the subscriber using the Web client 30, as described above. Each box includes ON and OFF icons, which can be selected after the particular schedule and associated screening lists have been created, using either the Web client 30 via the Internet 44 or the IVR 45 via the PSTN. Box 94 is the basic call forwarding function in which, when activated, all calls are forwarded to telephone number 312-555-1616. (As shown, this number coincides with the subscriber's voice mail, which in an embodiment may be a call control option available through PCM, discussed below.) All calls continue to be forwarded to this number until the subscriber deactivates this function, i.e., selects the OFF icon, or until the day and time set in the automatic-off function (not shown) is reached.

Box 95 of FIG. 9 is a summary of essentially the same type of information shown in the exemplary Web page of FIG. 3. From the start time of 7:00 a.m. to the stop time of 3:00 p.m., Monday through Friday, all calls are automatically forwarded to the previously identified directory number, 312-555-1616, with no further action by the subscriber (other than activating box 95). Box 96 is similar to box 95, except that box 96 incorporates a priority screening list. Therefore, from 3:00 p.m. to 7:00 p.m. on Saturday, the Flexible Call Forwarding service forwards only calls from the two numbers on the priority screening list, i.e., 601-555-5555 and 134-123-1234, to a priority forwarding number, i.e., 312-338-8353. Box 97 shows an example of using a rejection screening list in conjunction with a priority screening list. Assuming that the subscriber desires to return calls from those directory numbers on a second priority screening list, i.e., calls from 701-555-5555 and 123-444-4444, callers associated with the directory numbers on the second priority list will hear an announcement to that effect whenever they call the subscriber's number while box 97 is activated. However, calls from the directory numbers on the rejection screening list, i.e., 608-555-8282 and 312-555-9999, will hear an announcement instructing the caller to attempt the call at a later time.

Box 98 shows another embodiment of the invention in which the Flexible Call Forwarding service provides another priority screening list, referred to, for example, as the special forward list. This list is built by the subscriber using the Web client 30 in the same manner described with respect to the priority screening list. Once created and implemented, i.e., activated by selecting the ON icon on the GUI of Web client 30 or sending the appropriate touch tone over the IVR 45, calls from the special forward list directory numbers are sent to another optional telephone number (or played an alternative announcement) according to the subscriber's instructions.

Figure 10:
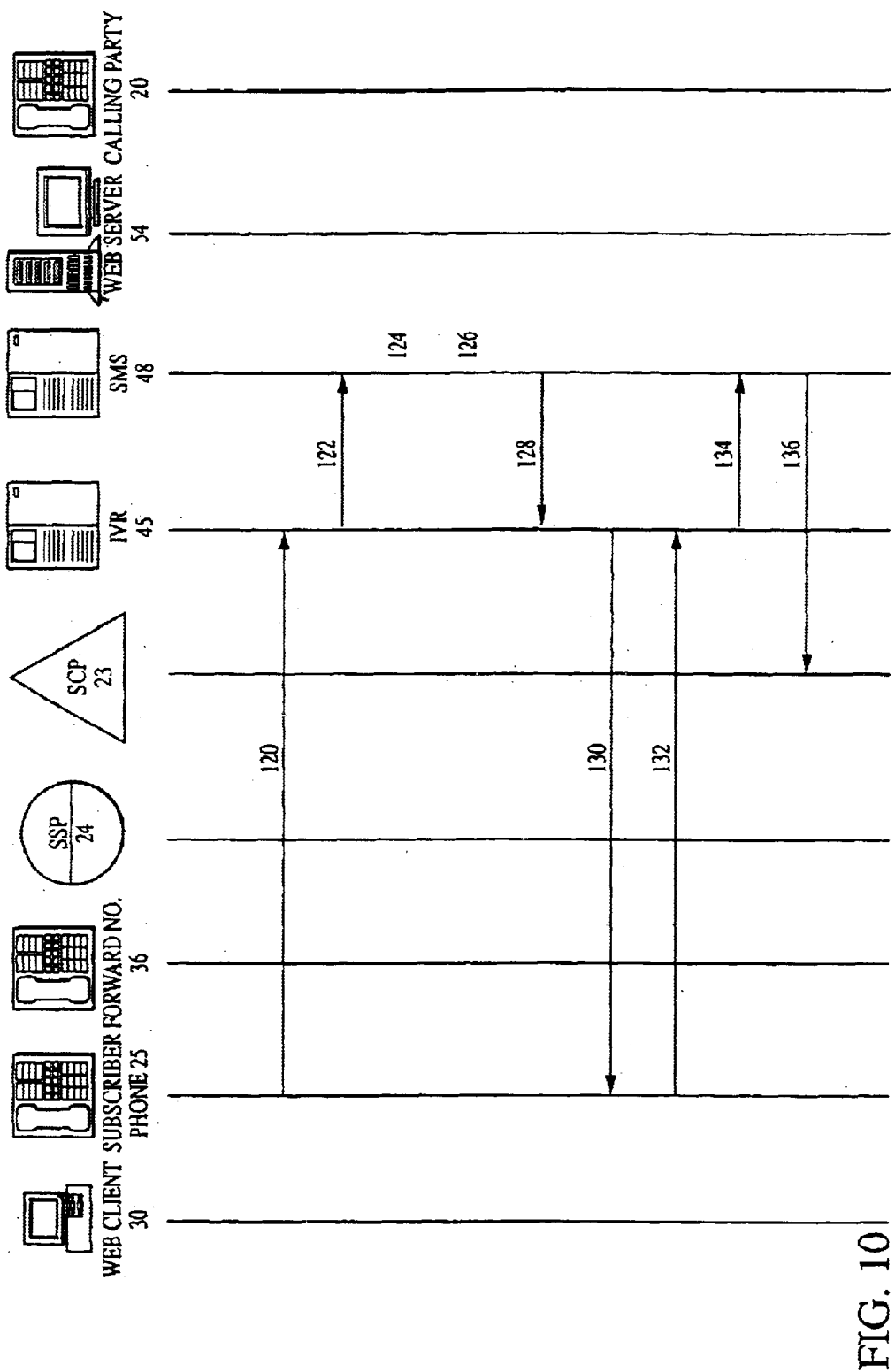
FIG. 10 is an exemplary call flow diagram in which the subscriber accesses Flexible Call Forwarding data via an IVR, according to an aspect of the present invention.

Exemplary steps through which the subscriber can alternatively interact with Flexible Call Forwarding using the IVR 45 are shown in FIG. 10. As stated above, access through the IVR 45 is slightly limited in that the subscriber cannot actually build or edit priority screening lists and weekly schedules. However, the subscriber can access all other features of Flexible Call Forwarding, including changing the PIN, toggling the Flexible Call Forwarding service ON or OFF, setting the automatic-off function day and time, and activating/deactivating the priority screening list and weekly schedule.

Referring to FIG. 10, the subscriber calls a toll free number from any DTMF telephone, which directly accesses the IVR 45, shown at step 120. FIG. 10 depicts, for example, the call originating from the subscriber phone 25. The IVR 45 receives the call and initiates a request for various authentication information, including the account and PIN numbers. These numbers coincide with the account and PIN numbers used to access the Flexible Call Forwarding service via the Internet 44. The pre-programmed voice announcements for this aspect of the invention reside in the IVR 45, and implementation of the voice announcements is well known. The authentication information is provided using the touch tones of the DTMF telephone 25. The IVR 45 forwards the information to the SMS 48 at step 122 for verification at step 124.

After verification, the system operates in much the same way as described above with respect to a GUI and the Internet. The SMS 48 retrieves at step 126 the current service data for the Flexible Call Forwarding service, including current priority screening lists and schedules, and provides the IVR 45 with the call forwarding data specific to the subscriber at step 128. The IVR 45 then verbally recites a menu of options to the subscriber at step 130 based on the information received from the SMS 48. For example, if the subscriber has previously built a priority screening list, activation of this list will be included among the options provided to the user over the telephone. The subscriber listens to the options and inputs various choices at step 132 via the telephone touch tone key pad, including, for example turning on Flexible Call Forwarding or selecting and activating a predefined priority list or weekly schedule. The subscriber can also set the automatic-off function date and time.

These commands are forwarded from the IVR 45 to the SMS 48 at step 134, which updates the Flexible Call Forwarding data contained in the SCP 23 at step 136.

Once stored at the SCP 23, Flexible Call Forwarding is set with respect to incoming calls in accordance with the customizing instructions from the subscriber.

Figure 11:
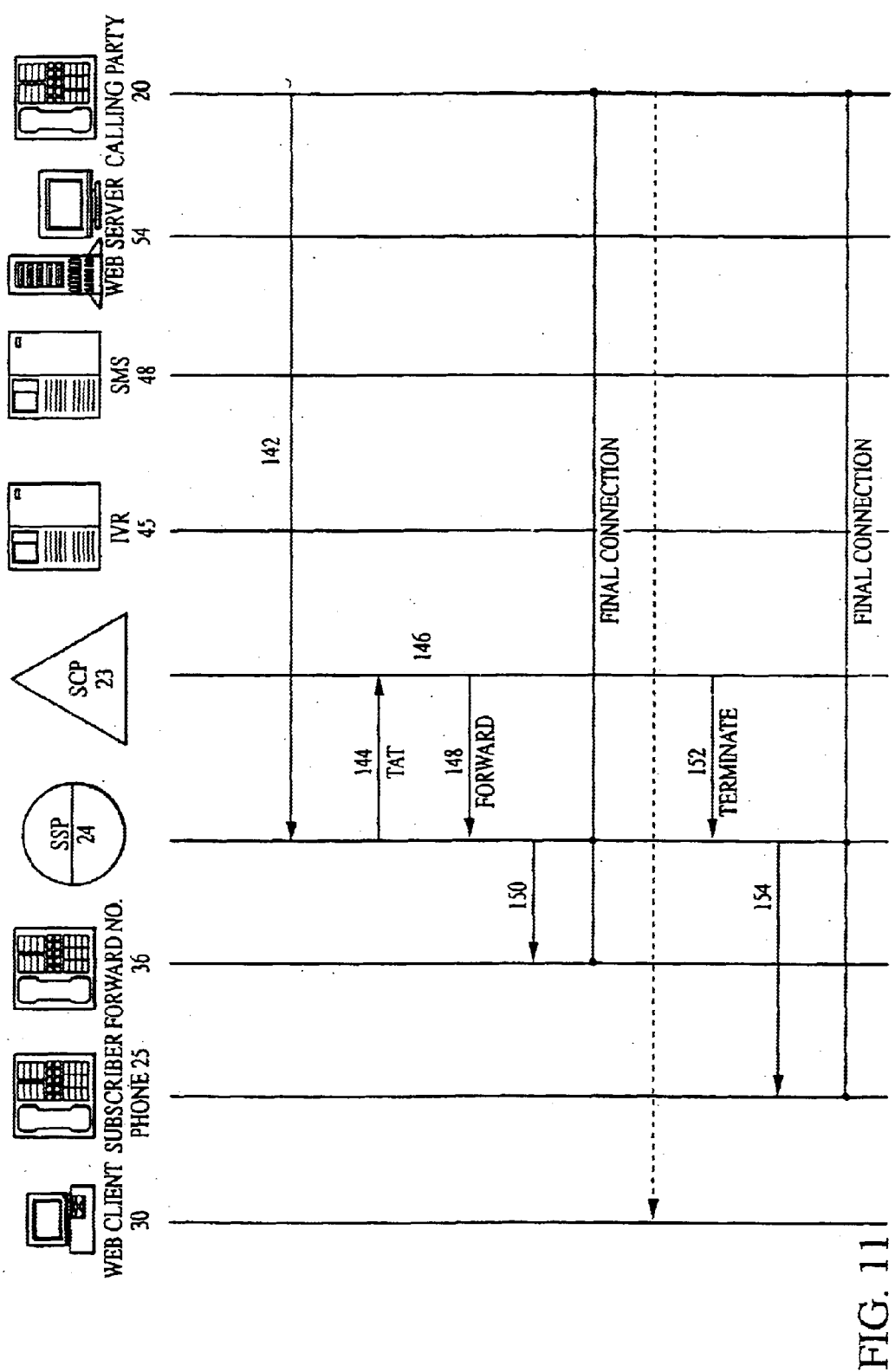
FIG. 11 is an exemplary Flexible Call Forwarding call flow diagram showing routing of an incoming telephone call, according to an aspect of the present invention.

FIG. 11 is a call flow diagram depicting an exemplary implementation of Flexible Call Forwarding in response to an incoming telephone call. At step 142, a calling party 20 places a call to the telephone number of the subscriber phone 25. The call proceeds through the originating SSP 21 (not pictured) to the terminating SSP 24, which launches an AIN Terminating Attempt Trigger (TAT) query to the SCP 23 at step 144. Once the trigger has been assigned and activated, every call terminating to the subscriber's line will cause the SSP 24 to launch the TAT query via the existing SS7 network.

Figure 12:
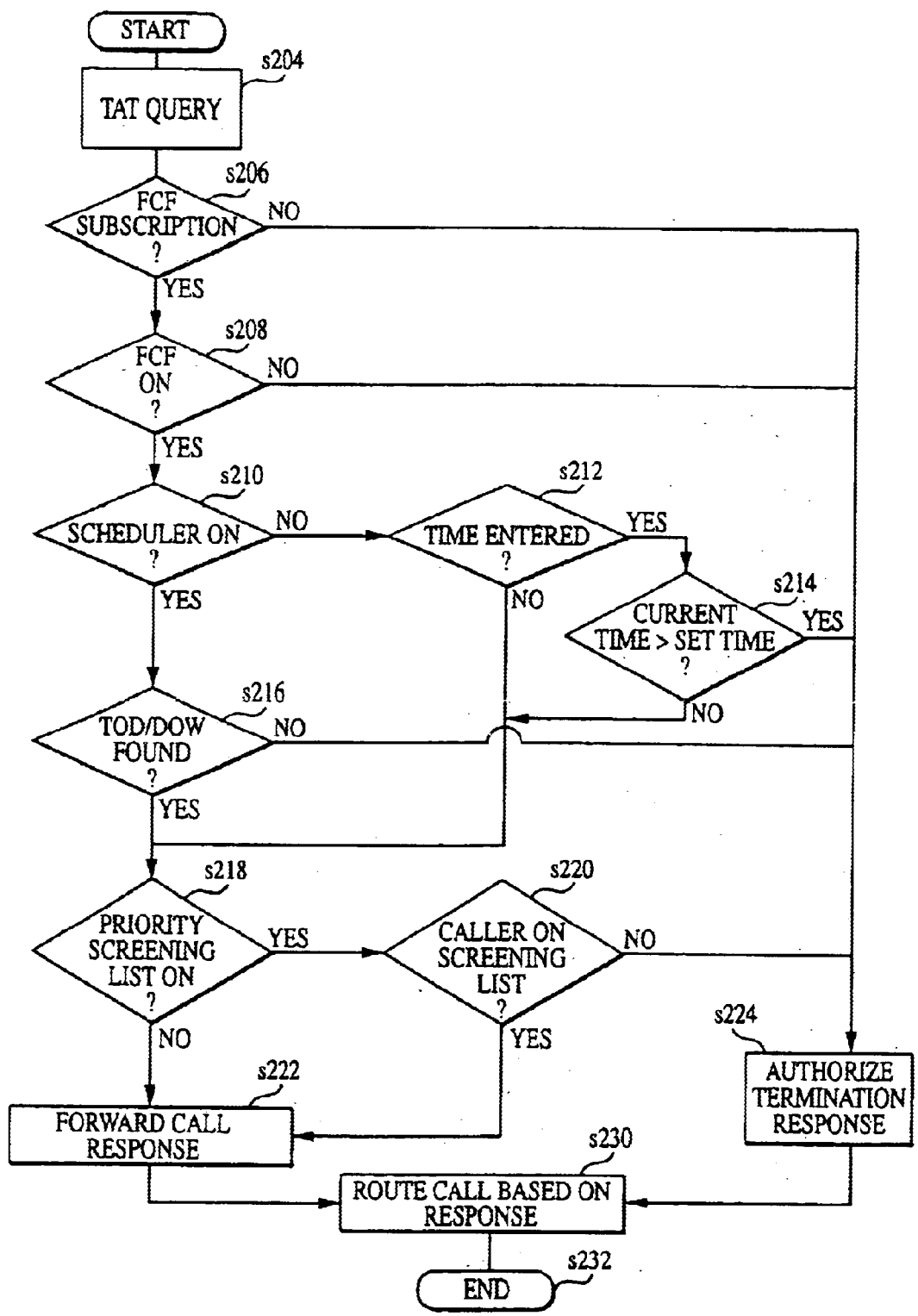
FIG. 12 is an exemplary flow chart of Flexible Call Forwarding call routing logic, according to an aspect of the present invention.

Step 144 of FIG. 11 coincides with step s204 of FIG. 12, which is a flow diagram depicting the logical flow of handling an exemplary call according to an embodiment of the invention. In particular, at step s204, the SSP 24 sends a termination attempt query message to the SCP 23. The data corresponding to the termination attempt query includes standard AIN parameters, such as a called party identification number and a calling party identification number.

After receiving the TAT query, the SCP 23 internally processes the data at step 146 of FIG. 11. The SCP 23 first determines at decision diamond s206 of FIG. 12 whether the called party is a Flexible Call Forwarding subscriber. The determination is accomplished by comparing the query parameters from the SSP 24 to a list of subscribers in the SCP 23's Flexible Call Forwarding database. If there is no match, the SCP 23 concludes that the called party is not a Flexible Call Forwarding subscriber and sends an authorize termination instruction to SSP 24, which terminates the call to the dialed telephone number, as indicated at steps s224 and s230, ending the process at step s232. In other words, the SCP 23 instructs the SSP 24 to simply complete the call as dialed with no further processing.

If the SCP 23 finds a match at decision diamond s206, indicating that the called party is a subscriber to Flexible Call Forwarding, the process proceeds to decision diamond s208, which determines whether the Flexible Call Forwarding service is ON or OFF. The ON/OFF status is indicated by a data flag, for example. If the Flexible Call Forwarding service is off, the logic proceeds to steps s224 and s230, as described above. That is, the SCP 23 sends the authorize termination instruction to SSP 24, which terminates the call to the called party number. If Flexible Call Forwarding service is ON, then the SCP 23 must determine which functions have been activated by the subscriber.

At decision diamond s210, the SCP 23 determines whether the scheduler is ON or OFF. The scheduler status is also indicated by a data flag, for example. If the scheduler is off, the SCP 23 proceeds to decision diamond s212, which represents the automatic-off function of Flexible Call Forwarding. As previously described, and as shown in FIG. 12, the automatic-off function is entirely bypassed whenever the scheduler is activated, thereby preventing conflicting instructions from the two features. With respect to the automatic-off function, the SCP 23 first determines whether a time has been entered into the Data Counter field, which indicates the time at which the subscriber wishes call forwarding to be discontinued. If there is no time entered, the SCP 23 assumes that call forwarding is still active and proceeds to decision diamond s218 to determine whether the priority list is activated. If there is a time in the Data Counter field, which indicates the automatic shut-off time, the current time of day, provided by a timer of the SCP 23, is checked against the shut-off time at decision diamond s214. If the current time is later than the shut-off time, the SCP 23 instructs SSP 24 to terminate the call to the called party number 25, at step s224. Otherwise, the SCP 23 proceeds to decision diamond s218.

If it is determined at decision diamond s210 that the scheduler is on, the SCP 23 accesses the scheduler table to execute call forwarding accordingly. In an embodiment, the weekly scheduler includes a time of day/day of week ("tod/dow") table, which may have the multiple entries. As discussed above, at a minimum, the tod/dow table contains multiple sets of start times and end times, as well as fields for identifying the days of the week for activation. The fields, for example, contain data indicating which days of the week have been designated activation periods. In an embodiment of the invention, the table also stores telephone numbers corresponding to the various activation periods of Flexible Call Forwarding.

At step s216, the SCP 23 determines whether the tod/dow table is found and populated. If there is no such table or the table exists but is unpopulated, the SCP 23 proceeds to step s224, where the call is terminated to the called phone number 25. Otherwise, the SCP 23 determines the forwarding instruction according to the current time, the times and days indicated by the tod/dow table and, in one embodiment, the forwarding telephone numbers. If the table indicates that the current time falls within a period during which call forwarding is not active, then the SCP 23 instructs the SSP 24 to terminate the call to the called party number.

Otherwise, the process proceeds to decision diamond s218, where the SCP 23 determines whether the priority screening list feature is ON or OFF. If the list feature is is off, the SCP 23 simply instructs the SSP 24 to forward the telephone call to the designated forwarding number 36, at step s222. If the list feature is on, the calling party number 20 is used to determine whether the caller is on the priority screening list, indicated at decision diamond s220. The list accommodates multiple entries for priority calls (e.g., 75, in one embodiment) and is populated with telephone numbers associated with whomever the subscriber has previously identified as a priority caller. When the priority screening list feature is on and the calling party number 20 does not appear on that list, the SCP 23 instructs SSP 24 to terminate the call to the called party number 25, at step s224. Otherwise, the SCP 23 instructs the SSP 24 to forward the call to the designated phone number 36, indicated at step s222. The call is then routed accordingly at step s230, ending the process at step s232.

Referring back to FIG. 11, in order to instruct the SSP 24 to forward a call, the SCP 23 sends a forward call message to the SSP 24 at step 148. In an embodiment of the invention, the forward call message sent by the SCP 23 to SSP 24 includes standard AIN parameters. The SSP 24 then completes the connection between the calling party 20 and the forwarding number 36 at step 150, resulting in a final connection between the two. In the alternative, if the SSP 24 is instructed to terminate the call to the called party number 25, the SCP 23 sends the authorize termination message, previously discussed, to the SSP 24 at step 152. The SSP 24 then completes the connection between the calling party 20 and the subscriber phone (i.e., called party number) at step 154, resulting in a final connection between the two.

System errors that occur while processing a call under Flexible Call Forwarding generally result in the call being terminated to the subscriber's line 25. For example, if the SSP 24 does not receive a response to the termination attempt query from the SCP 23 within a predetermined time, e.g., 3 seconds, the call is terminated to the subscriber's line 25. Other errors resulting in termination to the subscriber's line 25 include the SSP 24 receiving any report of an application error after sending a termination attempt query and the SSP 24 detecting a protocol or application error in an authorize termination message from the SCP 23.

Personal Call Manager

Figure 19:
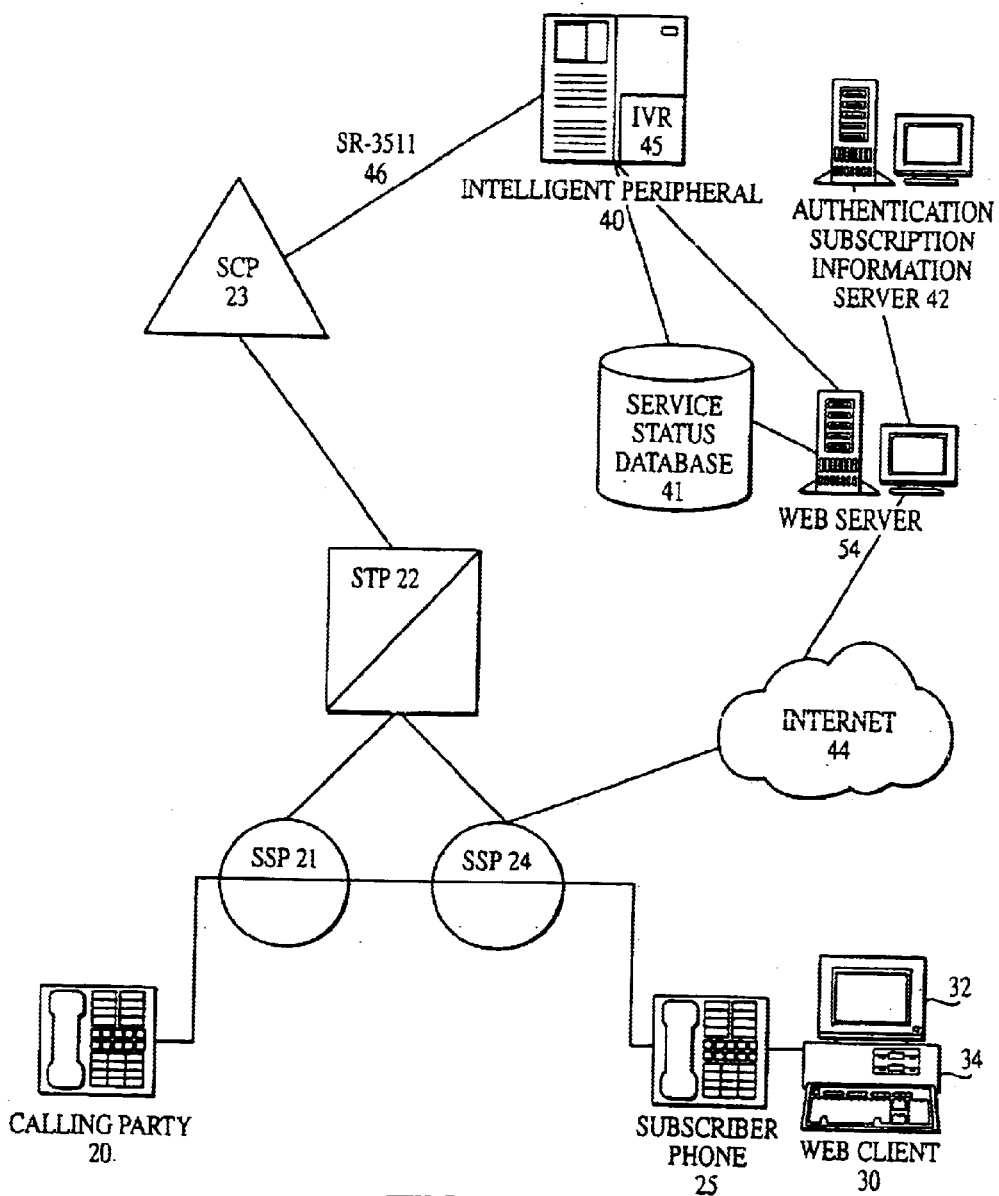
FIG. 19 is a block diagram showing an exemplary PCM telecommunications network, according to an aspect of the present invention.

Flexible Call Forwarding may be integrated with a Personal Call Manager (PCM) service to enhance functionality and compatibility with other call control services. PCM is an AIN based service that allows a subscriber connected to a communications network, including the Internet and other packet switched type data networks, as well as through conventional IVR systems, to customize and execute services associated with telephonic communications, with near real-time access to the service data. FIG. 19 illustrates an exemplary telecommunications network in association with PCM. The network includes a calling party 20, an originating SSP 21, a terminating SSP 24 and a subscriber's telephone 25, an STP 22 and an SCP 23, examples of which have been previously described. The network also includes an AIN/IP (intelligent peripheral) 40, which incorporates an IVR 45. In alternative embodiments, the intelligent peripheral may be an IBM Resource Manager or a Lucent PacketIN Application Server.

An associated data network includes a Web client 30, a Web server 54, an authentication/subscription information server 42 and a service status database 41. The data network communicates to the PSTN (specifically the SCP 23) through the intelligent peripheral 40 using the SR-3511 protocol 46, or an equivalent protocol. In an embodiment of the invention, the functions of the intelligent peripheral 40 may be performed by the SN/IP 57, shown in FIG. 1.

Figure 13:
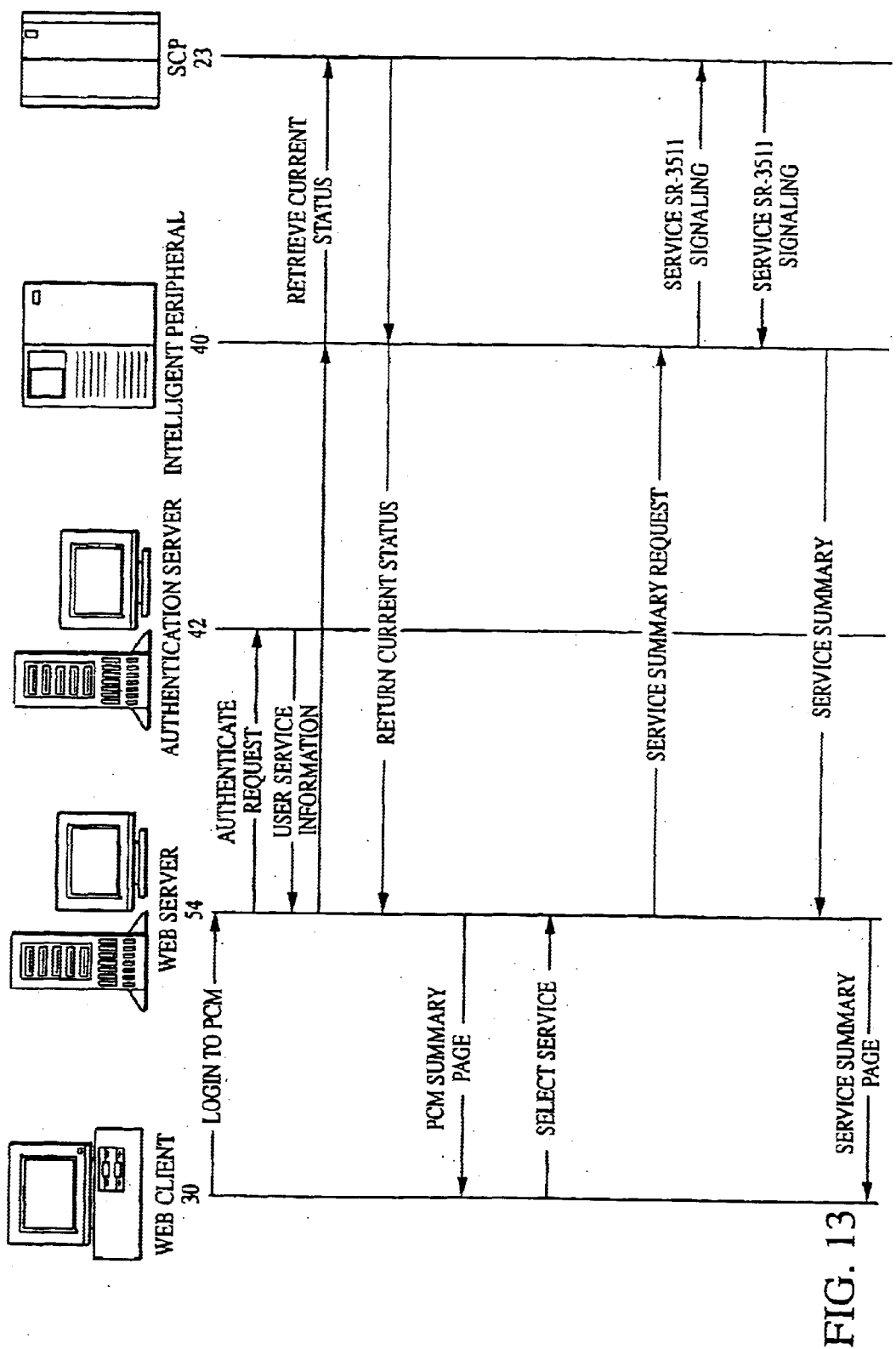
FIG. 13 is a call flow diagram illustrating subscriber requests for information from the PCM system, according to an aspect of the present invention.

FIG. 13 is an exemplary call flow diagram depicting a subscriber using the PCM service. Initially, the subscriber accesses a public packet switched data network, such as the Internet, from a Web client 30, using a Web browser such as Microsoft Internet Explorer, Netscape Navigator or HotJava. Once on the Internet, the subscriber connects to the Web server 54, which serves as a secure access platform. The Web server 54 receives HTTP messages from the Web client 30 and provides HTML Web pages in response to the subscriber's input to the Web client 30. The Web pages relate to the subscriber's PCM account.

Once connected to the Web server 54, the user must first log-in to the PCM account, also depicted at block 201 in FIG. 15 and described below. The log-in equates to an authentication of the user. To perform the authentication, the Web server 54 contacts the authentication/subscription information (ASI) server 42, which confirms that the subscriber is an authorized user by verifying at least the subscriber's name and a password. The ASI server 42 also provides to the Web server 54 a list of the services to which the user has subscribed in the PCM account. Services for each phone number are linked to the PCM account through the ASI server 42.

The Web server 54 then retrieves from the SCP 23, via the intelligent peripheral 40, current service data and the related status of the various services, such as Flexible Call Forwarding, managed through the PCM account. The data and status of the services, i.e., service data, is forwarded to the Web client 30 and displayed as to seen for example in FIG. 18, discussed in detail below.

Figure 14:
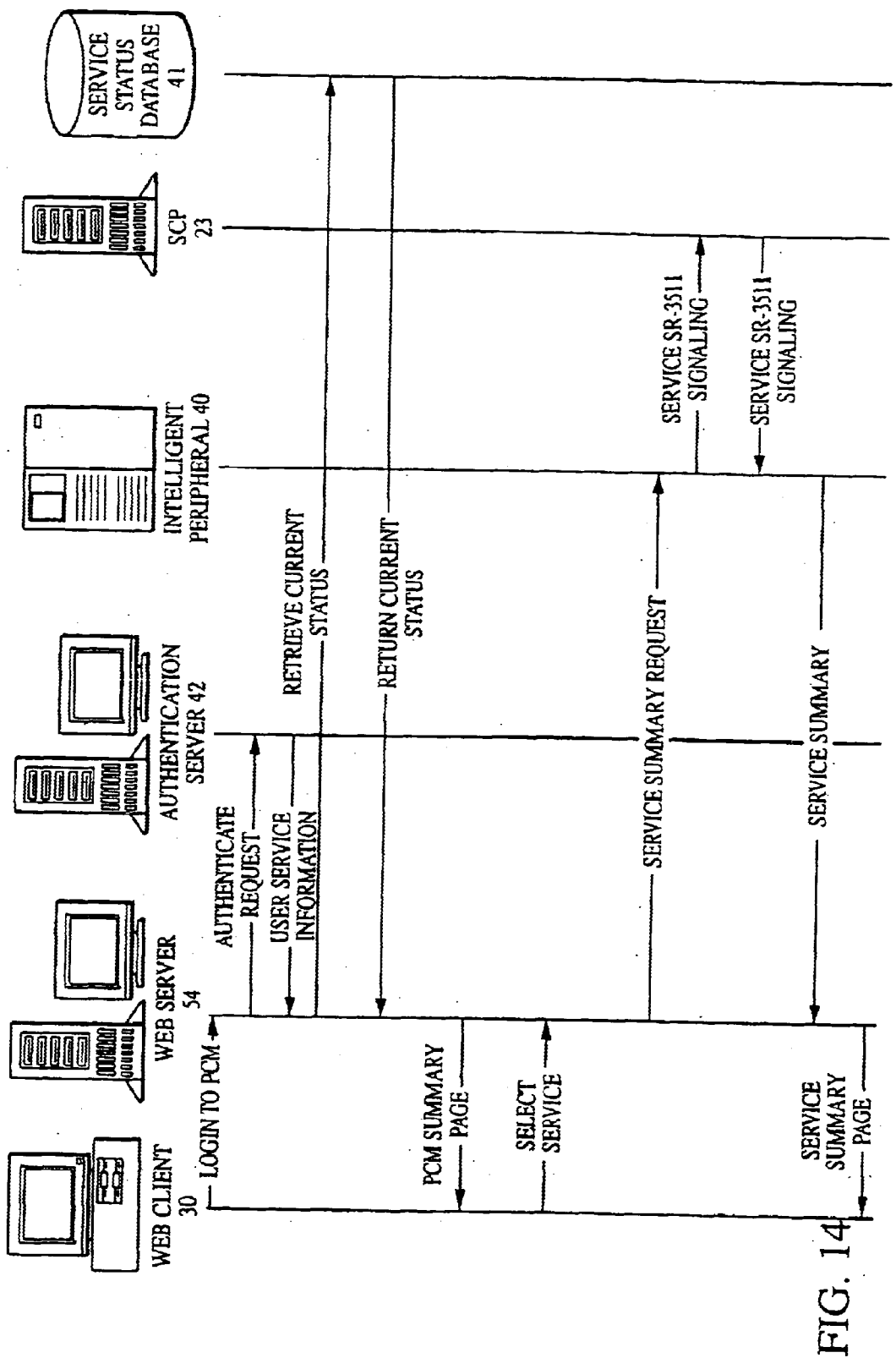
FIG. 14 is a call flow diagram illustrating subscriber requests for information from the PCM system, according to an alternative embodiment of the present invention.

In another embodiment, depicted in FIG. 14, after logging in and being authenticated, the Web server 54 retrieves from a service status database 41 the data and status of the various services managed through the PCM account, rather than from the SCP 23, directly. This database serves as a cache for the service information in the SCP 23. The service status database 41 contains information current to the most recent update interface with the SCP 23. The cache arrangement enables the user to efficiently access this information without waiting for the SCP 23 to process the request. At the same time, it reduces SCP traffic. The service status database 41 is refreshed periodically to ensure currency, as well as pursuant to a specific command by the user. This database is a conventional lightweight directory access protocol (LDAP) database, such as the LDAP database available from Lucent Technologies, Inc. In the alternative, the database may be a standard relational database, such as those available from Oracle Corporation or Sybase, Inc.

Upon review of the service status, the user may choose to interact with one or all of the available services, including Flexible Call Forwarding, as shown in FIGS. 13 and 14. When the user selects a desired service, a message is sent to the Web server 54, which responds with the corresponding service screen. When the user selects a particular service necessitating access to the PSTN (e.g., OCC or ICM), the request is sent to the intelligent peripheral 40.

Significantly, this is the same intelligent peripheral that implements IVR access to the user's services through a conventional PSTN. The intelligent peripheral internally translates data messages received from the Web server 54 and accesses the relevant call services data from the SCP 23 through the SR-3511 protocol, use of which enables the simultaneous compatibility with IVR functions. Details of the SR-3511 protocol are provided in Bellcore, Recommendation SR-3511 SCP Intelligent Peripheral (IP) Interface Specification for TCP/IP, Version 5.0 (January 1997), the disclosure of which is expressly incorporated by reference herein in its entirety. In one embodiment, the translation program is in C, C++ or JAVA. The intelligent peripheral 40 then transmits a summary of the requested service, based on information from the SCP 23, to the Web server 54.

At this point, the user may choose to update or to simply review the service information. When the service is updated, the Web server 54 sends the update instructions in a data message to the intelligent peripheral 40. The intelligent peripheral then translates the update instruction into the SR-3511 protocol and communicates the updated service parameters directly to the SCP 23.

For example, one available service is Incoming Call Manager (ICM), by which the user may prioritize, forward, preview or block selected telephone numbers. In the update procedure, the user enters a telephone number to be blocked, for instance, which the Web server 54 communicates to the intelligent peripheral 40. The intelligent peripheral, in turn, sends the data via SR-3511 to the SCP 23, which flags the number to be blocked. Because the intelligent peripheral's instructions to the SCP 23 are sent and implemented immediately, without the involvement of the provider's account management or customer service, the changes to the service are operable and available shortly after the user sends the instructions. In an embodiment that includes the Service Status Database 41, the cache will then be updated in due course to reflect the updated information in the SCP 23.

Figure 15:
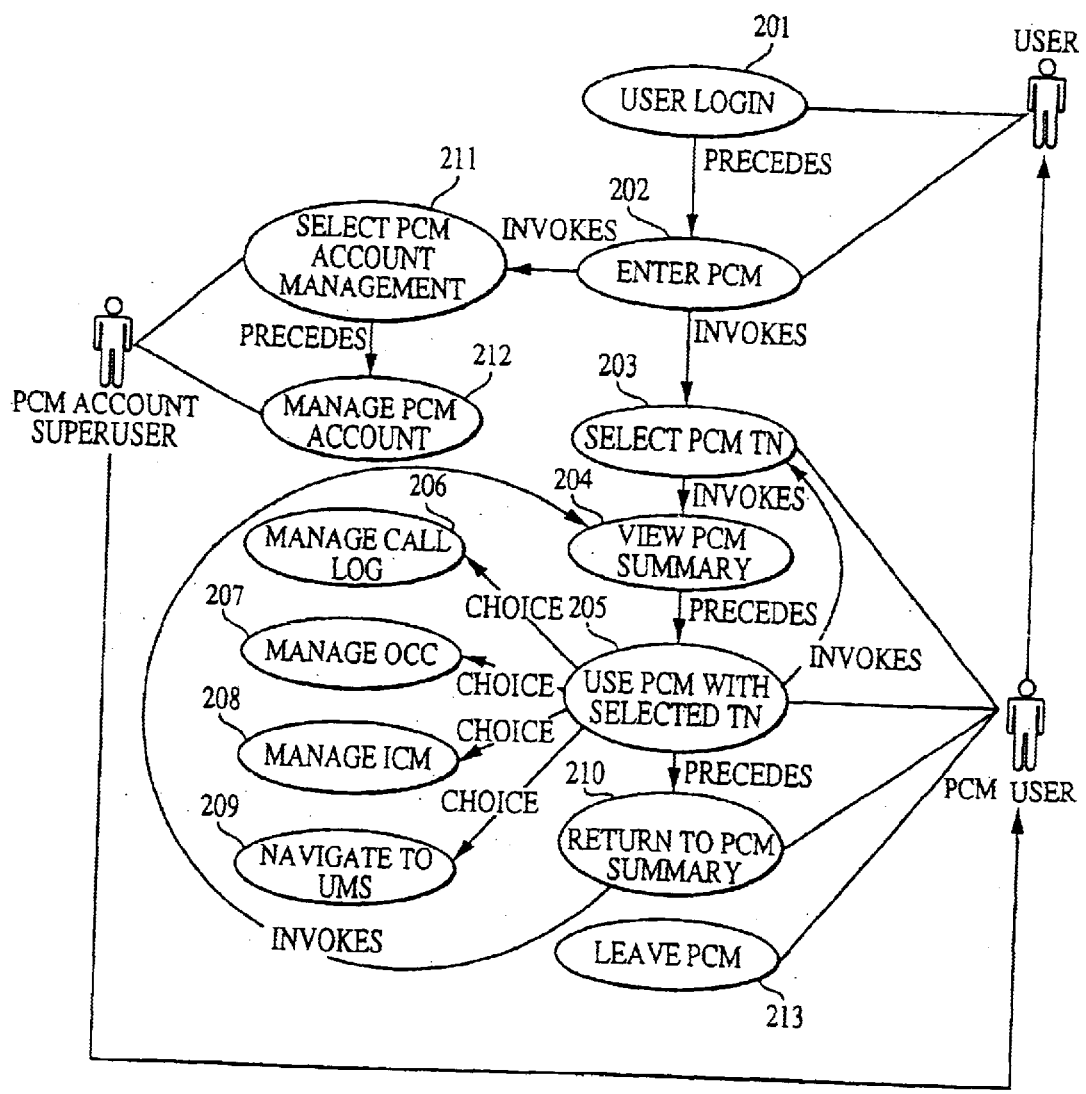
FIG. 15 illustrates user action in an exemplary Web-based PCM system, according to an aspect of the present invention.
Figure 16:
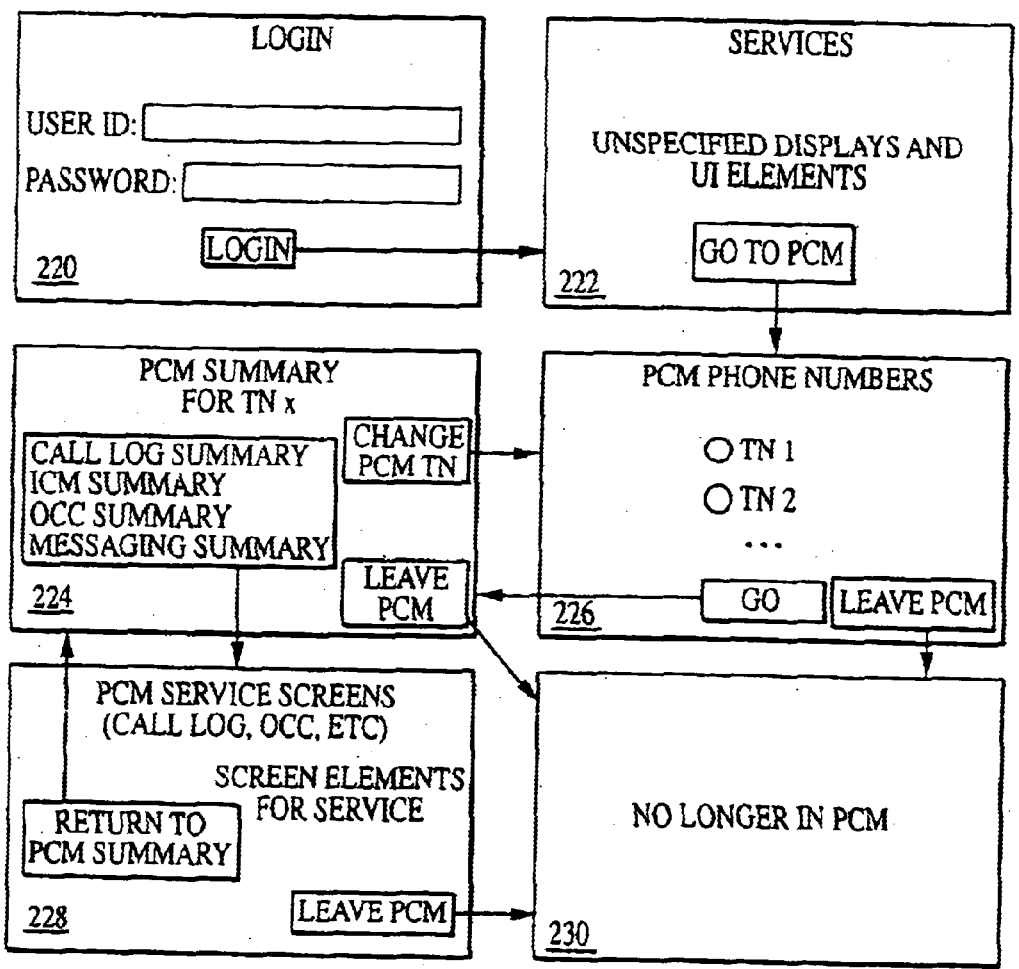
FIG. 16 illustrates an exemplary window navigation flow for basic user actions, according to an aspect of the present invention.

FIG. 15 depicts the procedure followed by the subscriber when first entering the PCM Web site. The subscriber must first log-in at block 201. Assuming the subscriber's PCM account has already been established, as described below, he or she must provide the authentication data to proceed. The authentication data is entered at a log-in screen, an example of which is depicted in FIG. 16 at screen 220. To maintain the integrity of the secure platform, authentication requires preferably a user ID and a password. The user ID is any name, not necessarily unique within the PCM system, selected at account initiation by the subscriber. The password is confidential (at the subscriber's discretion) and must be unique with respect to the associated user ID. The subscriber may change the password as desired, but appropriate authentication data must be provided prior to such changes. If the subscriber enters an invalid user ID or password, the Web server 54 responds with a message explaining the problem and allows another chance to enter correct data.

Figure 17:
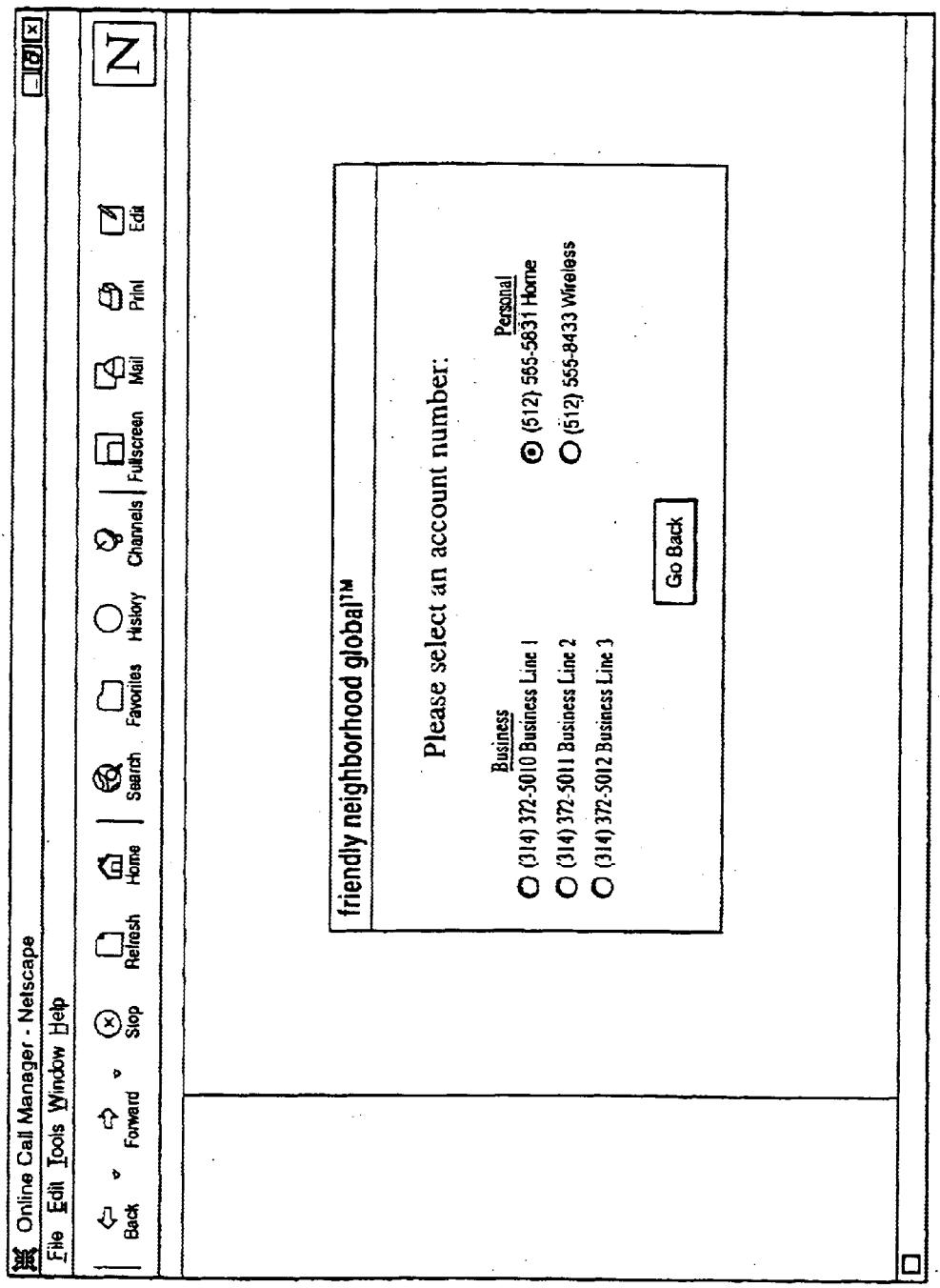
FIG. 17 is an exemplary window to be displayed at the user's PC requesting identification of a PCM account number, according to an aspect of the present invention.

After the subscriber is authenticated, the subscriber proceeds to enter the PCM at block 202. At this time, the user views a general informational screen 222 of FIG. 16, which is formatted at the discretion of the service provider. It may include, by way of example, new services offered to the subscriber. After the subscriber elects to proceed into the PCM, the Web server 54 navigates to a page 226 that displays telephone numbers associated with the PCM account(s) to which the user belongs and to which the user is authorized to access. FIG. 17 depicts an exemplary screen displaying phone numbers to which the user has access.

At this point, the user selects a telephone number at block 203 and the corresponding services are displayed for the selected telephone number at screen 224. The user may then elect to implement the various services in place for a particular phone number. In an embodiment of the invention, if the subscriber selects the Flexible Call Forwarding service in the PCM account, he or she further enters the appropriate PIN. Alternatively, at block 202 the user may elect to manage the PCM account at blocks 211 and 212, depending on the user's privileges within a particular account to manage the PCM account.

If the PCM has more than one associated telephone number, the user would see a Web page listing the numbers, as in block 226 of FIG. 16. The screen has user interface elements that allow the user to select one of the numbers. Thus, each PCM account keeps track of a non-empty set of phone numbers to be managed through the is PCM on behalf of the corresponding set of users, presumably members of a family, business, organization or other group.

After the user selects a phone number at block 203, the system displays for the user a PCM summary page 204 corresponding to the selected telephone number. The PCM summary page displays only data the user is authorized to see for the selected telephone number. As shown at screen 224, the PCM summary provides various options to the user, including by way of example, selecting from among listed services 206–209, returning to select an alternative PCM telephone number or exiting PCM altogether 213.

Figure 18:
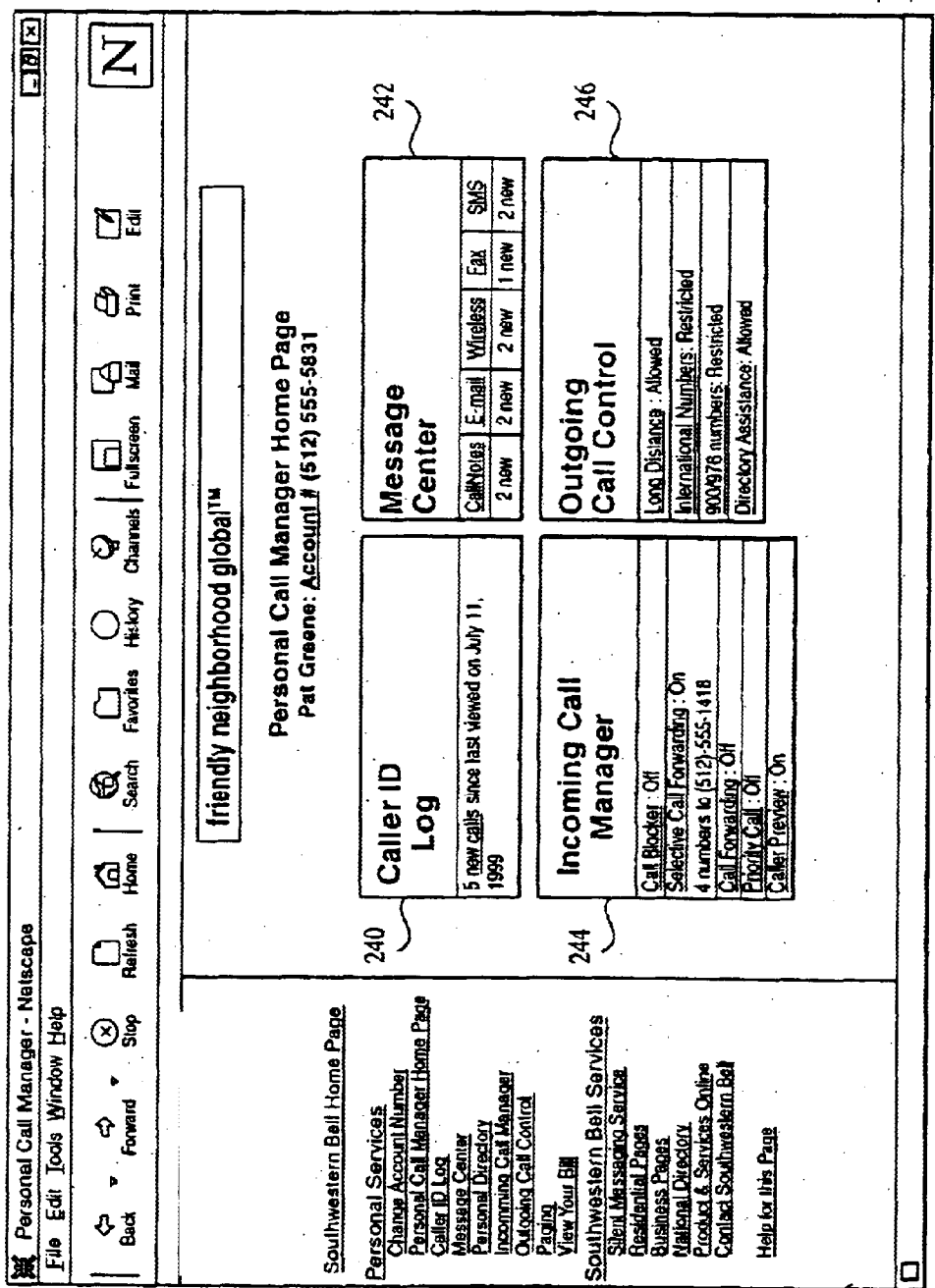
FIG. 18 is an exemplary PCM home page window to be displayed at the user's PC identifying customized user options for a selected account number, according to an aspect of the present invention.

FIG. 18 shows an exemplary PCM summary display, which corresponds to screen 224 of FIG. 16, entitled Personal Call Manager Home Page for account number (512) 555-5831, which is the selected telephone number in the example. FIG. 18 shows four services accessible through the PCM, although the four services are not intended to be limiting. That is, the PCM is able to administer any call services associated with an SCP 23. The services depicted in the PCM summary screen 224, as well as in FIG. 18, are Caller ID Log 240, Message Center 242, Incoming Call Manager (ICM) 244 and Outgoing Call Control (OCC) 246. The displayed information is summary in fashion, the details being available to the user through selection of one of the available services, which displays a PCM service screen 228 of FIG. 16. At the summary screen, the Caller ID Log 240 of FIG. 18 retrieves data from the SCP 23 and shows, for example, the number of call records added since the last review. The Message Center 242 retrieves data from the SCP 23 and shows the number of new call notes, e-mails, wireless calls, faxes and messages reviewed. The ICM 244 of FIG. 18 likewise retrieves data from the SCP 23 and shows the status of the call blocker, call forwarding, priority call and caller preview features. The OCC summary retrieves data from the SCP 23 and shows whether international calls, long distance calls, 900/976 numbers and/or directory assistance calls are restricted.

From the PCM summary screen, the user may choose to use PCM to manage any of the displayed services, indicated at block 205 in FIG. 15. This is done by simply clicking on one of the display boxes 240–246 of FIG. 18 to cause the Web server to display a new Web page corresponding to the selected service. Or, the PCM summary page includes a list of the personal services 248, which duplicates the display boxes. In addition, the list 248 may include additional personal services that do not require interaction with the SCP 23. These services include, for example, a personal directory, paging capability and billing review.

The paging capability provides the option of paging the subscriber when a caller ID is received from a subscriber specified phone number. Paging may include a page, a wireless short message, an e-mail, or a generated phone call to a specified number. Moreover, caller ID logs can be collected and paged to the subscriber at periodic intervals with summary and/or detailed information.

After selection of one of the services, the Web server 54 navigates to and displays the selected services Web page, indicated by blocks 206–209, and displays the corresponding service screen 228 of FIG. 16. The user may review information, activate or deactivate the service or change the scope of the service, as desired, in accordance with the level of access available to that user. After accessing one of the available services, the user may return to the PCM summary page at block 210. Returning can be accomplished by selecting a specific option to return or by simply clicking the BACK icon provided by the Web browser. The user may also exit PCM at block 213 of FIG. 15, ending the current session at block 230 of FIG. 16.

Intelligent Call Forwarding

An additional embodiment of the present invention will be referred to as Intelligent Call Forwarding. Intelligent Call Forwarding is a call control service that is closely related to Flexible Call Forwarding and provides complementary features. Flexible Call Forwarding is implemented to forward telephone calls to at least one pre-designated number whenever the subscriber anticipates not being available at the subscriber telephone 25, but Flexible Call Forwarding does not provide call processing whenever the caller encounters a busy signal at the subscriber's line. The inability to forward calls is particularly problematic when the subscriber is connected to the Internet via the telephone line to which incoming calls are attempting to connect. Conventionally, the calling party simply receives a busy signal (or is sent to a message mailbox) and the subscriber has no notice of the incoming call.

An embodiment of the invention addresses two related services. One of the services is referred to as Intelligent Call Forwarding, which enables the subscriber connected to the Internet to direct incoming calls to alternative telephone numbers, including numbers that play announcements or accept messages, without interrupting the Internet session. For example, the announcements may include a message informing the calling party that the party they are trying to reach is busy and that the caller should call back later, or a message informing the calling party that the party they are trying to reach is busy and will call them back later. Intelligent Call Forwarding includes several optional features similar to Flexible Call Forwarding that the subscriber may customize. Among these features are a weekly scheduler, which allows the subscriber to schedule up to a week in advance activation and deactivation times, as well as associated forwarding phone numbers. Another feature is a priority screening list, in which the subscriber designates priority names and telephone numbers. Related to the priority screening feature is a screening rejection list feature, which terminates an incoming call to the called number or forwards the rejected call to a pre-designated number having an appropriate announcement (switch-based, or otherwise).

As in the case of Flexible Call Forwarding, there are two methods by which subscribers may modify call forwarding service status. First, from any DTMF telephone, the subscriber dials a toll-free number, e.g., an 800 number, to access an IVR. When connected to the IVR, the subscriber is prompted to enter the account number, along with a personal identification number, as discussed above. The subscriber then has the ability to change the PIN, change the forwarding numbers, toggle the service on/off, specify a day and time when the service will be deactivated and activate or deactivate the priority screening list, the rejected call list and the weekly schedule. Second, the subscriber has the option to access the Intelligent Call Forwarding service using a GUI via the Internet. Over the Web connection, the subscriber is able to implement all IVR functions, as well as build the screening lists and design weekly schedules. The Intelligent Call Forwarding service, when active, automatically takes effect whenever the subscriber accesses the Internet from a telephone number included in the service.

The other service for responding to busy signals on the subscriber's phone line is Internet Caller ID (ICID). Like Intelligent Call Forwarding, ICID enables the subscriber connected to the Internet via a dial-up connection to contemporaneously receive caller identification information concerning an incoming telephone call, without interrupting the connection with the Internet. The caller information is provided in a pop-up dialog box on the subscriber's display, which includes but is not limited to, a PC monitor. The information displayed to the subscriber includes the name and number of the calling party, if available. In addition, several disposition options are presented to the subscriber which, upon selection, determine handling of the incoming call.

In an embodiment, the disposition options available to the subscriber include accepting the call, forwarding the call to a voice mail system, redirecting the call to another telephone line (e.g., a cellular telephone or a second telephone line), and playing an announcement to the calling party. The announcement played to the calling party is selected by the subscriber and may be either a message informing the calling party that the party they are trying to reach is busy and that the caller should call back later, or a message informing the calling party that the party they are trying to reach is busy and will call them back later. Additionally, the subscriber has the option in all of the service described herein of selecting the language in which the messages plays, e.g., English or Spanish.

FIG. 1 illustrates an exemplary telecommunications network, for implementing the Intelligent Call Forwarding aspects of the invention. As in the case of Flexible Call Forwarding, the subscriber is able to access to the Intelligent Call Forwarding service by GUI via the Internet 44 and by DTMF telephone via an IVR 45, through a common SMS 48.

Figure 20:
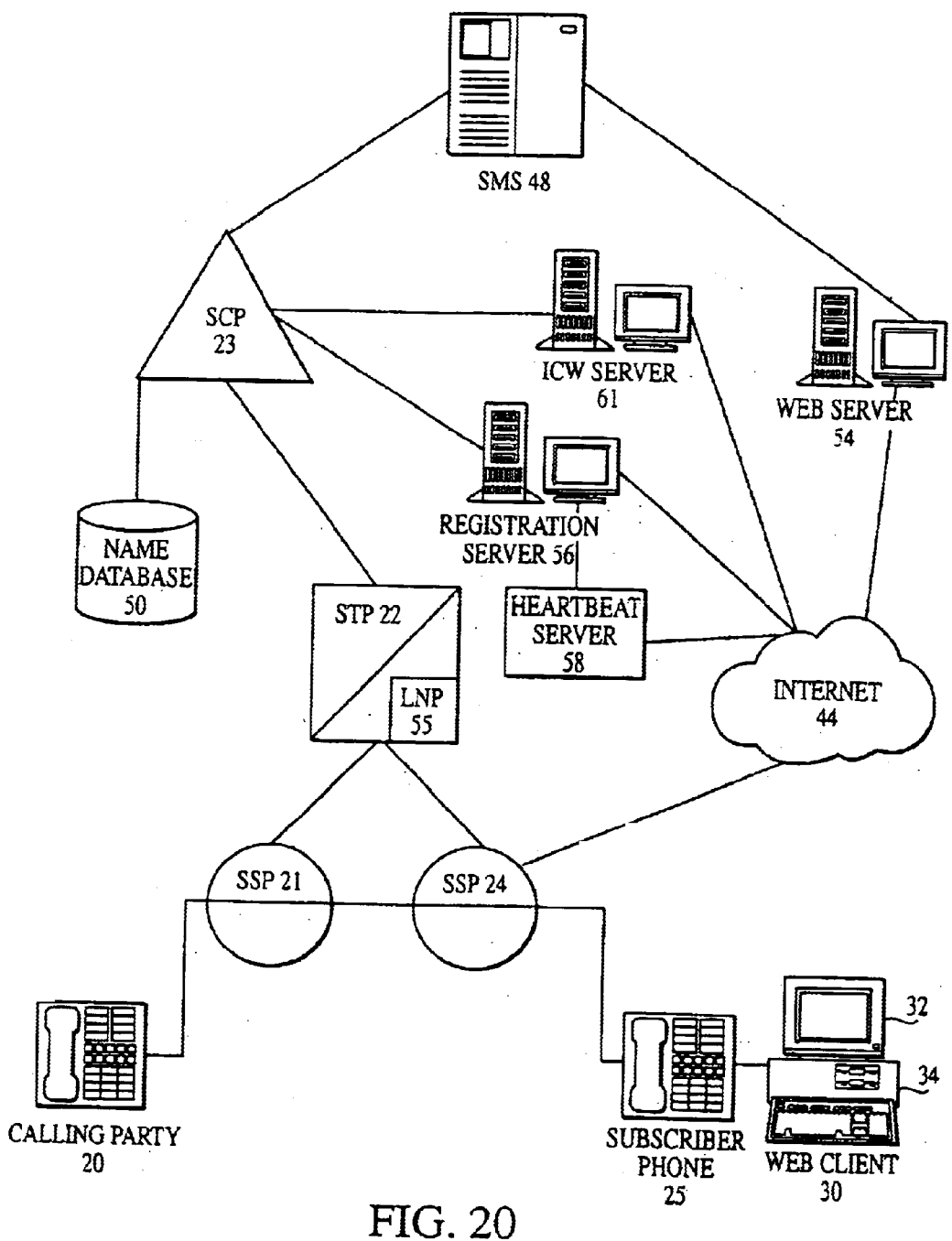
FIG. 20 is a block diagram showing an exemplary Intelligent Call Forwarding and ICID telecommunications network, according to an aspect of the present invention.

FIG. 20 illustrates an exemplary telecommunications network of the present invention, including ICID, in an alternative embodiment of the invention. As in FIG. 1, the network of FIG. 20 includes a calling party 20, an originating SSP 21, a terminating SSP 24, a subscriber's telephone 25, an SMS 48, an STP 22 and an SCP 23, examples of which have been previously described. The network also includes a name database 50, a local number portability (LNP) database 55, a registration server (RS) 56, a heartbeat server 58 and an Internet Call Waiting (ICW) server 61. The name database 50 can be, for example, a LIDB. An associated data network of the invention includes a Web client 30 and a Web server 54, connectable through the Internet 44. The Web client 30 includes a PC 32 operating client software 34, an example of which is ICW Client, available from Southwestern Bell Telephone Company.

Generally, Intelligent Call Forwarding enables a subscriber to direct incoming calls to alternative telephone numbers, both when the subscriber's phone 25 is busy or not busy. In an embodiment, Intelligent Call Forwarding further includes several optional features that the subscriber customizes. Among these features is a weekly scheduler, which enables the subscriber to construct a weekly schedule of multiple times for activating and deactivating Intelligent Call Forwarding, as well as any features associated with Intelligent Call Forwarding. For example, the scheduler indicates the times at which the priority screening list and screening rejection list are on/off, which times do not necessarily correspond to the Intelligent Call Forwarding service activation. The scheduler also designates the telephone numbers to which calls are to be forwarded corresponding to the various services and their various on/off times. The scheduler is implemented through a tod/dow table, which is stored at the SCP 23 and accessible by the subscriber via the Internet 44.

The priority screening list is available for use at the subscriber's option. The 37 lo list contains the names and telephone numbers of priority callers, as designated by the subscriber. In an embodiment, if the priority screening list has been activated, the SCP 23 will only process calls originating from phone numbers included in the list. All other calls are terminated at the subscriber's phone 25. The processing includes either sending a message to the subscriber engaged in the Internet session, notifying the subscriber of the priority caller, or forwarding the priority callers to a priority, alternative telephone number, where they hear a voice announcement and are provided the option to leave a message. The priority screening list is implemented through a screening table, which is stored at the SCP 23 and accessible by the subscriber via the Internet, as discussed in detail below.

Similarly, the rejection screening list is available for use at the subscriber's option. This list contains the names and telephone numbers of callers from which the subscriber does not want to accept calls. If a number is on the rejection screening list, and the list is active, then the call is terminated at the subscriber's phone 25, or it is terminated to a directory number specifically reserved to respond to rejection screening list callers. In an embodiment, this alternative number provides a voice announcement and an option for the screened caller to leave a message. As in the case of the priority screening list feature, the rejection screening list is implemented through a rejection screening table, which is stored at the SCP 23 and accessible for update by the subscriber via the Internet 44 and the Web server 54.

Figure 21:
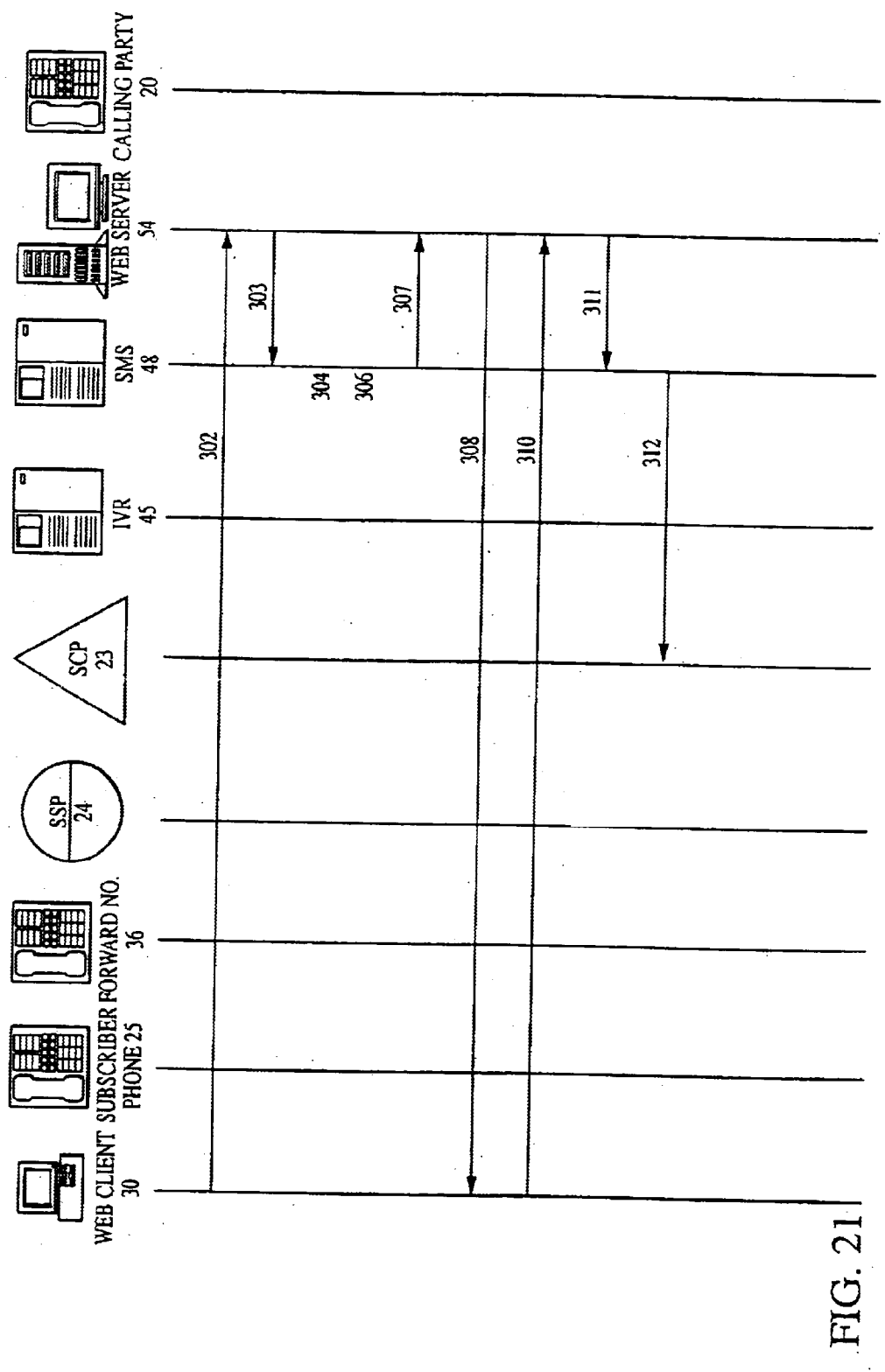
FIG. 21 is an exemplary call flow diagram in which the subscriber accesses the Intelligent Call Forwarding data via the Internet, according to an aspect of the present invention.

A subscriber's exemplary interaction with Intelligent Call Forwarding is depicted in the call flow diagram of FIG. 21. As with the Flexible Call Forwarding service, the subscriber is able to access the Intelligent Call Forwarding service via the Internet or IVR 45, thereby greatly increasing flexibility and convenience. FIG. 21 depicts interaction with Intelligent Call Forwarding over the Internet, using a GUI, which includes the more complicated procedures for customizing the service, such as building the screening lists and weekly schedules. In the Internet interface, the subscriber accesses a unique URL associated with the service provider to obtain the Web screens of Intelligent Call Forwarding, provided by the SMS 48. In an embodiment, an alternative manner for accessing the Intelligent Call Forwarding data via the Internet is through the PCM service, described above.

As shown at step 302 of FIG. 21, in order to access Intelligent Call Forwarding, the subscriber must log-on to the Web server 54 from the Web client 30 through the Internet 44. This step incorporates use of any compatible Web browser, such as such as Microsoft Internet Explorer 4.0, Netscape Navigator 4.7 or Hotjava. The Web client 30 also incorporates Intelligent Call Forwarding enabling software 34, such as ICW Client, available from Southwestern Bell Telephone Company. Once on the Internet 44, the subscriber connects to the Web server 54. The Web server 54 receives HTTP messages from the subscriber Web client 30 and provides HTML Web pages in response to the subscriber's input. The Web pages relate to the subscriber's Intelligent Call Forwarding service.

Once connected to the Web server 54, the user must provide authentication information to access the corresponding account, through the Web server 54 at step 303. The SMS 48 performs the authentication. After receiving the account number and associated PIN from the subscriber via the Web server 54, the SMS 48 retrieves the authentication data at step 304 to confirm that the subscriber is an authorized user.

After successful authentication, the SMS 48 retrieves at step 306 the current service data for Intelligent Call Forwarding, including current screening lists and weekly schedules. The SMS 48 transmits the information, along with a list of additional services and phone numbers, if any, corresponding to the subscriber, to the Web server 54 at step 307. The Web server 54 forwards the information to the Web client 30 at step 308, via the Internet 44. The subscriber is presented with a number of options for each telephone number in the account. For example, the subscriber can change the PIN, enter the forwarding directory number, toggle the Intelligent Call Forwarding service ON or OFF, and activate or deactivate the priority screening list, the rejection screening list and the weekly schedule. In addition, the subscriber can build or edit the priority screening lists and weekly schedules. Once the changes have been entered by the subscriber and forwarded to the Web server 54 at step 310, the Web server 54 forwards the updated data to the SMS 48 at step 311. The SMS 48 stores the data and also updates the SCP 23 at step 312 for implementation.

Figure 22:
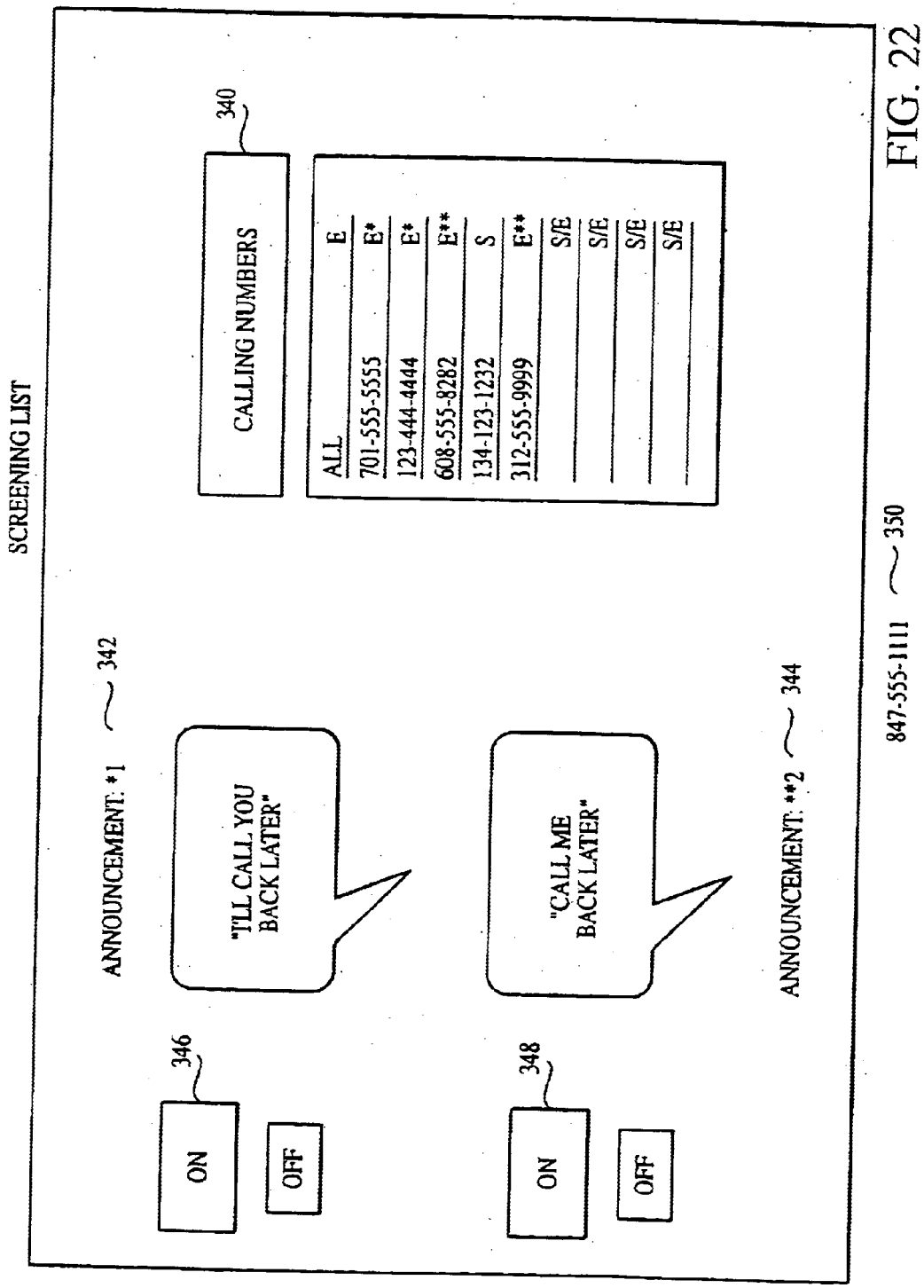
FIG. 22 is an exemplary Web page to be displayed at the user's PC showing a rejection screening list for Intelligent Call Forwarding, according to an aspect of the present invention.

The Web pages and associated prompts for input by the subscriber are similar to those shown in FIGS. 3–8 in reference to Flexible Call Forwarding. In addition, FIG. 22 depicts an exemplary Web page related to the rejection screening list (which may also be included in the Flexible Call Forwarding service). The Web page is displayed on the monitor of PC 32 at the Web client 30 and includes the subscriber's telephone number 350, which in this example is 847-555-1111. The subscriber may enter the telephone numbers of calls to be accepted and rejected by building the priority and rejection screening lists, respectively. Box 340 of FIG. 22 shows various directory numbers that the subscriber has identified for special treatment. It also contains the ALL calling numbers options, which when selected by the subscriber, causes the Intelligent Call Forwarding service to process all incoming calls to the subscriber's phone number 350 the same.

In this example, the calling numbers on the subscriber's priority screening list are indicated by a single asterisk and calling numbers on the rejection screening list are indicted by double asterisks. In an embodiment of the invention, the calling numbers on the screening lists can be highlighted in different colors, for example, to aid the subscriber in visually distinguishing priority calling number from rejection calling numbers. The subscriber can then select the announcement to be played for each screening list. In this example, announcement 342, i.e., "I'll call you back later," is played in response to calling numbers on the priority screening list and announcement 344, i.e., "Call me back later," is played in response to calling numbers on the rejection screening list. The ON/OFF icons 346 and 348 activate and deactivate the announcements 342 and 344, respectively. As in all embodiments of the invention, the activation and deactivation may be accomplished by the GUI at Web client 30 via the Internet or by a DTMF telephone in conjunction with the IVR 45 via the PSTN.

Of course, numerous other options are available to the subscriber, such as message playback language. The "S" and "E" indicators show that the message will be played in Spanish and English, respectively. Other languages are of course possible. Moreover, the subscriber may elect to be notified at the Web client 30 of calls from numbers on the priority screening list during the Internet session, while calls from numbers on the rejection screening list are not notified to the subscriber. Instead, the rejected calls may hear a busy signal or may be forwarded to a number or prerecorded message reserved for rejected calls. The exemplary Web page of FIG. 9 also depicts a typical summary screen of the Intelligent Call Forwarding service.

Figure 23:
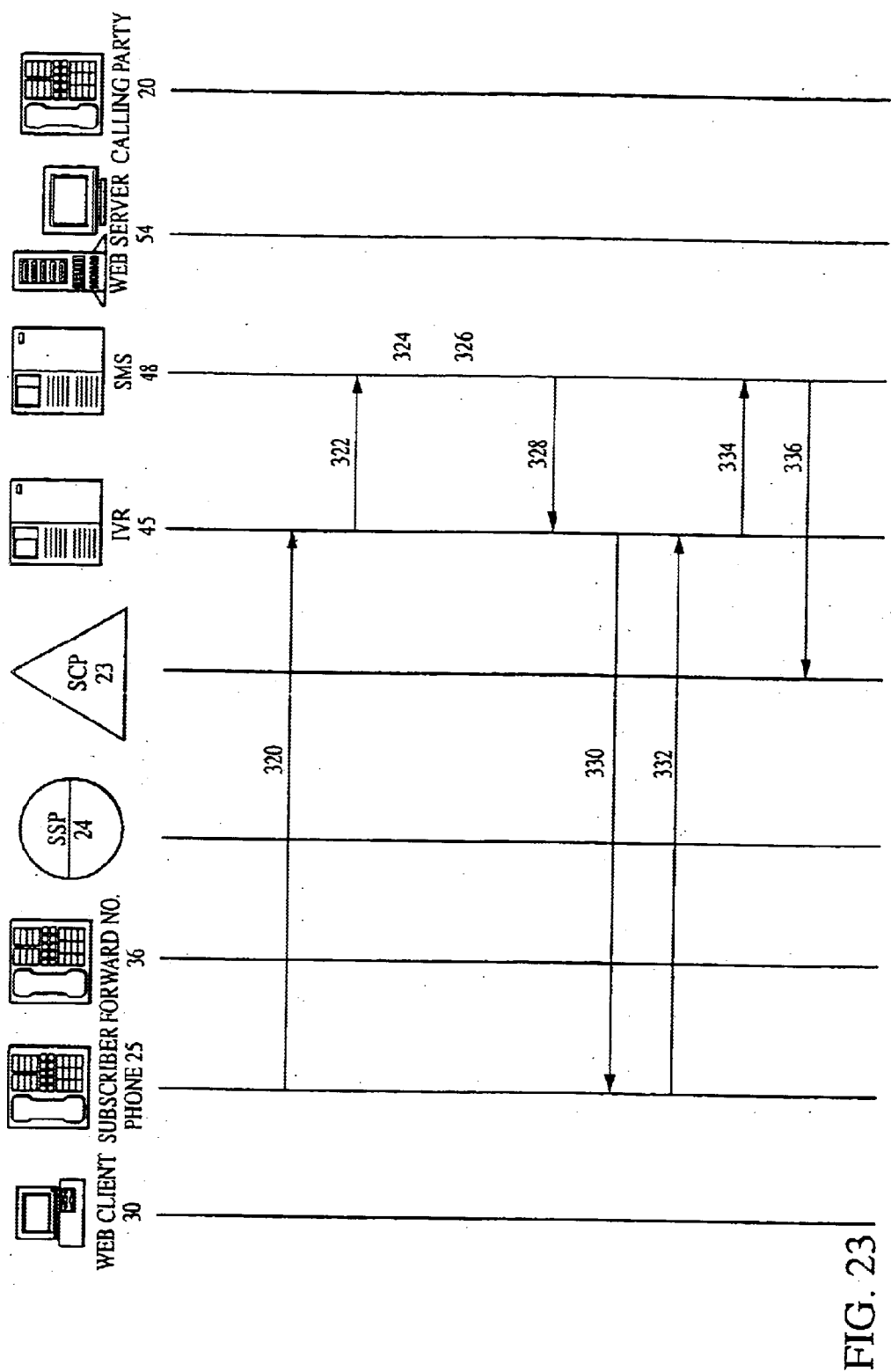
FIG. 23 is an exemplary call flow diagram in which the subscriber accesses Intelligent Call Forwarding data via an IVR, according to an aspect of the present invention.

The subscriber can alternatively interact with Intelligent Call Forwarding using the IVR 45, exemplary steps of which are shown in FIG. 23. Access through the IVR 45 is slightly limited in that the subscriber cannot actually build or edit screening lists and weekly schedules. However, the subscriber can access all other features of Intelligent Call Forwarding, including changing the PIN, toggling the service ON or OFF, and activating/deactivating the priority screening list, the rejection screening list and the weekly schedule.

Referring to FIG. 23, the subscriber calls a toll free number from any DTMF telephone, which directly accesses the IVR 45, shown at step 320. FIG. 23 depicts, as an example, the call originating from the subscriber phone 25. The IVR 45 receives the call and initiates a request for various authentication information, including the account and PIN number. These numbers coincide with the account and PIN numbers used to access the Flexible Call Forwarding service via the Internet 44. The preprogrammed voice announcements for this aspect of the invention reside in the IVR 45, and implementation of the voice announcements is well known. The authentication information is provided using the touch tone from the key pad of the DTMF telephone 25. The IVR 45 forwards the information to the SMS 48 at step 322, which in turn verifies the authorization at step 324.

After verification, the system operates in much the same way as described above with respect to a GUI and the Internet. Specifically, the SMS 48 retrieves account information, including the status of Intelligent Call Forwarding service, at step 326. At step 328, the SMS 48 provides the account information to the IVR 45, which verbally recite a menu of options to the subscriber at step 330 based on the information received from the SMS 45. For example, if the subscriber has previously built a priority screening list, activation of this list will be included among the options provided to the user over the telephone. The subscriber listens to the options and inputs various choices at step 332 via the telephone touch tone key pad, including, for example turning on Intelligent Call Forwarding or selecting and activating a predefined priority screening list, rejection screening list or weekly schedule. The subscriber can also set the automatic-off function date and time.

The commands are forwarded from the WVR 45 to the SMS 45 at step 334. The SMS 45 then updates the Intelligent Call Forwarding data contained in the SCP 23 at step 336. Once the data is stored at the SCP 23, the Intelligent Call Forwarding service is set with respect to incoming calls, in accordance with the customizing instructions from the subscriber.

Once Intelligent Call Forwarding is customized and activated, it is implemented in much the same way as ICID. In an embodiment of the invention, a TAT is assigned to the subscriber's directory number or line, depending upon the type of switch. Once the trigger has been assigned and activated, every terminating call to the subscriber's line 25 will cause the terminating SSP 24 to suspend the call and send an AIN query message, via the existing SS7 network and the appropriate STP 22, to the subscriber's serving SCP 23 for instructions. The SCP 23 stores a call processing record for each subscriber and requests information from the other network elements. In particular, the SCP 23 receives the TAT query from the SSP 24 and responds to the SSP 24 with routing instructions for calls to subscribers.

In one embodiment, as depicted in FIG. 20, the RS 56 receives registration requests from the client software 34 when the subscriber logs on to the Internet 44 and activates the service. The RS 56 stores information related to the subscriber's on-line Internet status. The RS 56 is the first database accessed by the SCP 23 during the processing of an Intelligent Call Forwarding or an ICID call. Based upon the information provided in a GetData query, the RS 56 returns a response containing information associated with requested data elements to the SCP 23. For example, the RS 56 responds to the GetData query from the SCP 23 with information about the subscriber's Internet session status. Alternatively, the SCP 23 itself can determine the subscriber's on-line Internet status.

A GetData query, sent via TCP/IP, includes an identifier, a service key, and a data element. The identifier indicates that the query is a GetData query, the service key contains an indication of the subscriber for which information is requested and, optionally, security information. The data element is the calling party's name being retrieved.

Additionally, the SCP 23 uses the name database 50 database to retrieve calling party name information associated with the calling party's telephone number for transmission to the subscriber. The interface between the name database 50 and the SCP 23 is the Bellcore GetData query provided over the SS7 network. With this interface, the SCP 23 can receive data from the name database 50. To support the GetData query, the SCP 23 accesses the name database 50 with the directory number of the calling party in order to obtain the calling party name. Detailed information about the GetData interface may be obtained in Bellcore GR-2838-CORE, Generic Requirements for GetData, the disclosure of which is expressly incorporated by reference herein in its entirety. Alternatively, depending on the capabilities of the SCP 23, the calling party name can be stored and retrieved at the SCP 23 without an external database.

If it is determined that the subscriber is on-line, the SCP 23 queries the LNP database 55, in a known manner, to determine if the calling party number received in the TAT query has been ported. The telephone number received in a response from the LNP database 55 is used to determine the calling party name, when it is available.

In this embodiment of the invention, the ICW server 61 is the communications interface between the SCP 23 and the client software 34 at the Web client 30. Specifically, the ICW server 61 receives information related to incoming calls from the SCP 23 and passes this information directly to the subscriber via TCP/IP utilizing the Internet 44. Further, the ICW server 61 passes de-registration requests from the client software 34 to a heartbeat server 58.

Additionally, the SCP 23 provides the ICW server 61 with the client software version number running on the subscriber's PC 32. Subsequently, the ICW server 61 determines if the subscriber has the latest version of the client software. If the ICW server 61 determines that the subscriber does not have the latest version of the client software, it notifies the subscriber that they need to update their client software. This notification is given when the ICW server 61 passes the caller identification information to the subscriber.

During the course of an active Internet session with the Intelligent Call Forwarding or the ICID service turned on, the client software 34 periodically transmits heartbeat messages via the Internet 44 utilizing TCP/IP to the heartbeat server 58, in one embodiment of the invention. In response, the heartbeat server 58 updates the RS 56 via TCP/IP with the subscriber's on-line status, and notifies the RS 56 in situations where there is an interruption of heartbeat messages from the client software 34, indicating a possible undesired disconnection of the Internet session. Additionally, if the subscriber currently connected to the Internet 44 elects to accept an incoming telephone call (as will be discussed later), the client software 34 sends a de-registration request, which is passed to the heartbeat server 58.

After the RS 56 receives a registration request from the client software 34, the RS 56 sends a heartbeat setup message to the Heartbeat server 58 via TCP/IP to alert it to expect to receive heartbeat messages from the client. As a result, the heartbeat server 58 begins to receive keep-alive messages from the client after the registration is completed. If the client sends a keep-alive message that does not match the information in the heartbeat server 58 memory, then the heartbeat server 58 sends a registration database query to the RS 56 via TCP/IP. If the query results match the data received, the copy in memory is updated. If the results of the query do not match, the heartbeat server 58 opens a TCP/IP session to send a message instructing the client to re-register with the RS 56.

The interface between the SCP 23 and the RS 56 and between the SCP 23 and the ICW server 61 is, for example, the Bellcore GDI for TCP/IP. This interface provides the capability to send/receive transactions to and from external systems over TCP/IP using Transaction Capabilities Application Part (TCAP) messages. The SCP 23 can get data, send data, or invoke an application (InvokeApp) from a database such as the RS 56 or ICW server 61. More information may be obtained from Bellcore SR-3389, SCP Generic Data, Interface Specification for TCP/IP, Version 5.0, Issue 2, January 1997, the disclosure of which is expressly incorporated by reference herein in its entirety.

The client software 34 is the subscriber interface for the Intelligent Call Forwarding and the ICID services. As discussed above, the client software 34 permits the subscriber to turn the services ON and OFF, choose preset options, and select call disposition options. An InvokeApp message is used to invoke the applications on the ICW server 61 and to return the subscriber's selected disposition options. Additionally, the client software 34 provides a visual and audible alert to the subscriber of an incoming telephone call, sends Internet registration and deregistration requests, sends the subscriber's option selection to the ICW server 61, and sends heartbeat messages to the heartbeat server 58. An InvokeApp message, sent via TCP/IP, may include standard AIN parameters, well known in the art.

Figure 24:
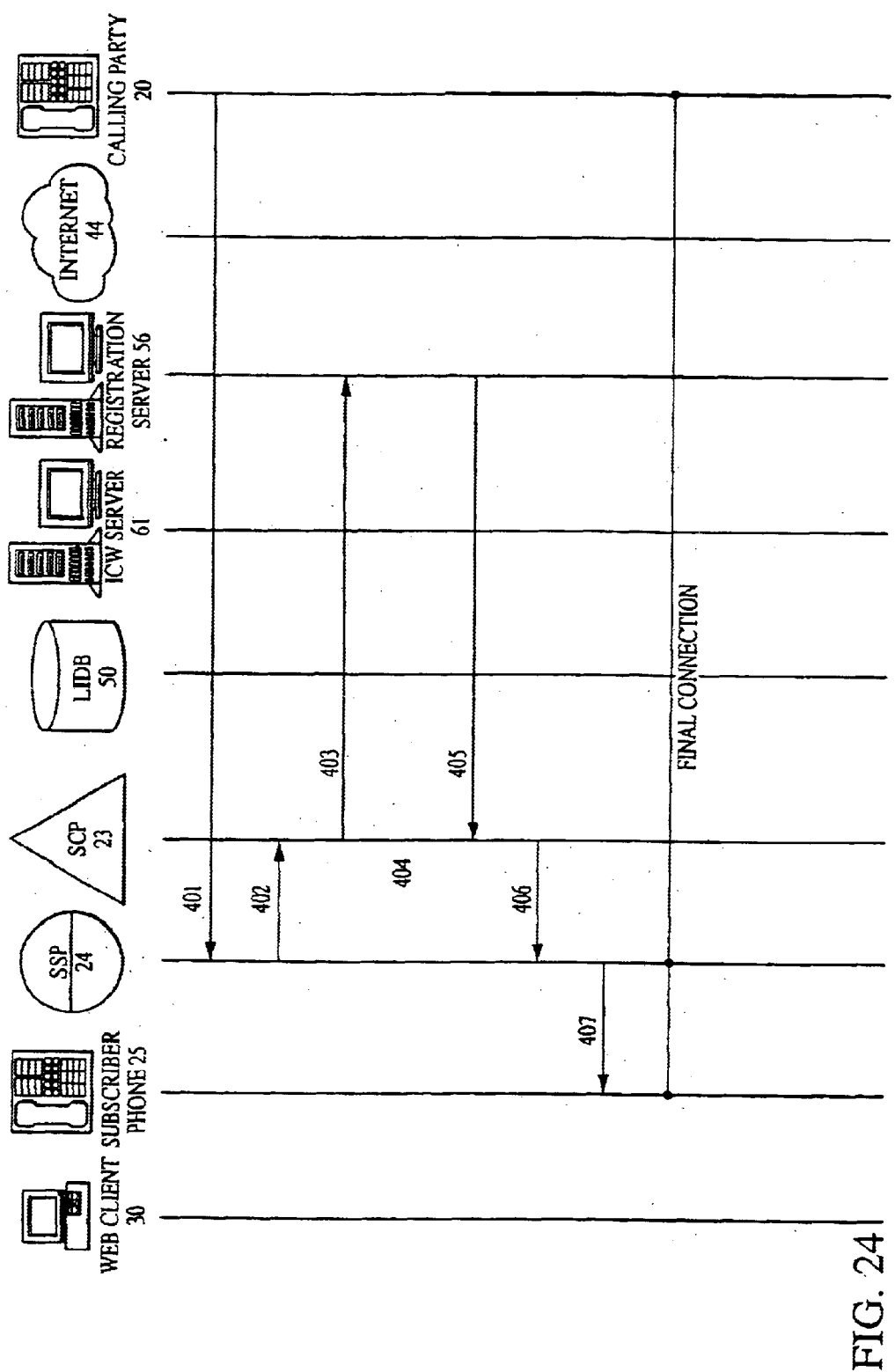
FIG. 24 is an exemplary call flow diagram in which Intelligent Call Forwarding and ICID have been deactivated, or when no active Internet session exists, according to an aspect of the present invention.

The exemplary telecommunications network depicted in FIG. 20 handles incoming calls according to various options invoked by the subscriber, as depicted in exemplary call flow diagrams of FIGS. 24–30. FIG. 24 is a call flow diagram in which neither the Intelligent Call Forwarding nor the ICID service has been turned on, or in which no active Internet session exists, although in an embodiment, the Intelligent Call Forwarding service can be active even when there is no active Internet session. At step 401, a telephone call is placed to the subscriber. A TAT in the terminating SSP 24 causes the call to be suspended at the SSP 24. The trigger also causes the SSP 24 to transmit an AIN query message including the calling party number (if available) and called party number via the SS7 network and the appropriate STP 22 to the subscriber's serving SCP 23 at step 402. At step 403, the SCP 23 sends a GetData query to the RS 56 with the called party's telephone number to request the on-line status of the subscriber. At step 404, the SCP 23 sets a timer equal to a predetermined time, e.g., 2 seconds. In the event that the RS 56 does not respond within the predetermined time (indicating a timeout condition) or responds with an error, the SCP 23 sends an authorize termination response to the SSP 24. As a result, the SSP 24 terminates the suspended telephone call at the subscriber's line and the call may encounter features programmed on the line, e.g., call waiting.

If it is determined at the RS 56 that the subscriber is not currently on-line or has the services turned off, the RS 56 responds with a "0" at step 405. The SCP 23 then sends an authorize termination response to the SSP 24 at step 406, which terminates the call to the subscriber's telephone line at step 407. As a result, a connection is made between the calling party and the subscriber. As the call attempts to terminate, it encounters any features programmed on the subscriber's telephone line, e.g., call waiting.

Figure 25:
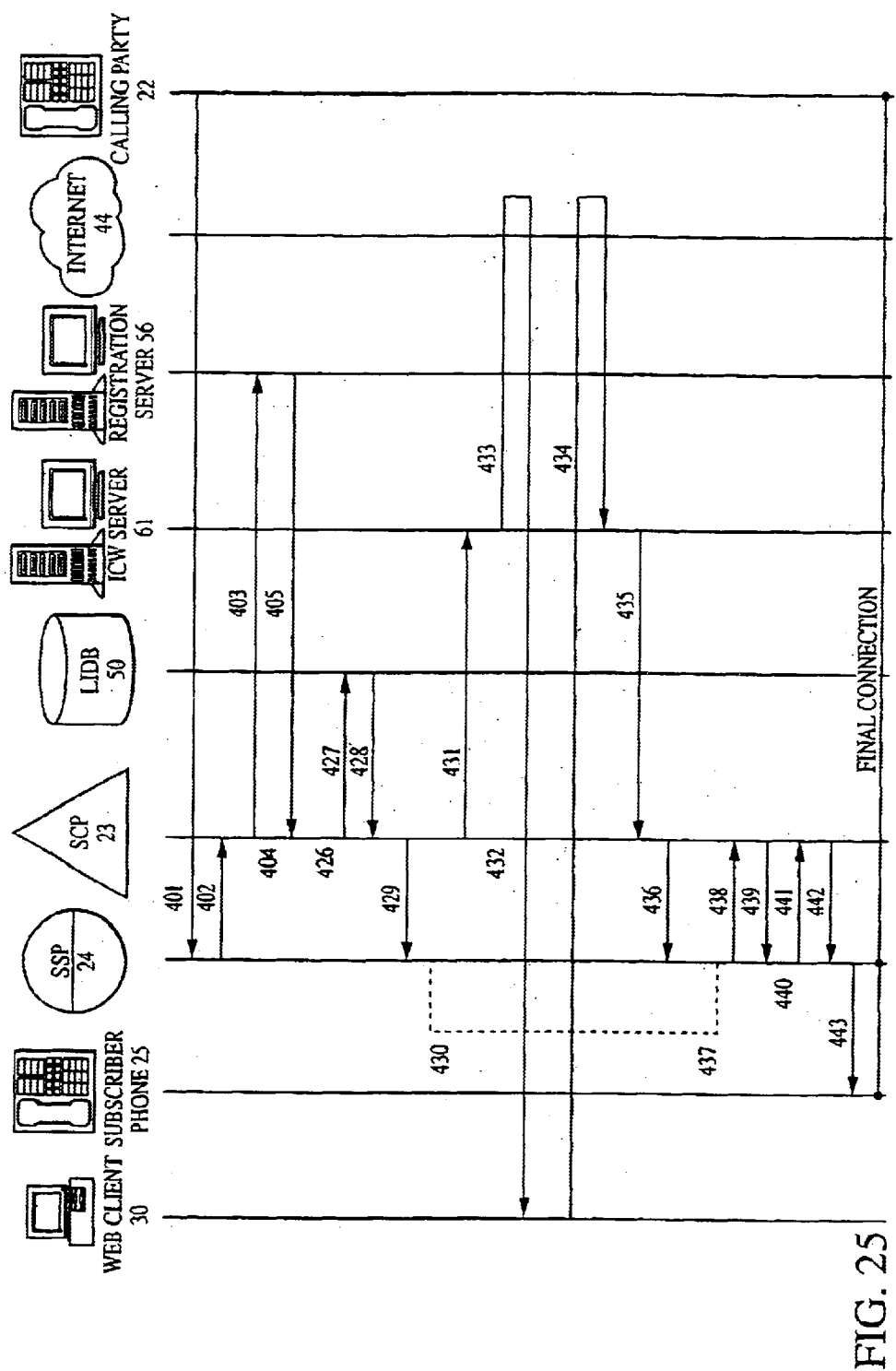
FIG. 25 is an exemplary call flow diagram in which the subscriber elects to accept the incoming telephone call, according to an aspect of the present invention.

FIG. 25 is a call flow diagram in which the subscriber elects to accept the incoming telephone call. The telephone call is placed by the calling party 20 and handled according to steps 401–404, described above. If the subscriber is on-line and the Intelligent Call Forwarding or the ICID service is active, the RS 56 responds with a "1" at step 405. The RS 56 also responds with the IP address, port number and subscriber key information for the subscriber's Internet session.

At step 426, a check is performed at the SCP 23 to confirm that the subscriber has voice mail service. Also, the SCP 23 determines whether the presentation restriction value is restricted or unavailable. If the presentation restriction value is restricted and the called party subscribes to the Anonymous Call Rejection (ACR) service, an authorize termination response is sent to the SSP 24 allowing the call to be rejected. ACR prevents calls to subscribers when a calling party blocks their number.

If the calling party number is delivered with the query and the presentation restriction indicator for the incoming call is allowed, the SCP 23 launches a query to the local number portability database 55 to determine whether the received calling party number is ported. The telephone number returned in the response is either equal to the calling party number sent in the query if the telephone number is not ported or the local routing number if the telephone number is ported. The telephone number from the response is used as the calling party number and checked against entries in a table to determine if the NPA-NXX belongs to a participating local exchange carrier (LEC). A participating LEC is one that provides data from its LIDB, or allows access to its LIDB.

If the calling party number is found to be a participating LEC, a GetData query is launched to the name database 50 at step 427 to retrieve the calling party's name. If the calling party number was not delivered with the query, or there is no participating LEC, or the presentation restriction indicator for the incoming call is anonymous or unavailable, the SCP 23 will not launch a GetData query to the name database 50 to retrieve the calling party's name. In this event, the calling party name is null in the InvokeApp query to the ICW server 61. If available, the calling party's name is sent to the SCP 23 from the name database 50 at step 428.

At step 429, the SCP 23 instructs the SSP 24 to play a "please hold" announcement to the calling party to request the calling party to hold the line (step 430). At step 431, the SCP 23 sends an InvokeApp request to the ICW server 61. The request contains the called party number, the calling party number (if available and not presentation restricted), the calling party name (if available and not presentation restricted), an associated IP address, the port number, the client software version, and an indicator as to whether or not the subscriber has voice mail service.

At step 432, the SCP 23 sets a timer equal to a predetermined time, e.g., 25 seconds. In the event that the ICW server 61 does not respond within the predetermined time (indicating a timeout condition) or responds with an error, the SCP 23 instructs the SSP 24 to stop playing the "please hold" announcement to the caller. Then, the SSP 24 begins playing an announcement to the caller or forwarding the call in accordance with the Intelligent Call Forwarding instructions. When voice mail is available, the message informs the caller that the call is being forwarded to a voice mail service. Lastly, the SCP 23 sends an authorize termination response to the SSP 24. If the subscriber does not have voice mail service, an error is reported and the SCP 23 sends an authorize termination response to the SSP 23. As a result, the SSP 23 terminates the suspended telephone call to the subscriber's telephone line and the call encounters any other features programmed on the line.

If no timeout occurs, at step 433 the ICW server 61 sends a message via the Internet 44 to the subscriber, which appears on the subscriber's display at Web client 30, informing the subscriber of the incoming call and presenting the subscriber with disposition options for the call. The message displayed may be a pop-up dialog box.

At step 434, the subscriber elects to accept the telephone call, and as a result, the client software 34 responds to the ICW server 61 with option 1 and will send a deregistration message to the RS 56, and begin to terminate the subscriber's Internet session. The ICW server 61 passes the subscriber's option 1 selection to the SCP 23 at step 435. At step 436, the SCP 23 instructs the SSP 24 to stop playing the "please hold" announcement to the caller. At step 437, the "please hold" announcement is terminated by the SSP 24 and at step 438, the SSP 24 sends a resource clear message to the SCP 23 confirming that the message is no longer playing. At step 439, the SCP 23 instructs the SSP 24 to begin playing a "will take your call" announcement to the caller (step 440). At step 441, the SSP 24 sends a resource clear message to the SCP 23. At the conclusion of the "will take your call" announcement, the SCP 23 sends an authorize termination response to the SSP 24 which terminates the suspended call to the subscriber's telephone line (steps 442–443). That is, the calling party 20 is connected to the subscriber phone 25.

Figure 26:
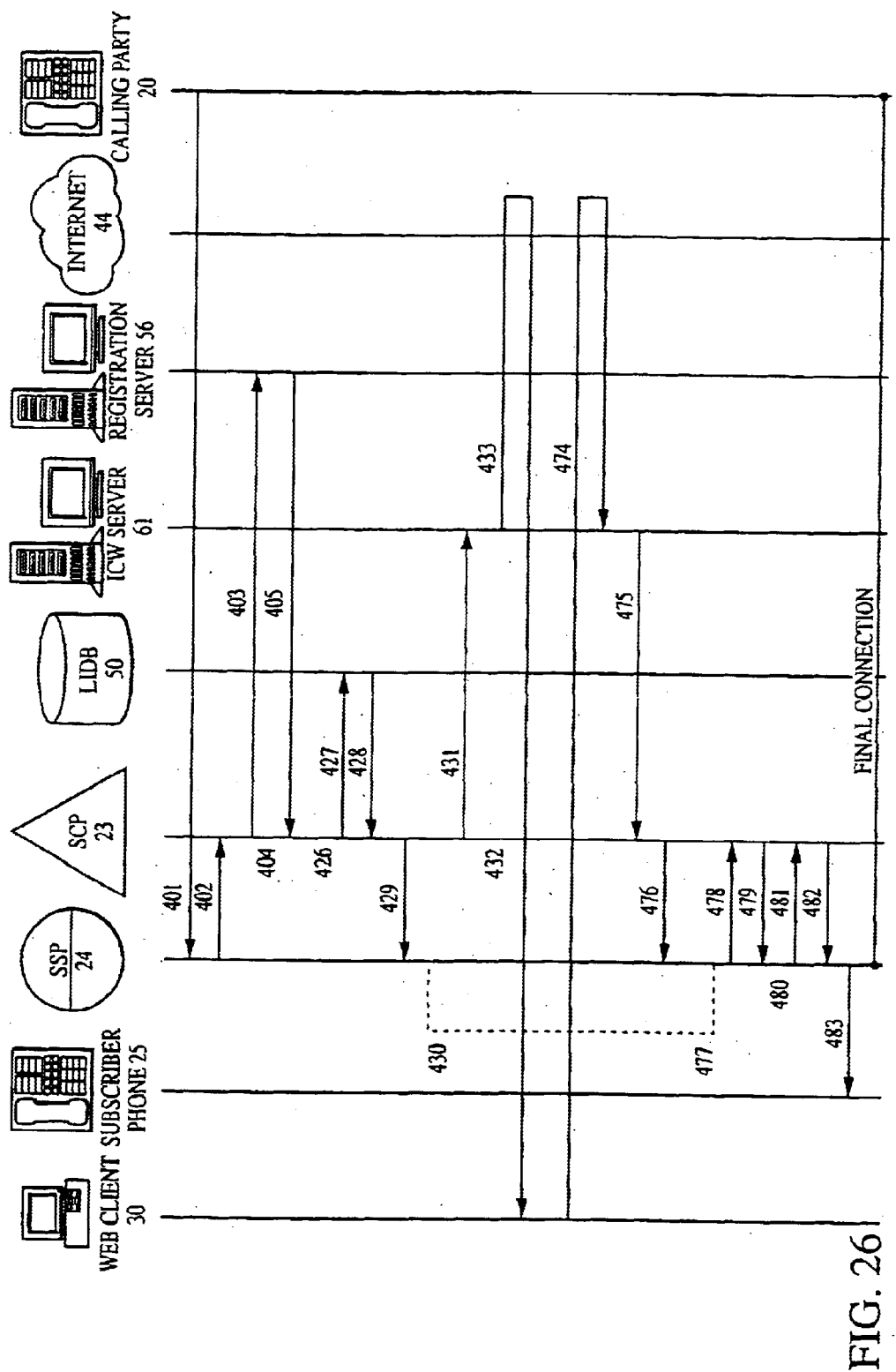
FIG. 26 is an exemplary call flow diagram in which the subscriber elects to forward the incoming telephone call to voice mail, according to an aspect of the present invention.

FIG. 26 is a call flow diagram in which the subscriber is on-line and elects to forward an incoming telephone call to voice mail service. The telephone call placed to the subscriber is processed according to steps 401–433, discussed above. In response to the query from the ICW server 61 (at step 433), the subscriber elects option 2 at step 474 to send the incoming telephone call to voice mail service. As a result, the client software 34 responds to the ICW server 61 and will not terminate the subscriber's Internet session.

The ICW server 61 passes the subscriber's option 2 selection to the SCP 23 at step 475. At step 476, the SCP 23 instructs the SSP 24 to stop playing the "please hold" announcement to the caller. At step 477, the "please hold" announcement is terminated by the SSP 24 and at step 478, the SSP 24 sends a resource clear message to the SCP 23 confirming that the message is no longer playing. At step 479, the SCP 40 instructs the SSP 24 to begin playing a "forwarding to voice mail service" announcement to the caller (step 480). At step 481, the SSP 24 sends a resource clear message to the SCP 23.

At the conclusion of the "forwarding to voice mail service" announcement, the SCP 23 sends an authorize termination response to the SSP 24 which terminates the suspended call to the subscriber's busy telephone line (steps 482–483). As the call attempts to terminate at the subscriber's line, the call encounters programming associated with voice mail service and the call is forwarded accordingly. Ultimately, the calling party is connected with the subscriber's voice mail box and has the option of leaving a message.

Figure 27:
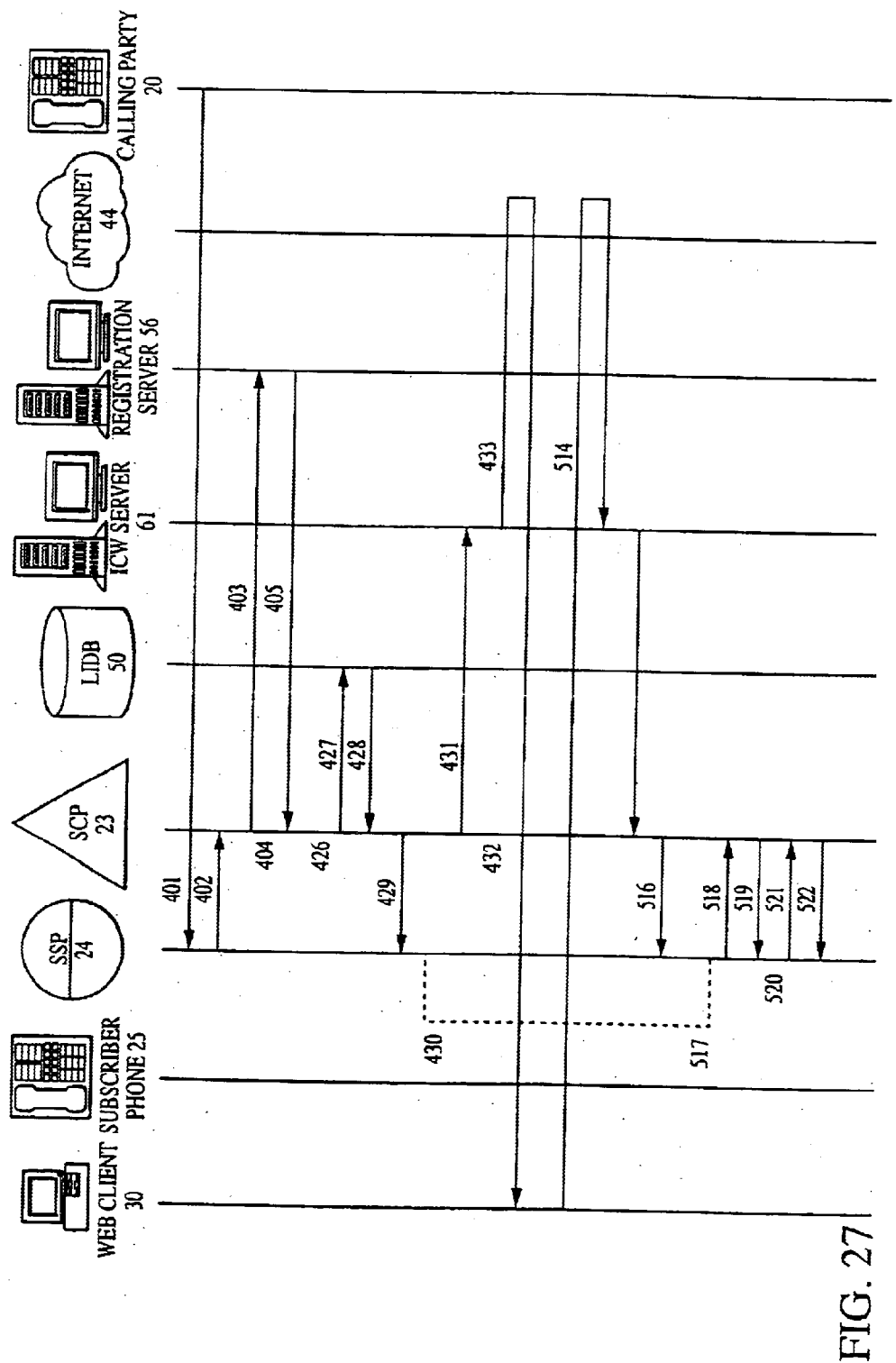
FIG. 27 is an exemplary call flow diagram in which the subscriber elects to play an announcement to the caller, according to an aspect of the present invention.

FIG. 27 is a call flow diagram in which the subscriber is on-line and elects to send an incoming telephone call to an announcement. The telephone call placed to the subscriber is processed according to steps 401–433, discussed above. In response to the query from the ICW server 61, the subscriber elects to send the telephone call to an announcement at step 514. As a result, the client software 34 responds to the ICW server 61 with the announcement selection number, which includes two choices. The first message that may be played advises the caller that the subscriber is busy and that the caller should call back later. The second option advises the caller that the subscriber is busy and that the subscriber will return the call to the caller at a later time.

The ICW server 61 passes the subscriber's selection to the SCP 23 at step 515. At step 516, the SCP 23 instructs the SSP 24 to stop playing the "please hold" announcement to the caller. At step 517, the "please hold" announcement is terminated by the SSP 24 and at step 518, the SSP 24 sends a resource clear message to the SCP 23 confirming that the message is no longer playing. At step 519, the SCP 23 instructs the SSP 24 to begin playing the selected announcement (step 520). At step 521, the SSP 24 sends a resource clear message to the SCP 23. At the conclusion of the selected announcement, the SCP 23 instructs the SSP 24 to disconnect the call at step 522.

Figure 28:
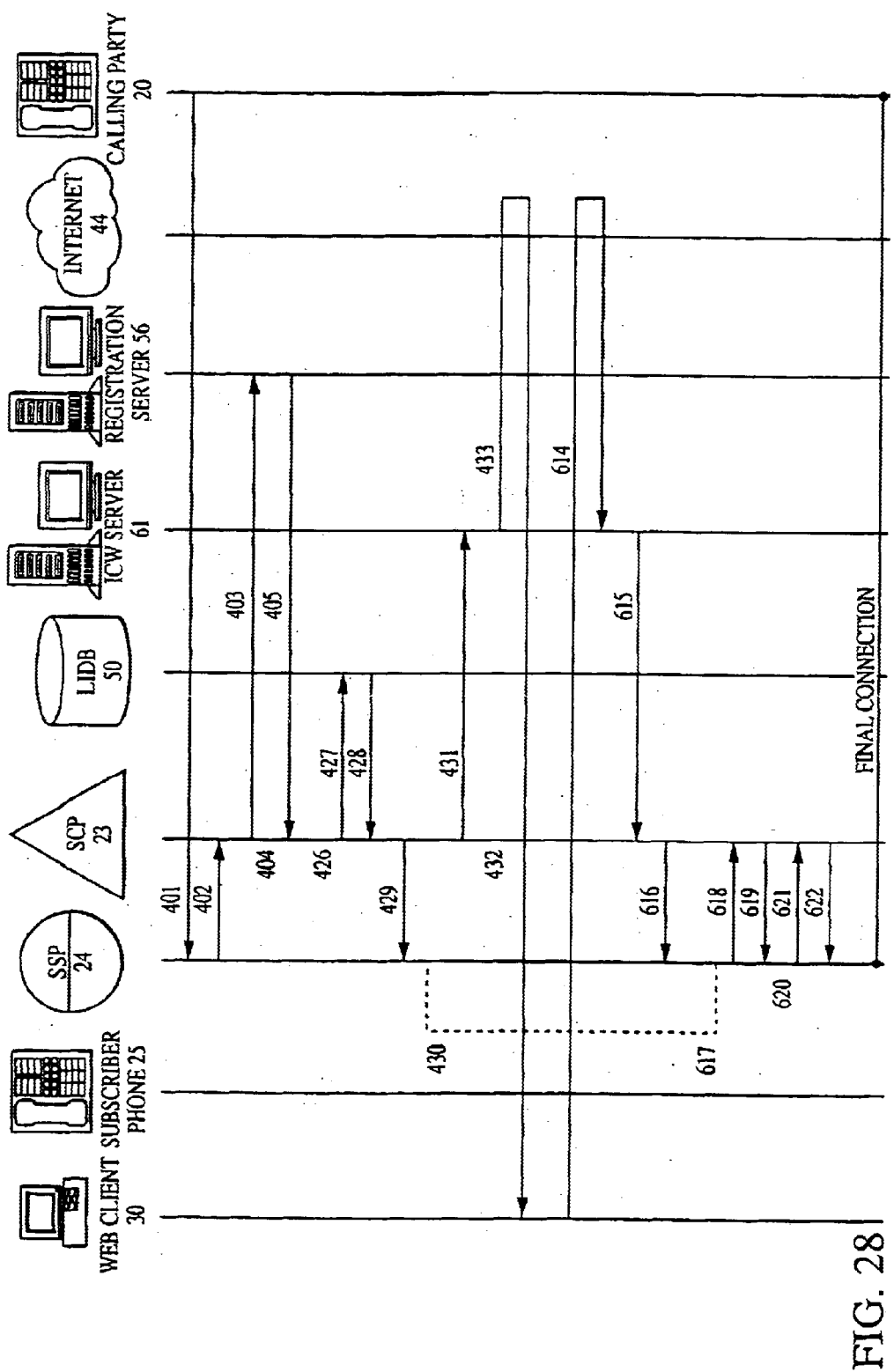
FIG. 28 is an exemplary call flow diagram in which the subscriber elects to redirect the incoming telephone call to an alternate telephone number, according to an aspect of the present invention.

FIG. 28 is a call flow diagram in which the subscriber is on-line and elects to forward an incoming telephone call to another telephone line. The telephone call placed to the subscriber is processed according to steps 401–433, discussed above. In response to the query from the ICW server 61, the subscriber elects option 3 to redirect the call to another telephone number at step 614. As a result, the client software 34 responds to the ICW server 61 with option 3 and a ten digit "forward to" telephone number as selected by the subscriber. The ICW server 61 passes the subscriber's option 3 selection and the selected ten digit "forward to" telephone number to the SCP 23 at step 615.

At step 616, the SCP 23 instructs the SSP 24 to stop playing the "please hold" announcement to the caller. At step 617, the "please hold" announcement is terminated by the SSP 24 and at step 618 the SSP 24 sends a resource clear message to the SCP 23 confirming that the message is no longer playing. At step 619, the SCP 23 instructs the SSP 24 to begin playing a "forwarding to another number" announcement to the caller (step 620). At step 621, the SSP 24 sends a resource clear message to the SCP 23. At the conclusion of the "forwarding to another number" announcement, the SCP 23 sends a Forward Call response to the SSP 24 which initiates the process of forwarding the call to the specified telephone number (step 622). Ultimately, the calling party is connected to the forwarded number through the SSP 24.

In FIGS. 26–28, if the subscriber does not respond to the query from ICW server 61, or if the RS 56 indicates that the subscriber is no longer on-line, the SCP 23 processes the incoming call in accordance with the subscriber's previously built and stored call forwarding data. In one embodiment of the invention, the subscriber can specifically choose to instruct the SCP 23 to process the call in accordance with previously built and stored call forwarding data, in response to the query from ICW server 61. Processing calls in accordance with previously built and stored call forwarding data is discussed in detail in regard to FIGS. 32–34, below.

Figure 29:
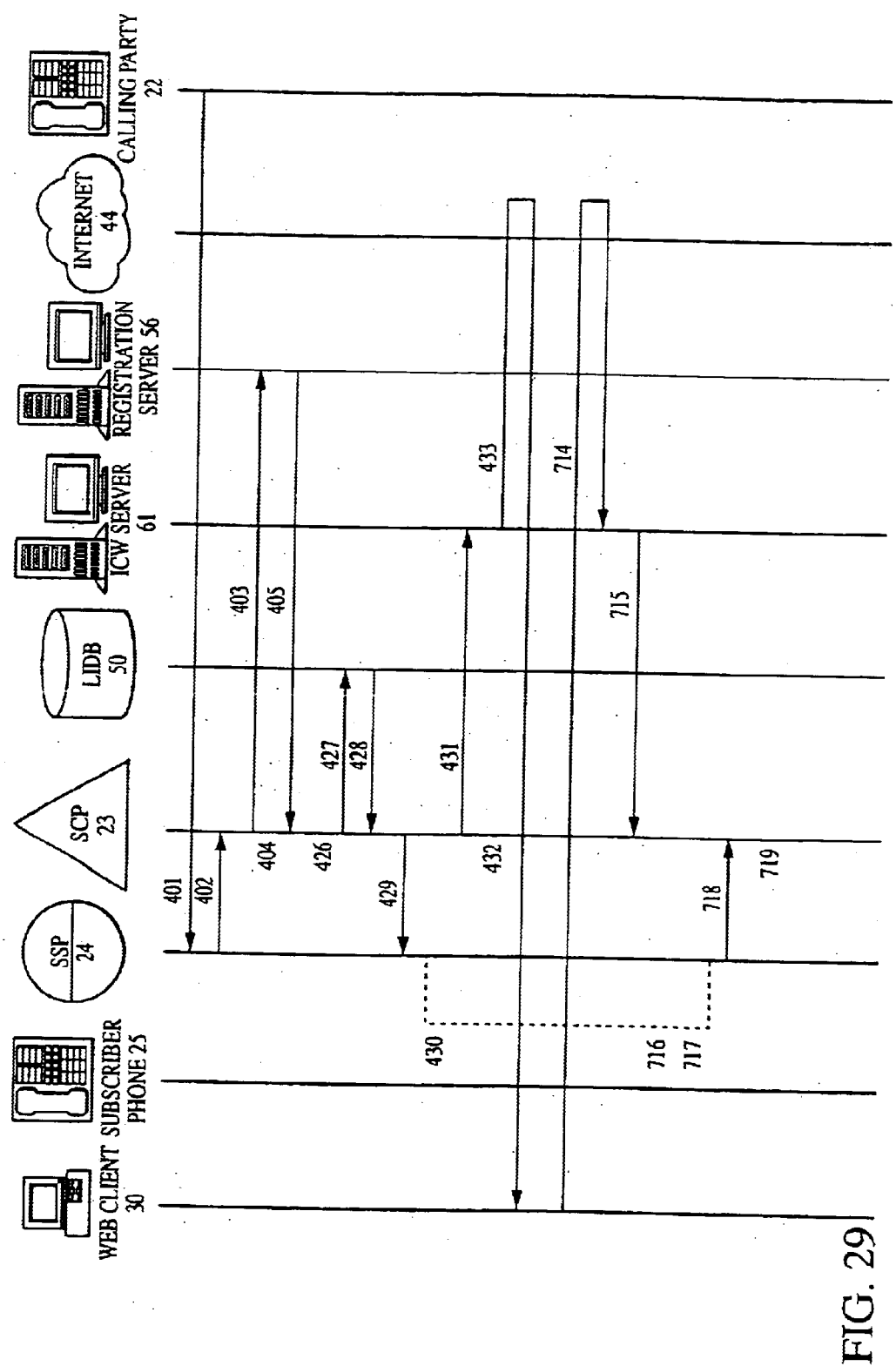
FIG. 29 is an exemplary call flow diagram in which the calling party abandons the telephone call to the subscriber after a response from the Web server, according to an aspect of the present invention.

FIG. 29 is a call flow diagram in which the caller abandons a telephone call after a response from the ICW server 61. The telephone call placed to the subscriber is processed according to steps 401–433, discussed above. In response to the query from the ICW server 61, the subscriber elects a call disposition option described herein in order to control the incoming telephone call. As a result, the client software 34 responds to the ICW server 61 with the option at step 714. The ICW server 61 passes the subscriber's option selection to the SCP 23 at step 715.

At step 716, the caller abandons the telephone call by hanging up, in which case the SSP 24 stops playing the "please hold" announcement to the caller at step 717 and at step 718, the SSP 24 sends resource clear message to the SCP 23 due the abandonment of the telephone call by the caller. At step 719, the SCP 23 terminates call processing record (CPR) processing.

Figure 30:
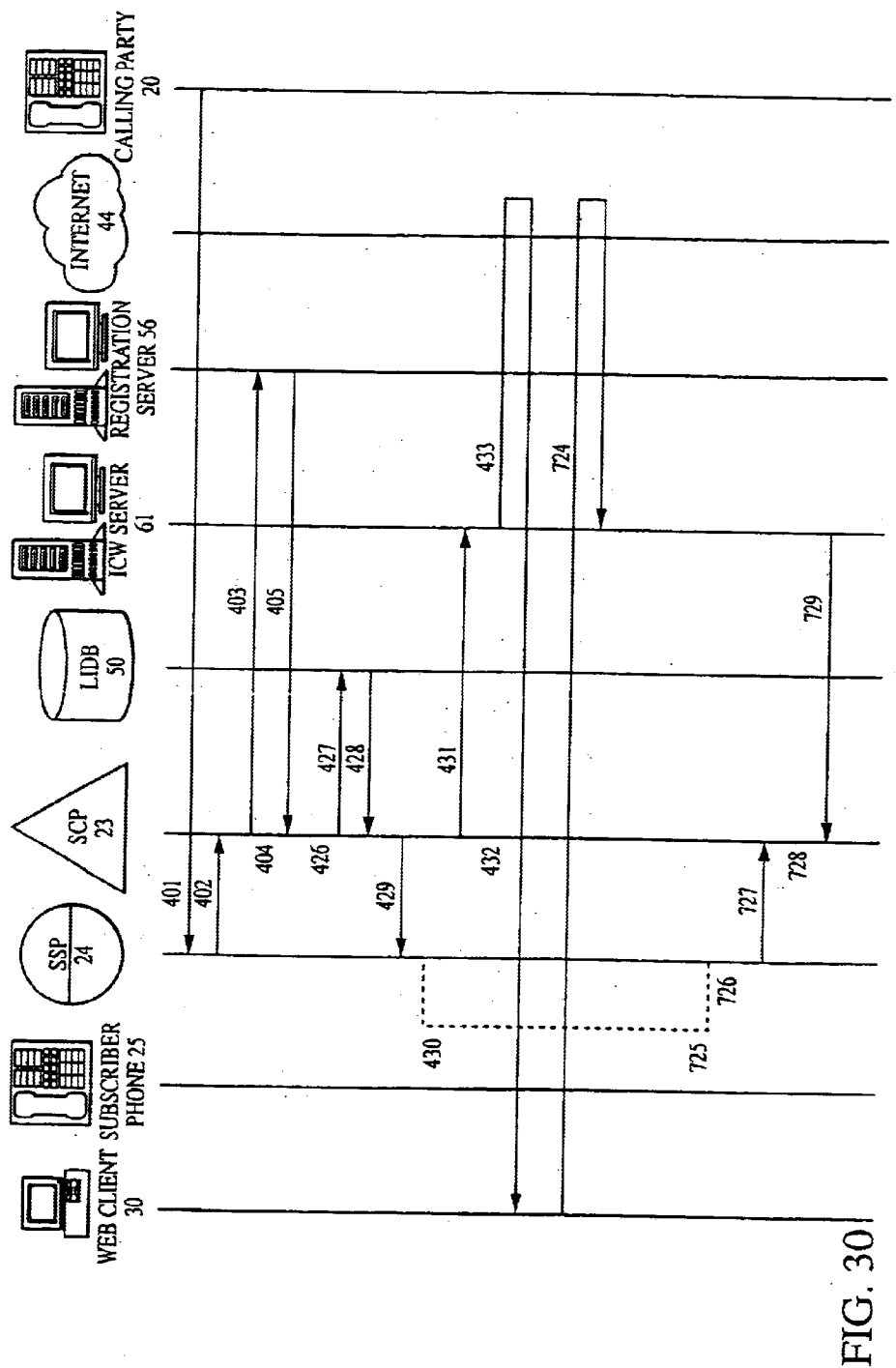
FIG. 30 is an exemplary call flow diagram in which the calling party abandons the telephone call to the subscriber before a response from the Web server, according to an aspect of the present invention.

FIG. 30 is a call flow diagram in which the caller abandons the telephone call before a response from the ICW server 61 is received. The telephone call placed to the subscriber is processed according to steps 401–433, discussed above. In response to the query from the ICW server 61, the subscriber elects a call disposition option to control the call at step 724. As a result, the client software 34 responds to the ICW server 61 with the selected option. At step 725, the caller abandons the telephone call by hanging up, in which case the SSP 24 stops playing the "please hold" announcement to the caller at step 726 and at step 727, the SSP 20 sends a resource clear message to the SCP 23 due the abandonment of the telephone call by the caller. At step 728, the SCP 23 terminates CPR processing, ignoring any responses from the ICW server 61 related to this disconnected call at step 729.

In an alternative embodiment of the invention, as depicted in FIG. 1, a service node (e.g., SN/IP 57) essentially replaces the combination of the ICW server 61, the RS 56 and the heartbeat server 58. In particular, whenever the subscriber connects to the Internet 44, the SN/IP 57 is automatically notified of the on-line status. The SN/IP 57 contemporaneously forwards the subscriber's on-line status to the SCP 23, regardless of whether a call to the subscriber's number is being processed. The SCP 23 stores the on-line status data in conjunction with the other data related to the subscriber. The data is stored as a YES indication in the subscriber's Internet provider (SIP) field. Likewise, when the subscriber exits the Internet session, the SN/IP 57 is notified that the subscriber is no longer on-line. The SN/IP 57 likewise transmits this information to the SCP 23, which changes the SIP indication to NO. Therefore, when a telephone call to the subscriber's phone 25 is processed according to the embodiment depicted in FIG. 1, the SCP 23 determines the on-line status without having to query an external server.

Figure 31:
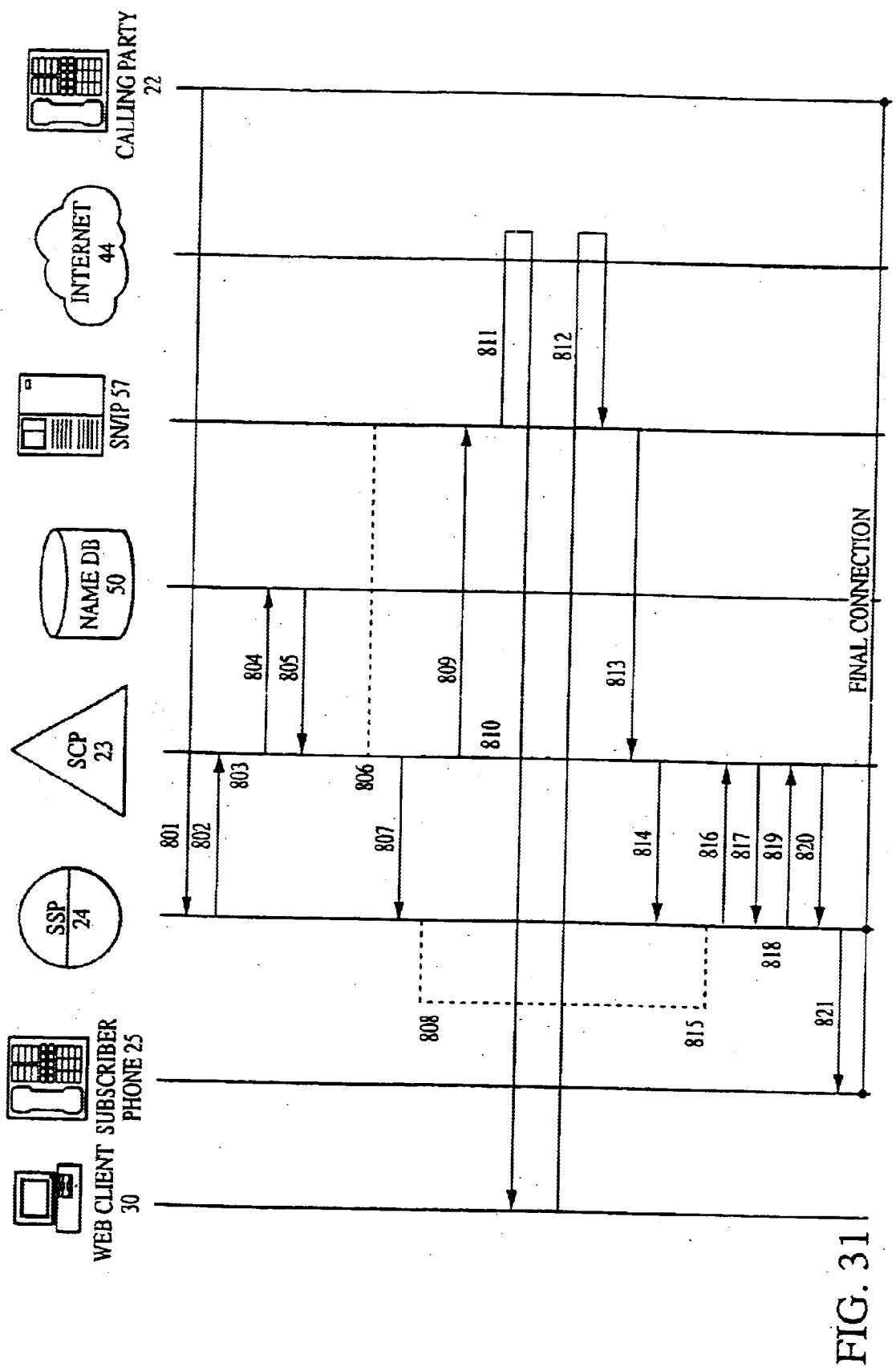
FIG. 31 is an exemplary call flow diagram of an alternative embodiment of the invention, in which the subscriber elects to accept the incoming telephone call, according to an aspect of the present invention.

FIG. 31 is a call flow diagram depicting the process by which the subscriber elects to accept the incoming telephone call, according to the embodiment of FIG. 1. At step 801, a telephone call is placed by the calling party 20 to the subscriber's phone 25. A TAT in the terminating SSP 24 causes the call to be suspended at the SSP 24. The trigger also causes the SSP 24 to transmit an AIN query message including the calling party number (if available) and called party number via the SS7 network and the appropriate STP 22 to the subscriber's serving SCP 23 at step 802. At step 803, a check is performed at the SCP 23 to confirm that the subscriber has voice mail service. Also, the SCP 23 determines whether the presentation restriction value is restricted or unavailable. If the presentation restriction value is restricted and the called party subscribes to the ACR service, an authorize termination response is sent to the SSP 24 allowing the call to be rejected. ACR prevents calls to subscribers when a calling party blocks their number.

If the calling party number is delivered with the query and the presentation restriction indicator for the incoming call is allowed, the SCP 23 launches a query to an LNP database (not pictured), for example, to determine whether the received calling party number is ported. The telephone number returned in the response is either equal to the calling party number sent in the query if the telephone number is not ported or the local routing number if the telephone number is ported. The telephone number from the response is used as the calling party number and checked against entries in a table to determine if the NPA-NXX belongs to a participating LEC.

If the calling party number is found to be a participating LEC, a query is launched to the name database 50 at step 804 to retrieve the calling party's name. The name database 50 can be, for example, an external LIDB or a local real time database (RTDB) servicing the SCP 23. If the calling party number was not delivered with the query, or there is no participating LEC, or the presentation restriction indicator for the incoming call is anonymous or unavailable, the SCP 23 will not launch the query to the name database 50 and the SSP 24 terminates the suspended telephone call at the subscriber's line. If available, the calling party's name is sent to the SCP 23 from the name database 50 at step 805.

At step 806, the SCP 23 determines the on-line status of the subscriber. As discussed above, this information is previously provided by the SN/IP 57 to the SCP 23. Therefore, the SCP 23 simply retrieves the on-line status data from it subscriber database. If the subscriber is not currently on-line, the SCP 23 sends an authorize termination response to the SSP 24, which terminates the call to the subscriber's telephone line. However, if the subscriber is on-line, as shown in FIG. 31, the SCP 23 instructs the SSP 24 to play a "please hold" announcement to the calling party at step 807 to request the calling party to hold the line (step 808).

At step 809, the SCP 23 sends a subscriber Internet provider (SIP) invite to the SN/IP 57. The SIP invite contains the called party number, the calling party number (if available and not presentation restricted), the calling party name (if available and not presentation restricted), the IP address, the port number, the client software version, an indicator as to whether or not the subscriber has voice mail service and a session key. At step 810, the SCP 23 sets a timer equal to a predetermined time, e.g., 25 seconds. In the event that the SN/IP 57 does not respond within the predetermined time (indicating a timeout condition) or responds with an error, the SCP 23 instructs the SSP 24 to stop playing the "please hold" announcement to the caller. Then, the SSP 24 begins playing an announcement to the caller or forwarding the call in accordance with the Intelligent Call Forwarding instructions. When voice mail is available, the message informs the caller that the call is being forwarded to a voice mail service. Lastly, the SCP 23 sends an authorize termination response to the SSP 24. If the subscriber does not have voice mail service, an error is reported and the SCP 23 sends an authorize termination response to the SSP 23. As a result, the SSP 23 terminates the suspended telephone call to the subscriber's telephone line and the call encounters any other features programmed on the line.

If no timeout occurs, at step 811, the SN/IP 57 sends a message via the Internet 44 to the subscriber, which appears on the subscriber's display at Web client 30, informing the subscriber of the incoming call and presenting the subscriber with disposition options for the call. The message displayed may be a pop-up dialog box.

At step 812, the subscriber elects to accept the telephone call, and as a result, the client software 34 responds to the SN/IP 57 with an OK message encrypted with the session key. In response, the SN/IP 57 initiates termination of the subscriber's Internet session. The SN/IP 57 also passes the subscriber's selection to accept the incoming call to the SCP 23 at step 813. At step 814, the SCP 23 instructs the SSP 24 to stop playing the "please hold" announcement to the caller. At step 815, the "please hold" announcement is terminated by the SSP 24 and at step 816 the SSP 24 sends a resource clear message to the SCP 23 confirming that the message is no longer playing.

At step 817, the SCP 23 instructs the SSP 24 to begin playing a "will take your call" announcement to the caller (step 818). At step 819, the SSP 24 sends a resource clear message to the SCP 23. At the conclusion of the "will take your call"announcement, the SCP 23 sends an authorize termination response to the SSP 24 which terminates the suspended call to the subscriber's telephone line (steps 820821). That is, the calling party 20 is connected to the subscriber phone 25.

Figure 34:
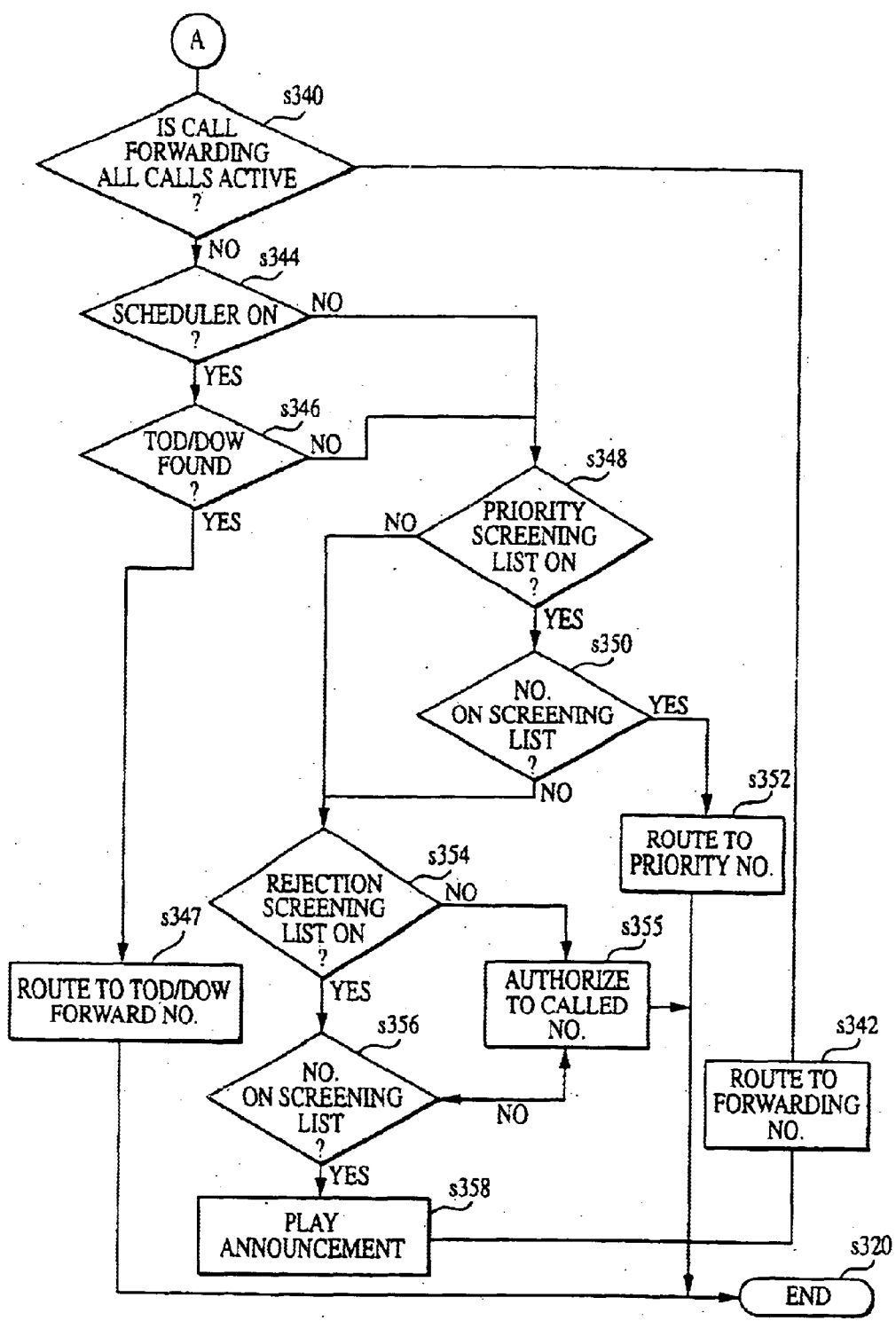
FIG. 34 is a continuation of the exemplary flowchart of FIG. 32.

In comparison to FIG. 25, which is the call flow when the subscriber elects to accept an incoming call while on-line, according to the embodiment of FIG. 20, FIG. 34 differs only through step 810. After step 810, the embodiments are substantially the same. Therefore, substitution of steps 801 through 810 in the call flows of FIGS. 24 and 26–30 produces a corresponding call flow diagram depicting the embodiment of FIG. 1. These alternative call flows will therefore not be repeated herein to avoid redundancy.

Figure 32:
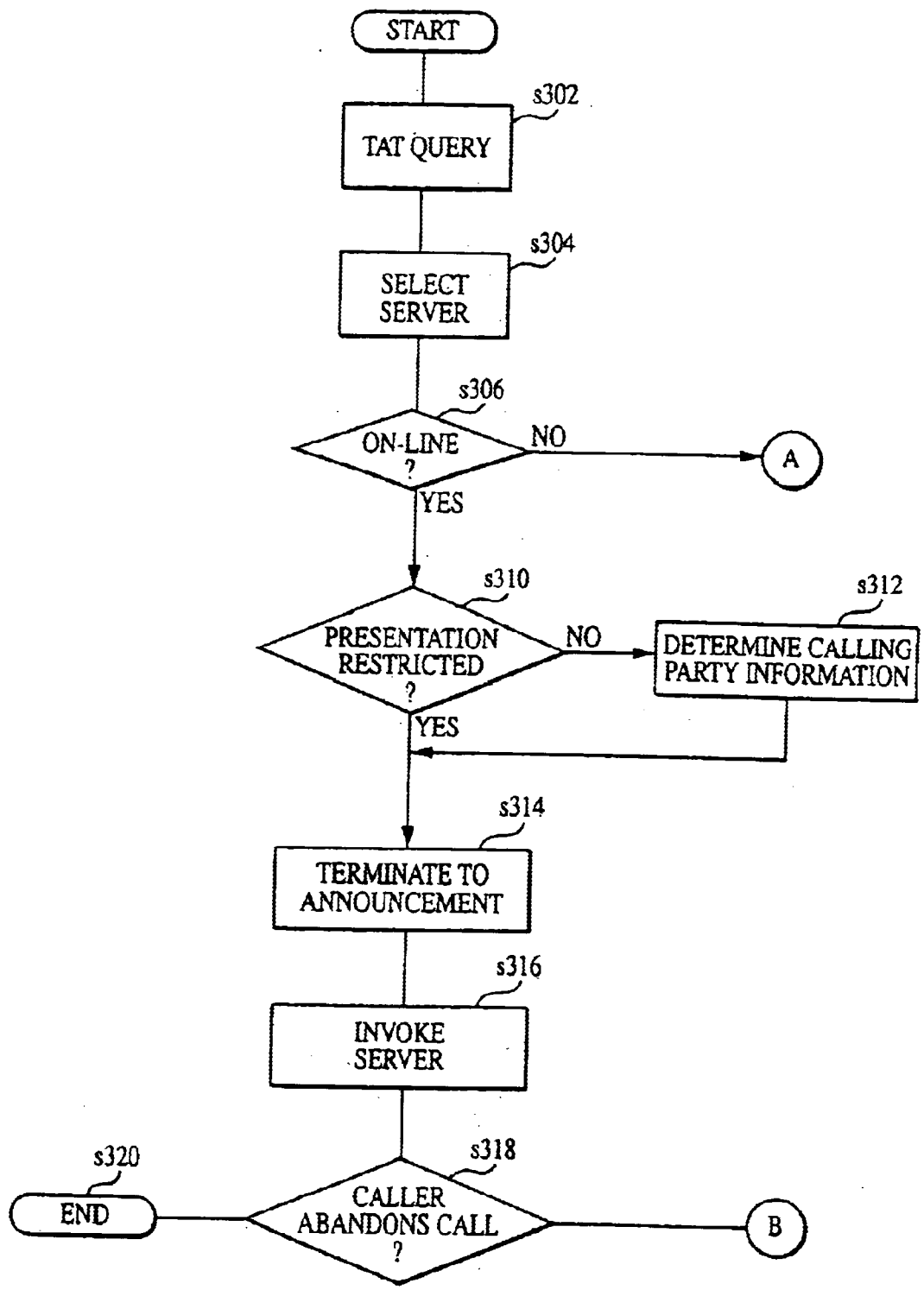
FIG. 32 is a flowchart of exemplary SCP Service Logic for Intelligent Call Forwarding and ICID, according to an aspect of the present invention.
Figure 33:
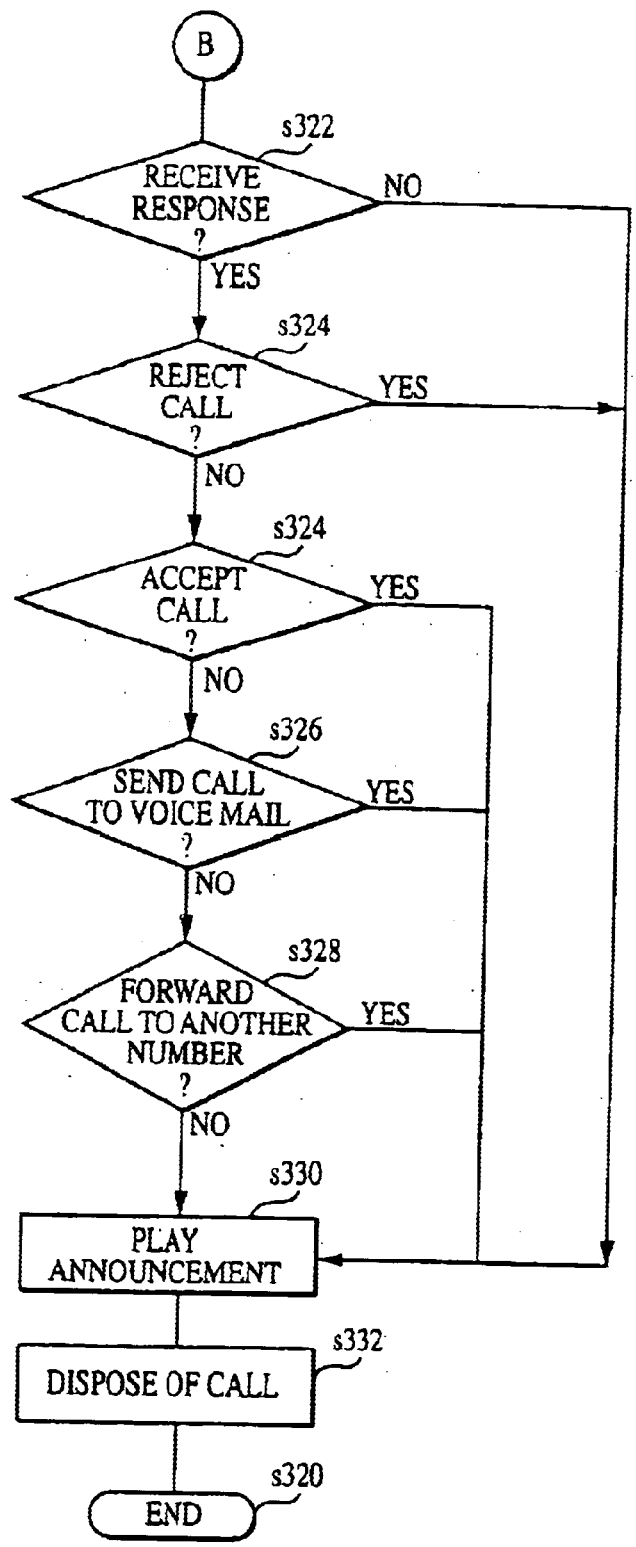
FIG. 33 is a continuation of the exemplary flowchart diagram of FIG. 32.

FIGS. 32–34 show an exemplary flowchart diagram of the SCP service logic, according to an aspect of the present invention, whenever Intelligent Call Forwarding has been activated. At step s302 of FIG. 32, a query, including the called party's telephone number and the calling party's telephone number, is received by the SCP 23 from the terminating switch SSP 24. At step s304, a table is used to derive the LATA based upon the NPA-NXX of the called party number. In the embodiment depicted in FIG. 20, the LATA is used to determine the corresponding registration server 56 and ICW server 61 to query for the GetData and InvokeApp requests. The system selects from among multiple registration servers and ICW servers assigned to predetermined areas.

Subsequently, at decision diamond s306 the SCP 23 launches a query to the appropriate server to obtain the subscriber's on-line status and sets a timer equal to a predetermined time, e.g., 2 seconds. If the query is unsuccessful, an error is reported and the SCP 23 instructs the SSP 24 to terminate the suspended call to the subscriber's line. If however, the query is successful, the subscriber's on-line status is determined at decision diamond s306.

In an alternative embodiment, which incorporates the SN/IP 57 as shown in FIG. 1, there is no need for the SCP 23 to send a query to a server to determine the subscriber's on-line status. Instead, the SCP 23 already has that data stored and available. Every time the subscriber initiates an Internet session, a service node (e.g., SN/IP 57) is notified. The service node, in turn, systematically notifies the SCP 23 that the subscriber is on-line and the SCP 23 stores the on-line status information. Therefore, when the SCP 23 receives a TAT query from SSP 24 regarding the subscriber's telephone number, the SCP 23 already has an on-line indication without having to query an external server. In other words, pursuant to the embodiment of FIG. 1, step s304 is by-passed and decision diamond s306 is executed using data already stored at the SCP 23.

If at decision diamond s306, it is determined that the subscriber is not on-line, the SCP 23 instructs the SSP 24 according to any services associated with the called number. If the subscriber has Intelligent Call Forwarding, the SCP 23 proceeds to step s340 of FIG. 34 to implement call forwarding options, as discussed below.

If the subscriber is on-line, a determination is made to ascertain whether the presentation restriction value is restricted or unavailable, at decision diamond s310.

If the presentation restriction indicator for the incoming call is "allowed," the SCP 23 launches a query to the a name database to determine whether the received calling party number is a ported telephone number at step s312. If the query is successful, the telephone number returned in the response is either equal to the calling party number sent in the query if the telephone number is not ported, or the local routing number if the telephone number is ported. The telephone number returned in the response is checked against entries in a table to determine if the NPA-NXX belongs to a participating LEC, in which case a query is launched to the name database 50 to retrieve the calling party's name at step s312.

If either query is not successful, an error is reported, the calling party name is set to null, and a determination is made as to whether the subscriber has voice mail service. Next, when the calling party name and number have been retrieved from the name database 50 at step s314, a "please hold" announcement is played to the caller. If the subscriber has voice mail service, the caller is advised that the called party is on another call and that the caller should wait, and that the wait may take fifteen seconds. If the subscriber does not have voice mail service, the caller is advised that the called party is on another call, and that if the caller's call is not taken, the caller may hear a busy signal or be transferred to another number.

If the calling party name is not in the name database 50, an error is reported, the calling party name is set to null, and a determination is made as to whether the subscriber has voice mail service. Next, at step s314 a "please hold" announcement is played to the caller. An appropriate message is played, depending on whether the subscriber has voice mail service.

If a call is received with a presentation restriction indicator of restricted (i.e., anonymous) and the subscriber has the ACR feature activated, an authorization response is sent to the SSP 24 and the suspended call attempts to terminate at the subscriber's line. If no ACR feature is active, or if the presentation restriction value is unavailable, the calling party name is set to null and the calling party number is set to anonymous or unavailable. Next, at step s314 a "please hold" announcement is played to the caller. An appropriate message is played, depending on whether the subscriber has voice mail service.

At step s316, the SCP 23 contacts the appropriate server (e.g., via an InvokeApp request to the ICW server 61 of FIG. 20) or service node (e.g., via an SIP invite to the SN/IP 57 of FIG. 1) with a request that includes the called party number, calling party number (if available and not presentation restricted), the calling party name (if available and not presentation restricted), IP address, port number, client software version number, and an indicator as to whether the subscriber has voice mail service. If there is no response within a predetermined time period, e.g., 25 seconds (indicating a timeout condition), an error is reported and an authorization response will be sent to the SSP 24 and the suspended call will attempt to terminate at the subscriber's line. If, however, there is a response within the predetermined time period, a determination is made as to whether the caller has abandoned the call at decision diamond s318. If the call was abandoned, the connection is disconnected at step s320. If the caller is still on the line, the server or the service node formats an Internet message to the client software 34 on the subscriber's PC 32, which causes a pop-up box dialog box to be displayed on the subscriber's display, informing the subscriber of the incoming call and presenting the subscriber with several call disposition options.

Referring to FIG. 33, which continues the flow of FIG. 32, a check is made at decision diamond s322 to determine whether the subscriber selected a call disposition option and the please hold announcement is terminated. If no call disposition option is made within a predetermined time period, the SCP 23 instructs the SSP 24 to begin playing a "call me back later" announcement at step s330, after which the SSP 24 disposes of the call at step s332, ending the logic flow at s320.

If the subscriber selects a call disposition option (decision diamond s322—YES), the SCP 23 first determines whether the subscriber has expressly rejected the call at decision diamond s323. If the call is rejected, the SCP 23 instructs the SSP 24 to begin playing a "call me back later" announcement at step s330, after which the SSP 24 disposes of the call at step s332, ending the logic flow at s320.

If the subscriber elects to accept the incoming call (decision diamond s324—YES), the SCP 23 instructs the SSP 24 to begin playing a "will take your call" announcement at step s330, after which the SCP 23 sends an authorize termination response to the SSP 24 which terminates the suspended call to the subscriber's telephone line at step s332.

If the subscriber elects to forward the incoming call to voice mail service (decision diamond s326—YES), the SCP 23 instructs the SSP 24 to begin playing an announcement to the caller that the call is being forwarded to a voice mail service at step s330, after which the SCP 23 sends an authorize termination response to the SSP 24 at step s332. The call is then connected to the subscriber's voice mail service. If the subscriber elects to forward the incoming call to another telephone line (decision diamond s328—YES), the SCP 23 instructs the SSP 24 to begin playing a "forwarding to another number" announcement at step s330, after which the SCP 23 sends a Forward Call response to the SSP 24 at step s332. The call is then forwarded to the desired number.

If the subscriber elects to send the incoming call to an announcement, the SCP 23 instructs the SSP 24 to begin playing the announcement selected by the subscriber at step s330. One option advises the caller that the subscriber is busy and that the caller should call back later. Another option advises the caller that the subscriber is busy and that the subscriber will call the caller back later. After the selected announcement is played to the caller, the logic ends at step s320.

FIG. 34 continues the flow from FIG. 32 whenever it is determined that an Intelligent Call Forwarding subscriber is not on-line. At decision diamond s340, the SCP 23 determines whether call forwarding for all calls is active. If so, the incoming call is routed to the forwarding number at step s342. If not, it is determined whether the scheduler is active at decision diamond at s344. If the scheduler is ON, and the tod/dow is found at decision diamond s346, the SCP 23 processes calls according to the tod/dow table, if populated, at step s347. Processing the call according to the tod/dow table may include terminating the call to the subscriber's phone number if the time of day and day of the week correspond to a deactivation period.

If at decision diamond s344, it is determined that the scheduler is OFF, or if at decision diamond s346, it is determined that the scheduler is ON but the tod/dow table is not populated, the SCP 23 determines whether subscriber has identified special routing instructions based on the calling party number. First, the SCP 23 determines whether the priority screening list is ON at decision diamond s348 and, if so, whether calling party number is on that list at decision diamond s350. Whenever the calling party number is on the priority screening list (decision diamond s350—YES), the SCP 23 instructs the SSP 24 to route the incoming call to a predesignated priority telephone number at step s352, ending the call, at s320.

Otherwise, the SCP 23 goes on to determine whether the rejection screening list is ON at decision diamond s354. Whenever the rejection screening list is ON, the SCP 23 determines whether the calling party number is on that list at decision diamond s356. Whenever the calling party number is on the rejection screening list (decision diamond s356—YES), the SCP 23 instructs the SSP 24 to play an announcement at step s358 rejecting the caller. In an alternative embodiment of the invention, the SCP 23 instructs the SSP 24 to terminate the incoming call to a directory number, without an announcement, predesignated by the subscriber to receive rejected telephone calls, such as an voice message center, where the call is terminated. Whenever the rejection screening list is OFF (decision diamond 354—NO), or the rejection screening list is ON, but the calling party number is not on the list (decision diamond 356—NO), the SCP 23 instructs the SSP 24 to route the call to the called number at step s355, ending the process at s320.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A system for implementing an advanced intelligent network call forwarding service of a subscriber, comprising:
    a service control point, which processes telephone calls in a public switched telecommunications network, said service control point comprising a database of call forwarding service data corresponding to a telephone number of the subscriber; and
    a service management system comprising a first communications interface between said service control point and an interactive voice response system, which is accessible by the subscriber from a dual tone multi-frequency telephone via the public switched telecommunications network, and simultaneously comprising a second communications interface between said service control point and a web server, which is accessible by the subscriber from a graphical user interface via a packet switched data network, at least a substantive portion of the call forwarding service data being built via the graphical user interface, said service management system updating the call forwarding service data in accordance with the substantive portion of the call forwarding service data;
    wherein said service management system receives instructions to control the call forwarding service, based on the updated data, via at least one of the dual tone multiple frequency telephone and the graphical user interface, and communicates the updated call forwarding service data and the control instructions to said service control point, which processes calls to the telephone number of the subscriber in accordance with the updated call forwarding service data and the control instructions.

2. The system of claim 1 for implementing the call forwarding service, wherein said service control point processes calls in accordance with the instructions substantially contemporaneously with the subscriber sending the instructions to control the call forwarding service from at least one of said interactive voice response system and the graphical user interface.

3. The system of claim 1 for implementing the call forwarding service, the substantive portion of the call forwarding service data built via the graphical user interface comprising a schedule identifying at least one future activation period and a corresponding forward-to telephone number to which calls to the subscribed telephone number are forwarded only during the at least one future activation period.

4. The system of claim 3 for implementing the call forwarding service, the control instructions comprising one of activating and deactivating the schedule.

5. The system of claim 1 for implementing the call forwarding service, the substantive portion of the call forwarding service data built via the graphical user interface comprising a screening list identifying at least one screening number and a corresponding screening forward-to number, wherein only calls from the at least one screening number to the subscriber telephone number are forwarded to the screening forward-to number.

6. The system of claim 5 for implementing the call forwarding service, the control instructions comprising one of activating and deactivating the screening list.

7. A system for implementing a call forwarding service of a subscriber, comprising:
    a service control point, which processes telephone calls in a public switched telecommunications network, said service control point comprising a database of call forwarding service data corresponding to a telephone number of the subscriber, the call forwarding service data comprising a call forwarding schedule;
    a Web server in a packet switched data network, which provides the call forwarding service data to a graphical user interface, said Web server receiving first instructions from the graphical user interface for defining the call forwarding schedule, including identifying a plurality of activation and deactivation times and at least one forward-to number corresponding to the plurality of activation times, and for activating and deactivating the call forwarding schedule;
    an interactive voice response system in the public switched telephone network, which provides the call forwarding service data to a dual tone multi-frequency (DTMF) telephone, said interactive voice response system receiving second instructions from the DTMF telephone for controlling the call forwarding schedule defined via the graphical user interface, including activating and deactivating the call forwarding schedule; and a service management system comprising a communications interface between said service control point and said Web server and further comprising a communications interface between said service control point and said interactive voice response system said service management system being configured to communicate each of the first instructions and the second instructions to said service control point, which accordingly updates the call forwarding service data and processes calls to the telephone number of the subscriber in accordance with the updated call forwarding service data.

8. The system of claim 7 for implementing the call forwarding service, the call forwarding service data further comprising a priority screening list having at least one priority telephone number;

the first instructions further defining the priority screening list, including identifying the at least one priority telephone number and at least one priority forward-to number corresponding to the at least one priority telephone number, and for activating and deactivating the call forwarding schedule; and the second instructions further controlling the priority screening list, defined via the graphical user interface, including activating and deactivating the priority screening list;

wherein, a call placed from the at least one priority telephone number to the telephone number of the subscriber is forwarded to the corresponding at least one priority telephone number when the priority screening list is activated through one of said Web server and said interactive voice response system.

9. The system of claim 8 for implementing the call forwarding service, the call forwarding service data further comprising a rejection screening list having at least one rejection telephone number;

the first instructions further defining the rejection screening list, including identifying the at least one rejection telephone number and at least one rejection forward-to number corresponding to the at least one rejection telephone number, and for activating and deactivating the call forwarding schedule; and the second instructions further controlling the rejection screening list, defined via the graphical user interface, including activating and deactivating the rejection screening list;

wherein, a call placed from the at least rejection telephone number to the telephone number of the subscriber is forwarded to the corresponding at least one rejection telephone number, which is different than the telephone number of the subscriber and different than the at least one priority telephone number, when the rejection screening list is activated through one of said Web server and said interactive voice response system.

10. The system of claim 8 for implementing the call forwarding service, wherein the subscriber receives the call forwarding service data and sends priority screening list instructions to control the priority screening list from the graphical user interface via said Web server to said service management system, the priority screening list control instructions comprising at least one of adding a new priority telephone number to the priority screening list, removing one of the priority telephone numbers from the priority screening list, setting an activation date and time and setting a deactivation date and time; and wherein said service control point updates the call forwarding schedule in accordance with the priority screening list instructions and processes calls to the telephone number of the subscriber in accordance with the updated call forwarding service data.

11. A method for implementing a call forwarding service in an advanced intelligent network for a telephone number of a subscriber, comprising:

storing, at a service control point, call forwarding service data for implementing the call forwarding service via a plurality of data networks, the call forwarding service data comprising call forwarding instructions and customized features;

receiving, at the service management system, the customized features from a graphical user interface, via a first one of the plurality of data networks, the customized features one of created and edited by the subscriber at the graphical user interface;

receiving, at a service management system, the call forwarding instructions from at least one of the graphical user interface, via the first one of the plurality of data networks, and an interactive voice response, via a second one of the plurality of data networks, as selected by the subscriber;

transmitting the customized features and the call forwarding instructions from the service management system to the service control point via a third one of the plurality of data networks;

updating the call forwarding service data with the customized features and call forwarding instructions; and processing an incoming call in accordance with the updated call forwarding service data.

12. The method of claim 11 for implementing the call forwarding service, the customized features comprising at least one of a schedule and a screening list; and the call forwarding instructions comprising at least one of activating and deactivating the call forwarding service, activating and deactivating the schedule, activating and deactivating the screening list, and activating and deactivating an automatic shut-off function.

13. A method for implementing a call forwarding service at a service control point in a public switched telephone network (PSTN) for a telephone number of a subscriber, the service control point connecting to a service management system that interfaces with at least one web server in a packet switched data network and an interactive voice response system in the PSTN, the method comprising:

storing, at the service control point and at the service management system, call forwarding service data for implementation of the call forwarding service;

transmitting the call forwarding service data from the service management system to a graphical user interface through the web server;

receiving updated call forwarding service data from the graphical user interface at the service management system, the updated call forwarding service data comprising features one of created and edited by the subscriber at the graphical user interface;

storing at the service management system the updated call forwarding service data;

transmitting the updated call forwarding service data from the service management system to the service control point; and storing the updated call forwarding service data at the service control point for implementing the call forwarding service in response to incoming calls to the telephone number of the subscriber; and controlling the implementation through control instructions received via the service management system, the control instructions originating at one of the graphical user interface and the interactive voice response system.

14. The method of claim 13 for implementing the call forwarding service, the control instructions comprising at least one of an activation command and a de-activation command corresponding to the updated call forwarding service data.

15. The method of claim 14 for implementing the call forwarding service, the updated call forwarding service data comprising at least one of a schedule, comprising a plurality of activation periods, and a screening list, comprising a plurality of screening list telephone numbers, calls from which are forwarded to a screening list forward-to telephone number identified by the subscriber in the updated call forwarding service data.

16. The method of claim 15 for implementing the call forwarding service, wherein the updated call forwarding service data comprises at least one of a call forwarding schedule and a priority screening list; and wherein the call forwarding instructions comprise at least one of a command to activate the call forwarding service, a command to activate the call forwarding schedule, a command to activate the priority screening list and an automatic shut-off command.

17. A system for implementing a call forwarding service of a subscriber, comprising:

a service control point, which processes telephone calls in a public switched telecommunications network, said service control point comprising a database of call forwarding service data corresponding to a telephone number of the subscriber;

a registration server, which stores an on-line status of the subscriber, who is located at a Web client connected to a packet switched data network, the Web client comprising a graphical user interface, the status being received from the Web client via the packet switched data network, said registration server communicating the on-line status to said service control point when the subscriber establishes the on-line status;

a server comprising a communications interface between said service control point and the Web client; and a service management system comprising a communications interface between said service control point and an interactive voice response system, and simultaneously comprising a communication interface between said service control point and the Web client;

wherein, said service control point notifies the subscriber via said server of an incoming call when said registration server indicates to said service control point that the subscriber is on-line, and processes the incoming call according to on-line instructions sent from the subscriber to said service control point via said server, the on-line instructions comprising at least one of accepting the incoming call, forwarding the incoming call to an alternative telephone number and processing the incoming call according to the call forwarding service data; and wherein the database of call forwarding service data corresponding to a telephone number of the subscriber is accessible through said service management system from the interactive voice response system and the Web client.

18. The system of claim 17 for implementing the call forwarding service, wherein the interactive voice response system is accessible by the subscriber from a dual tone multi-frequency telephone via the public switched telecommunications network;

wherein said service management system receives control instructions to control the call forwarding service via at least one of the dual tone multiple frequency telephone and the Web client, and forwards to said service control point the control instructions; and wherein said service control point updates the call forwarding service data in accordance with the control instructions and processes the incoming call in accordance with the updated call forwarding service data when said registration server indicates to said service control point that the subscriber is not on-line.

19. The system of claim 18 for implementing the call forwarding service, wherein said service control point processes the incoming call in accordance with the control instructions substantially contemporaneously with the subscriber sending the control instructions to control the call forwarding service from at least one of said interactive voice response system and the Web client.

20. A system for implementing a call forwarding service of a subscriber, comprising:

a service control point, which processes telephone calls in a public switched telecommunications network, said service control point comprising a database of call forwarding service data corresponding to a telephone number of the subscriber;

a service node, which determines an on-line status of the subscriber, who is located at a Web client connected to a packet switched data network, the Web client comprising a graphical user interface, the status being received from the Web client via the packet switched data network, said service node communicating the on-line status to said service control point at the time the on-line status is determined;

a service management system comprising a communications interface between said service control point and an interactive voice response system, and simultaneously comprising a communication interface between said service control point and the Web client;

wherein, said service control point notifies the subscriber via said service node of an incoming call when said service control point has received an indication that the subscriber is on-line, and processes the incoming call according to on-line instructions sent from the subscriber to said service control point via said service node; and wherein the database of call forwarding service data corresponding to a telephone number of the subscriber is accessible through said service management system from the interactive voice response system and the Web client.

21. The system of claim 20 for implementing the call forwarding service, wherein the interactive voice response system is accessible by the subscriber from a dual tone multi-frequency telephone via the public switched telecommunications network;

wherein said service management system receives control instructions to control the call forwarding service via at least one of the dual tone multiple frequency telephone and the Web client, and forwards to said service control point the control instructions; and wherein said service control point updates the call forwarding service data in accordance with the control instructions and processes the incoming call in accordance with the updated call forwarding service data when said service node has indicated to said service control point that the subscriber is not on-line.

22. The system of claim 21 for implementing the call forwarding service, wherein said service control point processes the incoming call in accordance with the control instructions substantially contemporaneously with the subscriber sending the control instructions to control the call forwarding service from at least one of said interactive voice response system and the Web client.

23. A system for implementing a call forwarding service of a subscriber, comprising:

a service control point, which processes telephone calls in a public switched telecommunications network, said service control point comprising a database of call forwarding service data corresponding to a telephone number of the subscriber, the call forwarding service data comprising a plurality of screening lists;

a Web server in a packet switched data network, which provides the call forwarding service data to a graphical user interface, said Web server receiving first instructions from the graphical user interface for defining each of the plurality of screening lists, including identifying at least one screened telephone number and an associated forward-to number corresponding to each of the plurality of screening lists;

an interactive voice response system in the public switched telephone network, which provides the call forwarding service data to a dual tone multi-frequency telephone, said interactive voice response system receiving second instructions from the telephone for controlling the plurality of screening lists defined via the graphical user interface, including activating and deactivating at least one of the screening lists; and a service management system comprising a communications interface between said service control point and said Web server and further comprising a communications interface between said service control point and said interactive voice response system, said service management system being configured to communicate each of the first instructions and the second instructions to said service control point, which accordingly updates the call forwarding service data and processes calls to the telephone number of the subscriber in accordance with the updated call forwarding service data.

24. The system of claim 23 for implementing the call forwarding service, the call forwarding service data further comprising a schedule, having a plurality of activation periods, associated with at least one of the plurality of screening lists, for activating and deactivating the at least one screening list;

the first instructions further defining and controlling the schedule, defining the schedule including identifying the at least one screening list and the activation and deactivation times for activation periods of the schedule; and the second instructions further controlling the schedule, as defined via the graphical user interface, including activating and deactivating the schedule;

wherein, a call placed from the at least one screening telephone number, associated with the schedule, to the screened telephone number of the subscriber is forwarded to the corresponding telephone number during scheduled activation times, when the schedule is activated through one of said Web server and said interactive voice response system.

* * * * *